(12) United States Patent
Ino et al.

(10) Patent No.: US 7,207,307 B2
(45) Date of Patent: Apr. 24, 2007

(54) INTAKE SYSTEM AND METHOD FOR PRODUCING THE SAME

(75) Inventors: Masao Ino, Toyota (JP); Masakazu Ozawa, Kariya (JP); Toshiaki Nakayama, Nishikamo-gun (JP); Toshio Hayashi, Oobu (JP)

(73) Assignee: Denso Corporation (JP)

( * ) Notice: Subject to any disclaimer, the term of this patent is extended or adjusted under 35 U.S.C. 154(b) by 258 days.

(21) Appl. No.: 10/775,136

(22) Filed: Feb. 11, 2004

(65) Prior Publication Data

US 2004/0159298 A1    Aug. 19, 2004

(30) Foreign Application Priority Data

| Feb. 13, 2003 | (JP) | .................. 2003-034526 |
| Feb. 20, 2003 | (JP) | .................. 2003-042564 |
| Mar. 20, 2003 | (JP) | .................. 2003-077439 |

(51) Int. Cl.
*F02M 35/101* (2006.01)

(52) U.S. Cl. .............................. 123/184.21

(58) Field of Classification Search ........... 123/184.21, 123/184.27, 184.37, 184.45, 184.52
See application file for complete search history.

(56) References Cited

U.S. PATENT DOCUMENTS

| 5,929,397 A | 7/1999 | Satoh et al. |
| 6,024,188 A * | 2/2000 | Yamaguchi et al. ........ 181/204 |
| 6,451,238 B1 | 9/2002 | Suzuki et al. |
| 6,579,486 B1 | 6/2003 | Nakajima et al. |

FOREIGN PATENT DOCUMENTS

| EP | 1 452 723 | 9/2004 |
| EP | 1 602 819 | 12/2005 |
| GB | 2365066 A | 2/2002 |
| JP | 8-4612 | 1/1996 |
| JP | 10-018923 | 1/1998 |
| JP | 10-339224 | 12/1998 |
| JP | 2000-25101 | 1/2000 |
| JP | 2000-167872 | 6/2000 |
| JP | 2000-257612 | 9/2000 |
| JP | 2000-280353 | 10/2000 |
| JP | 2000-282989 | 10/2000 |
| JP | 2001-129849 | 5/2001 |
| JP | 2001-277284 | 10/2001 |
| WO | WO 02/092317 A1 | 11/2002 |

OTHER PUBLICATIONS

Patent Abstracts of Japan, vol. 2000, No. 12, Jan. 3, 2001 & JP 2000 257612 A (Toyota Motor Corp), Sep. 19, 2000.

(Continued)

*Primary Examiner*—Tony M. Argenbright
*Assistant Examiner*—Katrina Harris
(74) *Attorney, Agent, or Firm*—Nixon & Vanderhye PC

(57) ABSTRACT

An intermediate resin molded body is put between two outer resin molded bodies, and a molten resin is injected substantially simultaneously into a first interface between one outer resin molded body of the two outer resin molded bodies and the intermediate resin molded body and a second interface between the other outer resin molded body and the intermediate resin body, so that the two outer resin molded bodies and the intermediate resin molded body are welded together.

36 Claims, 42 Drawing Sheets

OTHER PUBLICATIONS

Patent Abstracts of Japan, vol. 018, No. 636 (M-1715), Dec. 5, 1994 & JP 06 246781 A (Japan Steel Works Ltd;The), Sep. 6, 1994.
Patent Abstracts of Japan, vol. 012, No. 274 (M-725), Jul. 29, 1988, & JP 63 057222 A (Toyoda Gosei Co Ltd), Mar. 11, 1988.
Patent Abstracts of Japan, vol. 1996, No. 05, May 31, 1996, & JP 08 004612 A (Aichi Mach Ind Co Ltd), Jan. 9, 1996.
Japanese Office Action mailed Apr. 11, 2006, issued in Japanese Patent Application No. 2003-034526.

* cited by examiner

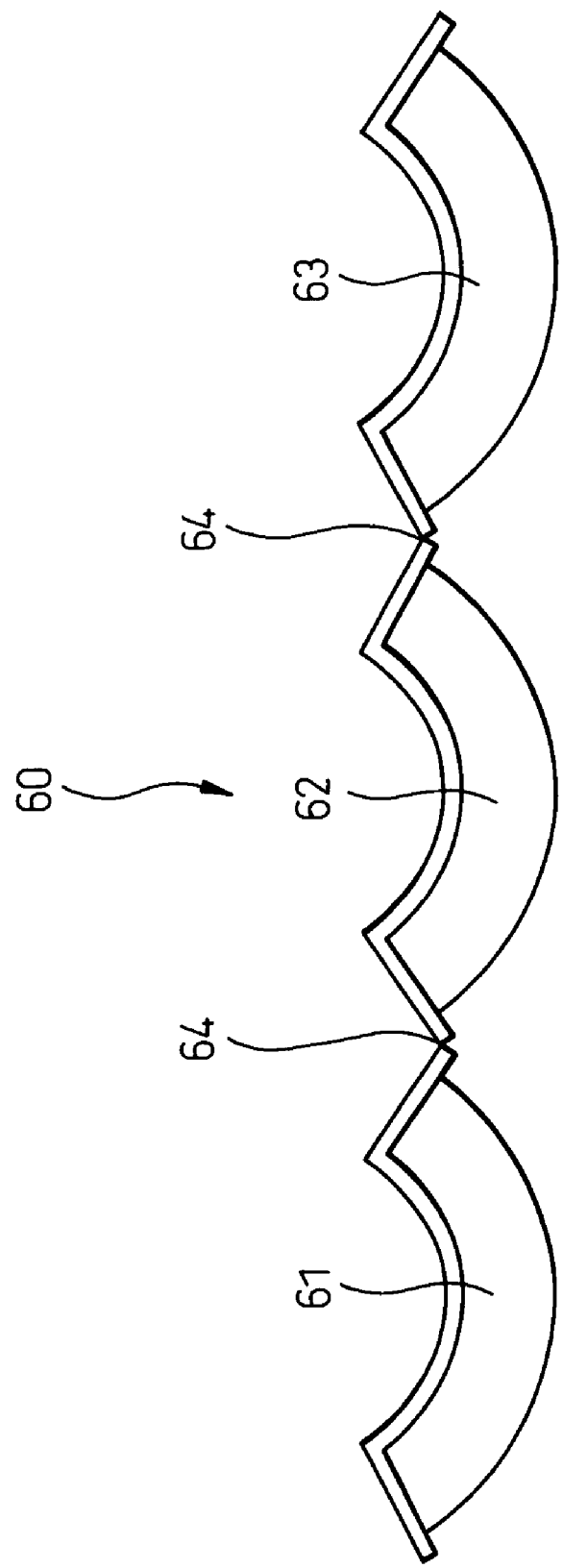

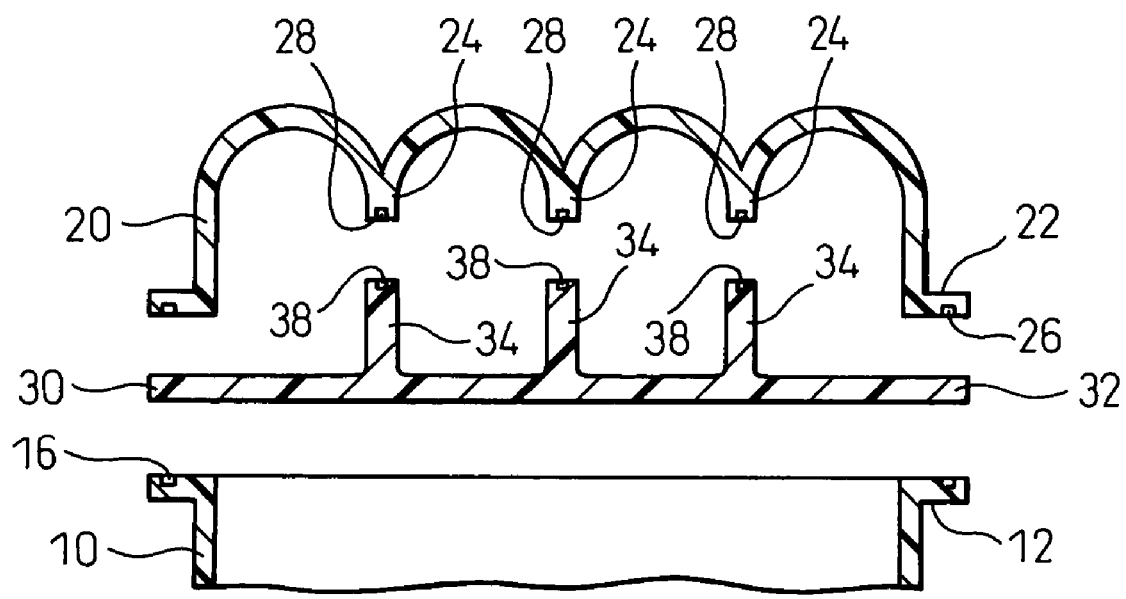

INTAKE SYSTEM AND METHOD FOR PRODUCING THE SAME

BACKGROUND OF THE INVENTION

1. Field of the Invention

The present invention relates to an intake system of an internal combustion engine (hereinafter, the internal combustion engine being referred to as an "engine") and, more particularly to an intake system in which a functional part is fixed to a tubular portion such as an intake pipe, a resonator for reducing noise generated by intake air flowing through an intake passageway and an intake member for supplying intake air to the engine, and a method for producing the system.

2. Description of the Related Art

Conventionally, an intake pipe of an intake system that is formed into a tubular shape is formed by joining a plurality of half hollow members which are divided at a plane extending along, for example, a central axis. In the case of the intake system, a functional part such as an airflow meter is placed in the intake pipe. The functional part is attached to the tubular portion with a fastening member such as a tapping screw or bolt. The fastening member is, however, gradually loosened as the tubular portion vibrates due to vibrations of the engine to which the intake system is attached. To cope with this, according to a technique disclosed in, for example, Japanese Unexamined Patent Publication No. 2000-257612, the loosening of two taping screws attributed to such vibrations is prevented by causing a straight line connecting the two taping screws to deviate from a central axis of an O ring.

However, not only the airflow meter but also a plurality of functional parts such as other sensors and actuators are placed on a tubular member such as the intake pipe. Due to this, as the number of functional parts increases, the number of fastening members for fixing the functional parts increases. As a result, there is caused a problem that the increase in number of components, and in the number of processes for installing fastening members, is called for. In addition, it is difficult to prevent the loosening of the functional parts attached by the fastening members over a long period of time.

In addition, conventionally, a resonator is disposed on the intake system for reducing the noise generated by intake air flowing through the intake passageway. The resonator is constructed by covering an opening in an intake duct forming the intake passageway with a casing having a predetermined volume, whereby the intake passageway is partially enlarged so as to reduce the noise generated by the flow of intake air.

In a resonator disclosed in, for example, Japanese Unexamined Patent Publication No. 8-4612, an intake duct is divided into two parts. One of the divided ducts has a resonator main body portion whose volume is enlarged in order to form a resonator. Then, the two divided intake ducts are connected together through fit, whereby a resonator is formed outside the intake duct.

In the case of the resonator disclosed in the Japanese Unexamined Patent Publication No. 8-4612, however, the resonator main body portion is formed in one of the divided intake ducts. Due to this, the intake duct and the resonator main body portion must be designed so as to match a space formed in the periphery of the engine. Namely, an intake system becomes a component dedicated to the engine used, and it is difficult to design the intake duct and the resonator main body portion separately. As a result, the degree of freedom is decreased in designing the intake system involving a change in, for example, position of the resonator relative to the intake duct.

On the other hand, it is conceivable that a separate casing is placed on the intake duct so as to form a resonator. However, in a case where a separate casing is placed on the intake duct, the casing is not supported directly by the intake duct but is fixed to the intake duct while being supported by a chassis constituting an engine compartment. This is because there is no extra space at a portion in the engine compartment where an resonator must be formed. In addition, separate members such as bands and fixtures are needed to fix the intake duct and the casing. This calls for an increase in the number of processes for assembling, and in the number of components, and a larger space is also needed to install the intake system.

Furthermore, conventionally, there has been known, as an intake member for supplying intake air to the engine, an intake member which is produced by joining a plurality of resin molded bodies. The intake member such as an intake manifold whose configuration becomes complex due to its function to distribute and supply intake air to the engine can easily be fabricated by forming respective parts thereof of resin molded bodies and thereafter joining together the respective resin molded bodies so formed.

An intake manifold is disclosed in Japanese Unexamined Patent Publication No. 10-339224 which is formed by holding an intermediate resin molded body between two outer resin molded bodies and combining and joining them together. There are known methods for fabricating such an intake manifold including a method in which an intermediate resin molded body is held between two outer resin molded bodies and these resin molded bodies are vibration welded so as to be joined all together, or a method in which an intermediate resin molded body is joined to one of outer resin molded bodies and, thereafter, the other outer resin molded body is joined to the intermediate resin molded body which has already been jointed to the one outer resin molded body.

Of the aforesaid two methods, according to the former method, in the event that an interface between the outer resin molded body and the intermediate resin molded body is situated in the interior of the intake manifold, as the transmission of welding vibration to the vicinity of the interface becomes insufficient, it is not possible to secure sufficient airtightness and joining strength. In addition, according to the latter method, as the joining of the resin molded bodies is carried out in two separate steps, problems of low productivity and high production costs occur.

SUMMARY OF THE INVENTION

A first object of the invention is to provide an intake system which can decrease the number of components and the number of processes for assembling and which can prevent the loosening of a functional part, and a method for producing the same system.

A second object of the invention is to provide an intake system which can provide a high degree of freedom in design and which can decrease the number of processes for assembling and the number of components, as well as a space for installing the intake system.

A third object of the invention is to provide a method for producing an intake member which can secure airtightness and joining strength at an interface between a plurality of resin molded bodies that are joined together.

In addition, a further object of the invention is to provide a method for producing an intake member with high productivity and with a low production cost.

According to an intake system of a first aspect of the invention, a lock-shaped portion holds an arm portion of a functional part between a trunk portion and a first head portion thereof. The functional part is attached to a tubular portion by being held in the lock-shaped portion. The lock-shaped portion is formed from a secondary molding resin which is packed into a joint between a plurality of primary molded members. Due to this, the primary molded parts are welded together by the secondary molding resin so packed, and the functional part is attached to the tubular portion formed of the primary molded member. Namely, the welding of the primary molded members and attachment of the functional part can be implemented simultaneously by the packing of the secondary molding resin, whereby the functional part is attached to the tubular portion without using a fastening member such as a tapping screw. Consequently, the number of processes for assembling and the number of components can be reduced, and the loosening of the functional part can be prevented.

In an intake system of the invention, the lock-shaped portion has a first neck portion and a second neck portion which extend from the trunk portion. Due to this, assuming that an angle formed by the first neck portion and the second neck portion is generally, for example, 180°, the tubular portions and the arm portion of the functional part are held between a first head portion and a second head portion. Consequently, the functional part can be attached strongly to the tubular portion.

In the intake system of the invention, the primary molded member has a first hole portion which provides a communication between the packing portion and an external portion. Originally, in a case where a secondary molding resin is packed into a joint between primary molded members in order to weld the primary molded members together, the secondary molding resin is packed into a closed packing portion which is formed by the primary molded members. However, even when the secondary molding resin is packed into the packing portion formed by the primary molded members, a hole is formed in the primary molded member in such a manner as to communicate with the outside so as to allow air present within the packing portion to be discharged. Then, part of the secondary molding resin so packed is caused to overflow therefrom to the outside together with the air present in the packing portion. Then, in the intake system of the invention, a first hole portion which provides a communication between the packing portion and an external portion and a second hole portion which penetrates the arm portion of the functional part are connected with each other. Then, a first head portion is formed on a side of the arm portion which is opposite to a side thereof which faces the trunk portion by allowing part of the secondary molding resin packed into the packing portion to overflow to the outside together with the air in the packing portion by way of the first hole portion and the second hole portion. Consequently, the welding of the primary molded members and attachment of the functional part to the tubular portion can be implemented simultaneously to thereby reduce the number of processes for assembling.

According to a second aspect of the invention, a casing is divided into two or more piece portions. The two or more divided piece portions hold an intake duct therebetween so as to form a resonator between the piece portions and the intake duct so held. Due to this, irrespective of, for example, the shape and position of the intake duct, the resonator can easily be formed by holding the intake duct between the divided piece portions. In addition, the intake duct and the casing are bonded together by a joint. Due to this, the casing is supported directly by the intake duct, and this obviates the necessity of a separate member for fixing the casing to the intake duct. Consequently, a high degree of freedom in design can be provided and the numbers in processes for assembling, the number of components, and the space needed for installation, can be reduced.

In the invention, the respective piece portions, and the intake duct and the casing are welded together by joints formed from a secondary molding resin. Due to this, easy and strong bonding and sealing can be attained between the respective piece portions, as well as between the intake duct and the casing.

In the invention, the casing covers an opening which penetrates a circumferential wall of the intake duct. A space is formed between the casing and the intake duct by covering the opening by the casing, and an intake passageway is expanded. Consequently, noise generated by intake air flowing through the intake passageway can be reduced by the resonator so formed.

In the invention, the intake duct has a positioning means for positioning an attachment position to attach the casing to the intake duct. Due to this, the attachment position to attach the casing to the intake duct can easily be positioned.

In the invention, the positioning means is a groove portion which continuously extends in a circumferential direction. Due to this, for example, by attaching the casing to the groove portion, the attachment position to attach the casing to the intake duct can easily be positioned. In addition, the groove portion is formed at the same time as the formation of the intake duct from a resin. Consequently, there is no risk of calling for an increase in processes for fabricating the resonator.

In the invention, the positioning means is a protruding portion which protrudes radially outwardly from the intake duct. Due to this, for example, by bringing the casing into abutment with the protruding portion, the attaching position to attach the casing to the intake duct can easily be positioned. In addition, the protruding portion is formed at the same time as the intake duct is formed from a resin. Consequently, there is no risk of calling for an increase in processes for fabricating the resonator.

In the invention, the intake duct and the casing form a space into which the resin is packed, whereby the resin forming the joint is packed into the space.

In the invention, the casing covers the intake duct circumferentially. Due to this, a volume for forming a resonator can be secured outside the intake duct.

In the invention, the casing has two piece portions which are separated by a plane containing a central axis of the intake duct. By separating the casing by the plane containing the central axis of the intake duct, the two piece portions are divided into a configuration which holds the intake duct from the outside in a radial direction. Due to this, the size of each piece portion is reduced. Consequently, even in the event that there is insufficient space around the intake duct, the casing can easily be attached to the intake duct.

In the invention, the casing has three or more piece portions which are divided by two or more planes containing the central axis of the casing. By separating the casing by the radial planes containing the central axis of the intake duct, the two piece portions are divided into a configuration which holds the intake duct from the outside in the radial direction. In addition, by increasing the number of divided piece portions, the size of each piece portion is reduced. Due to this, even in the event that there is insufficient space around the intake duct, the casing can easily be attached to the intake duct.

In the invention, the casing is formed into a cylindrical shape, whereby a cylindrical resonator is formed around the intake duct.

In the invention, the casing has two semi-cylindrical piece portions which are separated by a plane containing the central axis of the intake duct. By separating the casing by the plane containing the central axis of the intake duct, the two piece portions are divided into a configuration which holds the intake duct from the outside in the radial direction. Due to this, even in the event that there is insufficient space around the intake duct, the casing can easily be attached to the intake duct.

In the invention, the casing has three or more fan-shaped cylindrical piece portions divided by two or more planes containing the central axis of the intake duct. By separating the casing duct by the radial planes containing the central axis of the intake duct, the two piece portions are divided into a configuration which holds the intake duct from the outside in the radial direction. In addition, by increasing the number of divided piece portions, the size of each piece portion is made smaller. Due to this, even in the event that there is insufficient space around the intake duct, the casing can easily be attached to the intake duct.

In the invention, as a certain piece portion and another piece portion which is situated adjacent to the certain piece portion are connected to each other by a hinge portion, the hinge portion can be freely bent. Consequently, even in the event that the casing has a plurality of piece portions, the plurality of piece portions can be treated as an integral casing, and the increase in number of components can be suppressed.

In the invention, the piece portions and the hinge portion of the casing are integrally molded from a resin of the same material. Due to this, the plurality of piece portions are connected to each other by the hinge portion. Consequently, the plurality of piece portions can be treated as an integral casing, thereby making it possible to prevent an increase in number of components.

In the invention, the joint has a first joint which bonds and seals the intake duct and the casing together at axial end portions of the casing. Consequently, the leakage of intake air from between the intake duct and the casing at the axial end portions of the casing can be prevented.

In the invention, the first joint continuously extends circumferentially of the intake duct. Consequently, the leakage of intake air from between the intake duct and the casing can be prevented.

In the invention, the joint has a second joint which bonds and seals the respective piece portions. Consequently, the leakage of intake air from portions, where the respective piece portions are brought into contact, can be prevented.

In the invention, the first joint and the second joint communicate with each other. Due to this, by packing the resin forming the joint to either the first joint or the second joint, the resin can be distributed to the entirety of the joint.

In the invention, the casing has an injection port which communicates with the joints and from which the resin can be injected. Due to this, by injecting the resin from the injection port, the resin so injected can be distributed to the first joint and the second joint of the joint. Consequently, the joint can be formed assuredly and simply.

According to a method for producing an intake system of a third aspect of the invention, a functional part is joined to a tubular portion by a secondary molding resin which is packed into a joint of primary molded parts. Due to this, the functional part is attached to the tubular portion without using a fastening member such as a tapping screw. Furthermore, the functional part is joined to the tubular portion at the same time as the primary molded parts are welded together. Consequently, the number of processes for assembling the number of and components, can be reduced.

In the method for producing an intake system according to the invention, the functional part is joined to the tubular portion by the secondary molding resin which is caused to overflow from the joint to the outside of the tubular portion. Originally, in a case where a secondary molding resin is packed to a joint between the primary molded members so as to weld together the primary molded members, the secondary molding resin is packed into a closed packing portion formed by the primary molded members. However, even in a case where the secondary molding resin is packed into the packing portion formed by the primary molded members, a hole is formed in the primary molded member which communicates with an external portion so as to allow air present in the packing portion to be released to the outside. Then, part of the secondary molding resin is caused to overflow to the outside together with the air present in the packing portion. Then, in the method for producing an intake system according to the invention, the tubular portion and the functional part are joined together with the secondary molding resin which is caused to overflow to the outside of the tubular portion. Consequently, the welding the primary molded members and attachment of the functional part to the tubular portion are implemented simultaneously, thereby making it possible to decrease the number of processes for assembling.

In the method for producing an intake system according to the invention, a fixture is brought into abutment with a side of the functional part which is opposite to a side thereof which faces the tubular portion, thereby making it possible to easily form a lock-shaped portion on the side of the functional part which is opposite to the side thereof which faces the tubular portion.

According to a method for producing an intake member of a fourth aspect of the invention, in a secondary molding process, an intermediate resin molded body is held between two outer resin molded bodies, and a molten resin is injected substantially simultaneously into a first interface, which is an interface between one of the outer resin molded bodies and the intermediate resin molded body, and a second interface, which is an interface between the other outer resin molded body, and the intermediate resin molded body, so as to weld together the two outer resin molded bodies and the intermediate resin molded body. According to this method, irrespective of the positions of the first interface and the second interface in the intake member, the respective resin molded bodies can be positioned relatively and be welded assuredly, to be joined together, by injecting the molten resin into the interfaces. Consequently, the airtightness and joining strength can be secured at the first and second interfaces which can be located at any position. In addition, in a case where the intermediate resin molded body such as a thin portion is held between the two outer resin molded bodies, as the intermediate resin molded body is made to be easily molten again by causing the molten resin to be injected substantially simultaneously into the first and second interfaces situated on both sides of the thin portion, the resin that has been molten again and the injected molten resin mix with each other sufficiently. Thus, a high joining strength can be obtained both at the first and second interfaces when the resins so mixed set. Furthermore, as the two outer resin molded bodies and the intermediate resin molded body can be joined all together, an improvement in productivity and reduction in production costs can be obtained.

In the method of the invention, in the secondary molding process, a resin flow path is formed on the first interface and the second interface by holding the intermediate resin molded body between the two outer resin molded bodies, and the molten resin is injected into the resin flow paths so formed. As, by forming the resin flow paths, the two outer resin molded bodies and the intermediate resin molded body can be positioned relatively and the molten resin is allowed to be injected uniformly to the first and second interfaces, the airtightness and joining strength at the first and second interfaces can be improved.

In the method of the invention, in the secondary molding process, a communication flow path for providing a communication between the resin flow path on the first interface and the resin flow path on the second flow path is formed by a hole which penetrates the intermediate resin molded body. According to this construction, as the amount of the intermediate resin molded body, which is molten again by the heat of the molten resin that flows into the communication flow path from the respective resin flow paths on the first and second interfaces, is increased, the mixing of the resin that has been molten again with the injected molten resin is promoted, whereby the joining strength is improved further. In addition to this, as the molten resins in the respective resin flow paths are connected to each other by way of the molten resin in the communication flow path, after the molten resin in the communication flow path has set, the two outer resin molded bodies are strongly coupled together by way of the resin so set.

In the method of the invention, in a positioning process occurring prior to the injection of the molten resin in the secondary molding process, the intermediate resin molded body is positioned relative to the two outer resin molded bodies by a fixture whereby, as the respective resin molded bodies can be welded together with the intermediate resin molded body being positioned relative to the two outer resin molded bodies with high accuracy, the intermediate resin molded body can be disposed at a predetermined position on the intake member with accuracy.

In the method of the invention, an intake member can be produced which has a plurality of bearings for supporting a rotational shaft of a valve member adapted to open and close an intake passageway at a plurality of locations in an axial direction. In this method, in the positioning process, a plurality of intermediate resin molded bodies, which function as a plurality of bearings, are held on the same axis by a fixture, whereby the degree at which the plurality of intermediate resin molded bodies, and hence the plurality of bearings, are arranged coaxially can be secured.

In general, an intake manifold has a complex shape due to its function to distribute and supply intake air to an engine.

In the method of the invention, an intake manifold is produced as an intake member by the method according to the fourth aspect of the invention. In this method, respective portions of an intake manifold are formed of separate individual resin molded bodies, and the respective resin molded bodies so formed are joined together by the method according to the fourth aspect of the invention, whereby the intake manifold can be produced with ease while enjoying the aforesaid advantage.

As the intake member of the invention is produced by the method according to the fourth aspect of the invention, a high productivity and a low production cost can be realized in producing the intake member and, after the production, the airtightness and joining strength at joining interfaces of the plurality of resin molded bodies can be secured.

The present invention may be more fully understood from the description of preferred embodiments of the invention, as set forth below, together with the accompanying drawings.

BRIEF DESCRIPTION OF THE DRAWINGS

In the drawings;

FIGS. 20A, 20B are cross-sectional views corresponding to FIG. 15, which shows an intake system according to a seventh embodiment of the invention, in which FIG. 20A shows a state in which a secondary molding resin has not yet been packed into a space, and FIG. 20B shows a state in which the secondary molding resin has been packed into the space to thereby form a joint, FIGS. 21A, 21B are cross-sectional views corresponding to FIG. 15, which shows an intake system according to an eighth embodiment of the invention, in which FIG. 21A shows a state in which a secondary molding resin has not yet been packed into a space, and FIG. 21B shows a state in which the secondary molding resin has been packed into the space to thereby form a joint, FIGS. 22A, 22B are cross-sectional views corresponding to FIG. 15, which shows an intake system according to a ninth embodiment of the invention, in which FIG. 22A shows a state in which a secondary molding resin has not yet been packed into a space, and FIG. 22B shows a state in which the secondary molding resin has been packed into the space to thereby form a joint, FIG. 23 is a schematic view showing a casing of an intake system according to a tenth embodiment of the invention, FIGS. 31A, 31B are cross-sectional views explaining the method for producing the intake manifold according to the eleventh embodiment of the invention, which correspond to FIGS. 27, 26, respectively.

DESCRIPTION OF THE PREFERRED EMBODIMENTS

A plurality of embodiments showing a mode for carrying out the invention will be described below based on the accompanying drawings.

First Embodiment

Figure 1:
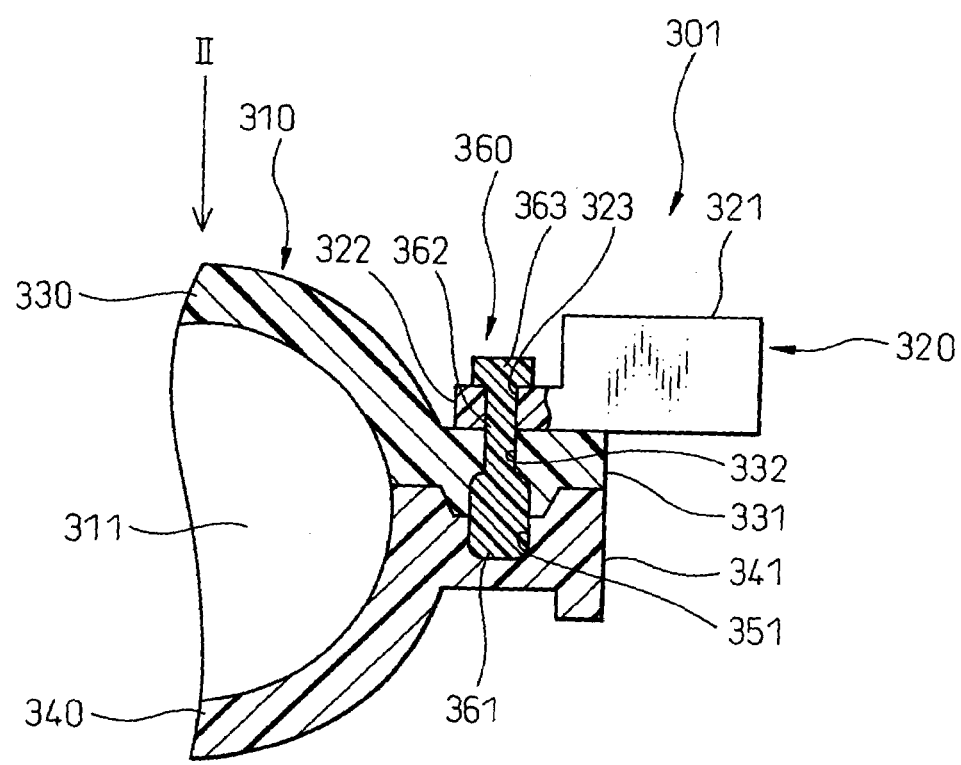
FIG. 1 is a cross-sectional view taken along the line I—I in FIG. 2.

A first embodiment of the invention is shown in FIG. 1. An intake system 301 includes an intake pipe as a tubular portion and a functional part 320. Sensors such as an airflow meter or actuators such as a throttle device are applicable as the functional part.

Figure 2:
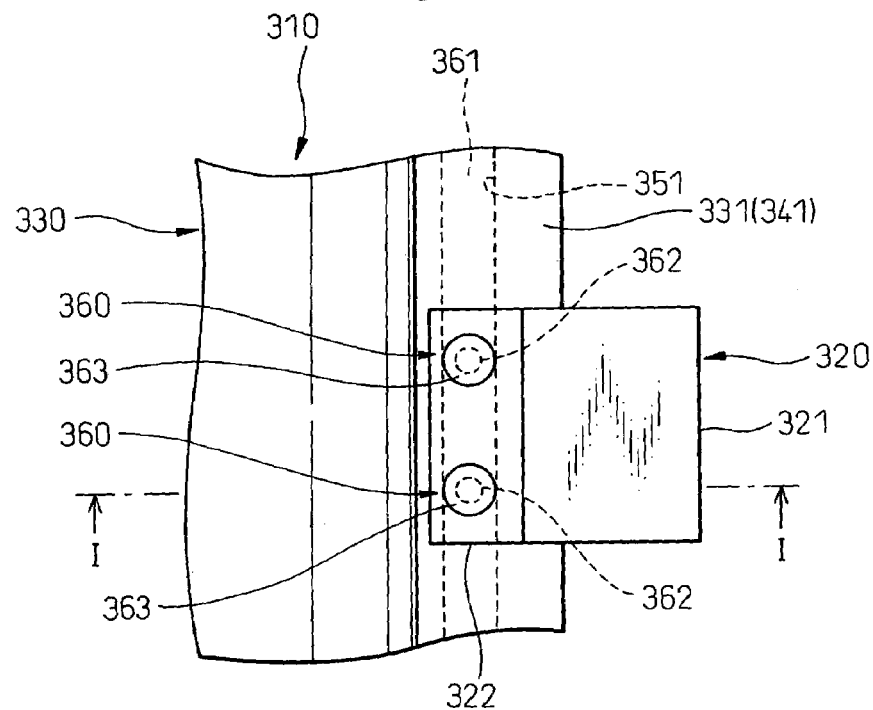
FIG. 2 is an exemplary view of an intake system according to a first embodiment of the invention as seen in a direction indicated by an arrow II in FIG. 1.

An intake pipe (an intake duct) 310 is made up of a half-hollow member 330 and a half-hollow member 340 which are primary molded members. The half-hollow member 330 and the half-hollow member 340 are formed from a first molding resin, respectively. For example, a polyamide resin is used as the first molding resin. The half-hollow member 330 and half-hollow member 340 are joined together to thereby be formed into a cylindrical shape. The half-hollow member 330 and half-hollow member 340 are formed into substantially semi-cylindrical shapes which result when the cylindrical intake pipe 310 is cut along a central axis thereof. The half-hollow member 330 and half-hollow member 340 have an edge portion 331 and an edge portion 341, respectively, which protrude radially outwardly and extend along the central axis of the intake pipe 310, as shown in FIGS. 1 and 2. The half-hollow member 330 and half-hollow member 340 are formed into the integral intake pipe 310 by being joined together at the edge portion 310 and the edge portion 341. An intake passageway 311 through which intake air flows is formed inside the intake pipe 310 which are made up of the half-hollow member 330 and half-hollow member 340 which are made so integral.

Figure 3:
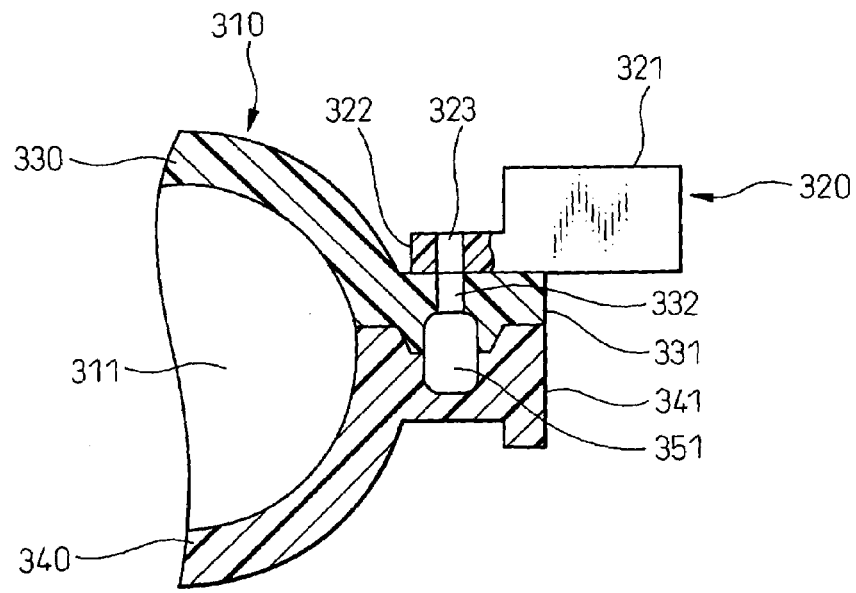
FIG. 3 is a cross-sectional view showing an intake pipe and a functional part of the intake system according to the first embodiment, FIG. 4 a cross-sectional view showing the intake pipe and the functional part which constitute the intake system according to the first embodiment of the invention, and a fixture.

As shown in FIG. 3, the half-hollow member 330 and the half-hollow member 340 form a packing portion 351. The packing portion 351 is formed in the edge portions 331, 341 along the central axis of the intake pipe 310, as shown in FIG. 2. As shown in FIG. 3, a first hole portion 332 which penetrates the edge portion 331 of the half-hollow member 330 is made to communicate with the packing portion 351. The first hole portion 332 is formed in such a manner as to extend radially outwardly of the packing portion 351. The first hole portion 332 provides a communication between the packing portion 351 and the outside of the edge portion 331.

The functional part 320 has a main body 321 and an arm portion 322. As shown in FIGS. 1 to 3, the arm portion 322 extends from the main body 321 toward the central axis of the intake pipe 310. The functional part 320 has a second hole portion 323 which penetrates the arm portion 322 in a thickness direction. The inside diameter of the second hole portion 323 is substantially the same as the inside diameter of the first hole portion 332 formed in the edge portion 331 of the half-hollow member 330. The arm portion 322 of the functional part 320 is superimposed on the edge portion 331 of the half-hollow member 330 in such a manner that the second hole portion 323 and the first hole portion 332 are connected to each other.

As shown in FIG. 1, the half-hollow member 330, the half-hollow member 340 and the functional part 320 are locked together by a lock-shaped portion 360. The lock-shaped portion 360 is formed integrally by a secondary molding resin which welds together the half-hollow member 330 and the half-hollow member 340. The lock-shaped portion 360 has a trunk portion 361, a first neck portion 362 and a first head portion 363. The trunk portion 361 is formed within the packing portion 351 which is formed in the central axis direction of the intake pipe 310 by the half-hollow member 330 and the half-hollow member 340. The first neck portion 362 is formed within the first hole portion 332 formed in the edge portion 331 of the half-hollow member 330 and the second hole portion 323 formed in the arm portion of the functional part 320. The first neck portion 362 is formed when the secondary molding resin, which is packed into the packing portion 351, overflows by way of the first hole portion 332 and the second hole portion 323, and extends radially outwardly of the packing portion 351. The first head portion 363 connects to an end portion of the first neck portion 362 which is situated opposite to an end portion thereof which faces the trunk portion. The outside diameter of the first head portion 363 is formed larger than the outside diameter of the first neck portion 362, that is, the inside diameters of the first hole portion 332 and the second hole portion 323, whereby the lock-shaped portion 360 is formed into a rivet-like shape in which the edge portion 331 of the half-hollow member 330 and the arm portion 322 of the functional part 320 are held between the trunk portion 361 and the first head portion 363.

Next, a method for producing the intake system 310 will be described.

Figure 4:
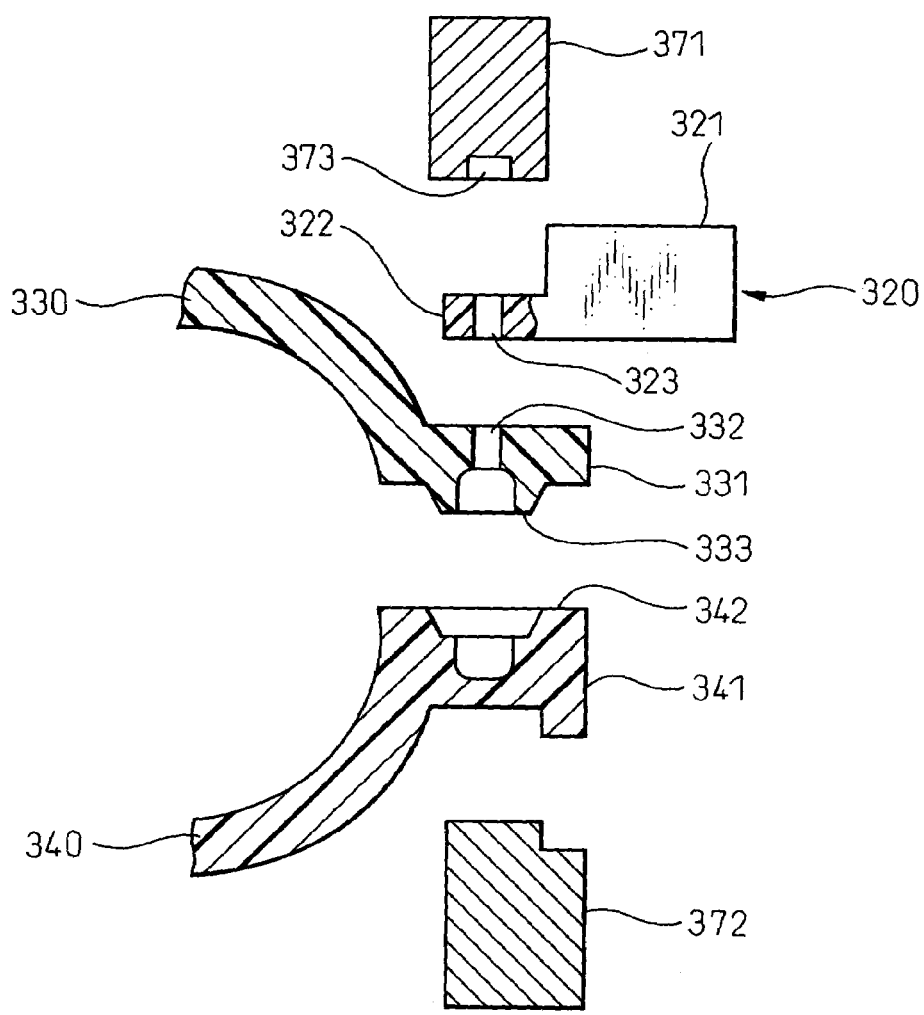

The half-hollow member 330 and half-hollow member 340 are primarily molded from the first molding resin. As shown in FIG. 4, the half-hollow member 330 and half-hollow member 340 are formed into substantially semi-cylindrical shapes which are divided along the central axis of the intake pipe (intake duct) 310. In the half-hollow member 330 and half-hollow member 340 which are so primarily molded, a raised portion 333 formed at the edge portion 331 is fitted in a recessed portion 342 formed in the edge portion 341 which corresponds to the raised portion 333, whereby the half-hollow member 330 and the half-hollow member 340 are temporarily fixed to each other while being positioned relative to each other. The functional part 320 is placed on the edge portion 331 of the half-hollow member 330 which is temporarily fixed. The functional part 320 is placed in such a manner that the second hole portion 323 formed in the arm portion 322 overlaps the first hole portion 332 formed in the edge portion 331 of the half-hollow member 330.

When the functional part 320 is so placed, the arm portion 322 of the functional part 320, the half-hollow member 330 and the half-hollow member 340 are put between a fixture 371 and a fixture 372, whereby the half-hollow member 330, the half-hollow member 340 and the functional part 320 are held by the fixture 371 and the fixture 372. A recessed portion 373 is formed in an end portion of the fixture 371 which faces the half-hollow member 330. The recessed portion 373 corresponds to the shape of the first head portion 363 of the lock-shaped portion 360.

When the half-hollow member 330, the half-hollow member 340 and the functional part 320 are held by the fixture 371 and the fixture 372, a secondary molding resin is packed. The secondary molding resin is formed from a polyamide resin as in the case with the first molding resin. The secondary molding resin is packed into the packing portion 351 along the central axis of the intake pipe 310 in a molten state or a state in which the resin has a fluidity. Inner walls of the edge portion 331 and the edge portion 341 which form the packing portion 351 are molten when the secondary molding resin is packed into the packing portion 351. For example, by using as the secondary molding resin a resin having a melting point which is higher than that of the first molding resin, the inner walls of the edge portion 331 and the edge portion 341 which form the packing portion 351 are molten easily. The inner walls of the edge portion 331 and the edge portion 341 which are so molten mix with the secondary molding resin at a contact portion, and the inner walls are welded together as the secondary molding resin is cooled.

Figure 5:
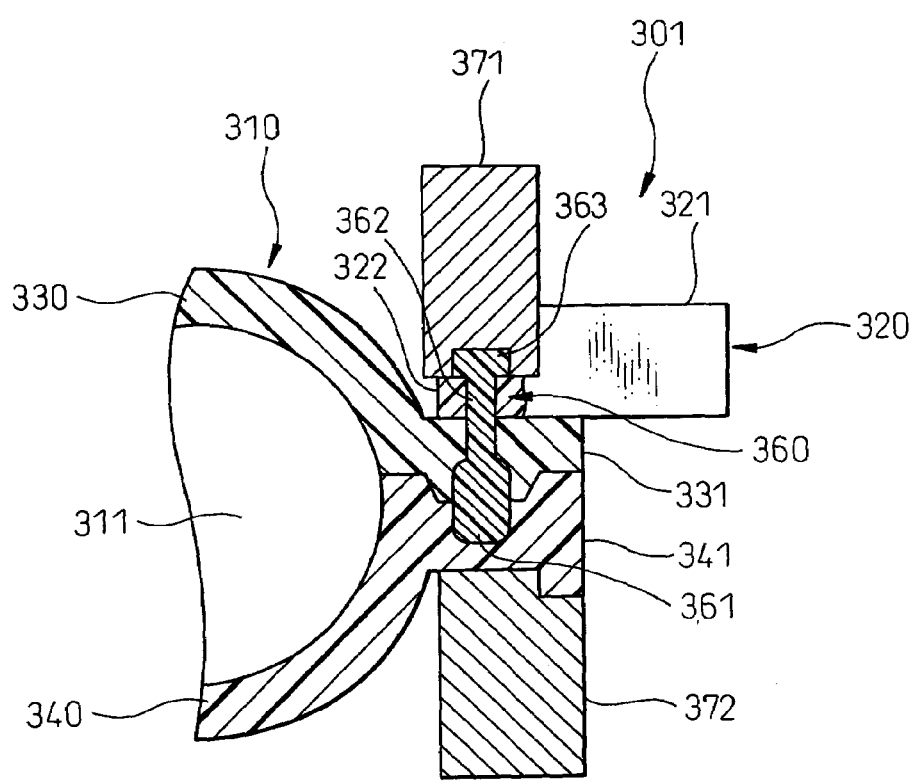
FIG. 5 is a cross-sectional view showing a state in which a secondary molding resin is packed with the fixture being attached to the intake pipe and the functional part in the intake system according to the first embodiment of the invention.

As air exists in the packing portion 351, the air inside the packing portion 351 must be discharged in packing the secondary molding resin into the packing portion 351. Namely, part of the secondary molding resin needs to be caused to overflow to the outside of the packing portion 351 together with the air. In the case of the first embodiment, the air present in the packing portion 351 is discharged to the fixture 371 side by way of the first hole portion 332 communicating with the packing portion 351 and the second hole portion 323. Due to this, part of the secondary molding resin packed into the packing portion 351 overflows, as shown in FIG. 5, and flows as far as the recessed portion 373 in the fixture 371 by way of the first hole portion 332 and the second hole portion 323. The air discharged from the packing portion 351 is discharged to the outside by way of, for example, a boundary between the arm portion 322 and the fixture 371 or a venting means such as a hole formed in the fixture 371.

When the packing of the secondary molding resin has been completed, the secondary molding resin is allowed to set. By allowing the secondary molding resin to set, the inner walls of the edge portion 331 and the edge portion 341 which are molten and the trunk portion 361 of the lock-shaped portion 360, which is formed from the secondary molding resin, are welded together, whereby the half-hollow member 330 and the half-hollow member 340 are joined together. In addition, when the secondary molding resin sets, a lock-shaped portion 360 is formed which has a configuration corresponding to the packing portion 351, the first hole portion 330, the second hole portion 323 and the recessed portion 373. The trunk portion 361 of the lock-shaped portion 360 welds together the half-hollow member 330 and the half-hollow member 340, whereby the half-hollow member 330 and the half-hollow member 340 are joined together. The first neck portion 362 welds with the inner wall of the edge portion 331 which forms the first hole portion 332. Note that in the event that the arm portion 322 of the functional part 320 is formed from a resin having a melting point which is lower than that of the secondary molding resin, the first neck portion 362 welds with an inner wall of the arm portion 322 which forms the second hole portion 323. The secondary resin molding overflowing as far as the recessed portion 373 in the fixture 371 by way of the first hole portion 332 and the second hole portion 323 forms the first head portion 363 of the lock-shaped portion 360, whereby the arm portion 322 of the functional part 320 is put between the trunk portion 361 and the first head portion 363 of the lock-shaped portion 360 together with the edge portion 331 of the half-hollow member 330.

Thus, in the first embodiment that has been described heretofore, in joining together the half-hollow member 330 and the half-hollow member 340 which make up the intake pipe 310, the secondary molding resin that is to be packed into the packing portion 351 is allowed to overflow by way of not only the first hole portion 332 in the half-hollow member 330 but also the second hole portion 323 in the functional part 320, whereby not only the half-hollow member 330 and the half-hollow member 340 are welded together by the secondary molding resin but also the functional part 320 is fixed to the intake pipe 310 by the lock-shaped portion 360 which is formed from the secondary molding resin. Originally, in a case where a primary molded member such as the intake pipe 310 is welded by a secondary molding resin, a hole is needed for allowing the secondary molding resin to overflow. In addition, a plurality of functional parts 320 must be provided on the intake pipe 310. Then, in this first embodiment, the second hole portion 323 of the functional part 320 is connected to the first hole portion 332 adapted for allowing the secondary molding resin to overflow from the packing portion 351, and the first head portion 363 having the outside diameter which is larger than the inside diameter of the second hole portion 323 is formed on the side of the second hole portion 323 which is opposite to the side thereof which faces the first hole portion 332, whereby the functional part 320 is attached to the intake pipe 310 at the same time that the half-hollow member 330 and the half-hollow member 340 are joined together. Due to this, the formation of the intake pipe 310 and the attachment of the functional part 320 do not have to be implemented in different processes. Consequently, the number of processes can be decreased.

In the first embodiment, as the functional part 320 is attached to the intake pipe 310 by the lock-shaped portion 360 formed by the secondary molding resin, a fastening member such as a tapping screw or a bolt is not required. The lock-shaped portion 360 is welded to the half-hollow member 330 and the half-hollow member 340 at the trunk portion 361 and to the half-hollow member 330 at the first neck portion 362. Namely, the functional part 320 is attached to the intake pipe 310 by virtue of a welding force acting between the half-hollow member 330 and the half-hollow member 340 and the lock-shaped portion 360. Due to this, being different from a case where a fastening member such as a tapping screw or a bolt is used, the occurrence of loosening of such a fastening member, by the vibration of the intake pipe 310, is prevented. In addition, as the functional part 320 is attached to the intake pipe 310 by the lock-shaped portion 360, even if the number of functional parts 320 to be attached is increased, hole portions corresponding to the first hole portion 332 and the second hole portion 323 only have to be formed. Due to this, being different from the case where the fastening member is used, even if the number of functional parts 320 is increased, there is no case where the number of components is increased.

In the first embodiment, the lock-shaped portion 360 is formed such that the outside diameter of the first neck portion 362 is smaller than the outside diameters of the trunk portion 361 and the first head portion 363. By decreasing the outside diameter of the first neck portion 362, a contact area between the trunk portion 361 and the inner walls of the half-hollow member 330 and the half-hollow member 340 is enlarged. Due to this, a welding area between the trunk portion 361 and the half-hollow member 330 and the half-hollow member 340 is enlarged. Consequently, the half-hollow member 330 and the half-hollow member 340 can be joined together strongly. In addition, by making the outside diameter of the first neck portion 362 smaller than the outside diameter of the first head portion 363, the dislocation of the functional part 320 is prevented at the first head portion 363. Consequently, the functional part 320 can be attached to the intake pipe 310 strongly.

Second Embodiment

Figure 6:
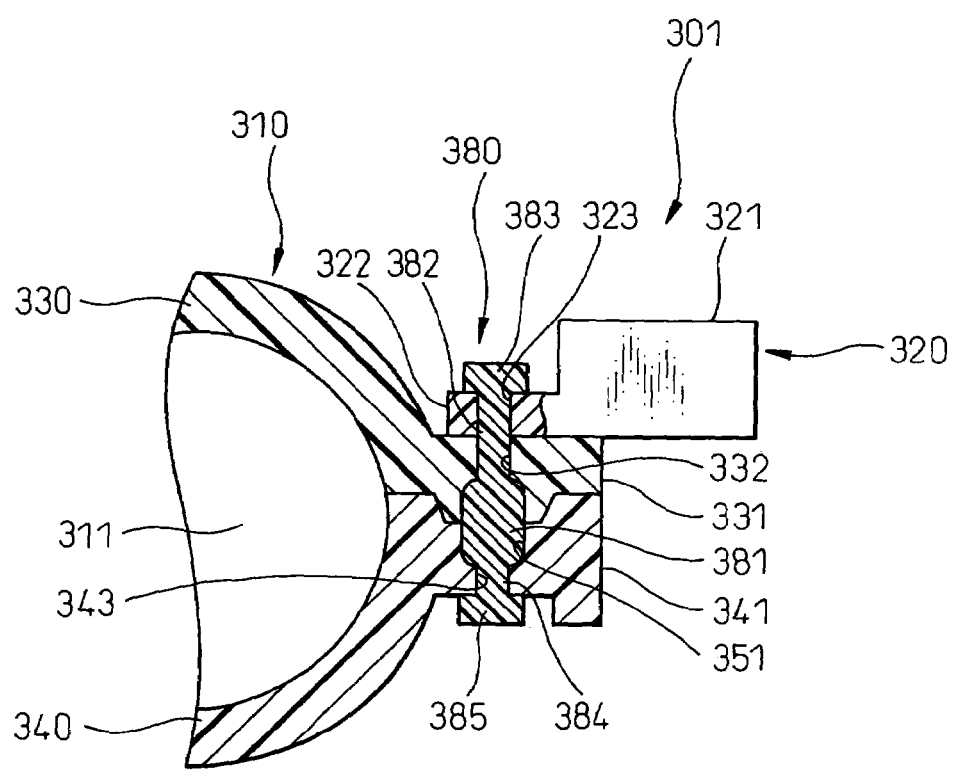
FIG. 6 is a cross-sectional view showing an intake system according to a second embodiment of the invention.

An intake system according to a second embodiment of the invention is shown in FIG. 6. Note that like reference numerals are given to substantially like constituent locations described in the first embodiment, and the description thereof will be omitted.

In the case of the second embodiment, as shown in FIG. 6, a lock-shaped portion 380 has a second neck portion 384 and a second head portion 385 in addition to a first neck portion 382 extending from a trunk portion 381 and a first head portion 383. Namely, the lock-shaped portion 380 has the second neck portion 384 and the second head portion 385 which are formed from the trunk portion 381 in a different direction from a direction in which the first neck portion 382 and the first head portion 383 are formed. In the second embodiment, the first neck portion 382 and the second neck portion 384 generally form an angle of 180° therebetween. In addition, a third hole portion 343 corresponding to the second neck portion 384 is formed in a half-hollow member 340.

A secondary molding resin that is packed into a packing portion 351 overflows from the packing portion 351 to not only a first neck portion 382 side but also a second neck portion 384 side, whereby not only the half-hollow member 330 and the half-hollow member 340 are joined together by the secondary molding resin in the packing portion 351 but also the half-hollow member 330, the half-hollow member 340 and a functional part 320 are held by the first head portion 383 and the second head portion 385 of the lock-shaped portion 380.

In the second embodiment, the half-hollow member 330, the half-hollow member 340 and the functional part 320 can be fixed together more strongly by forming the second neck portion 384 in the different direction from the direction in which the first neck portion 382 is formed.

Figure 7:
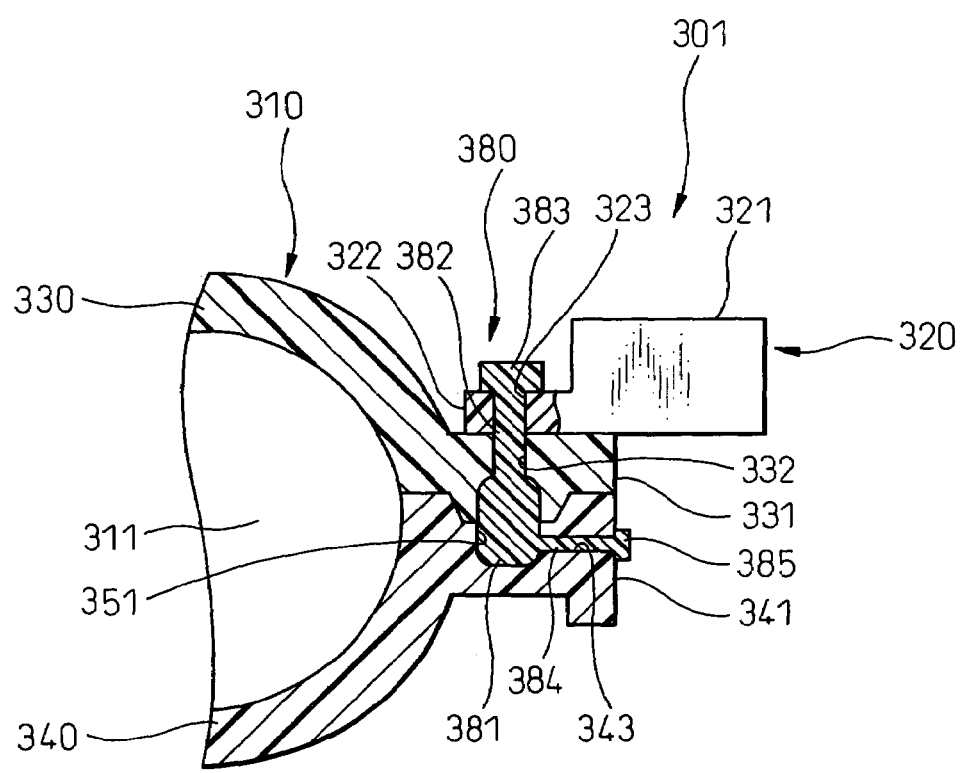
FIG. 7 is a cross-sectional view showing a modification to the intake system according to the second embodiment of the invention.

In the second embodiment, while an example where the lock-shaped portion 380 is formed such that the first neck portion 382 and the second neck portion 384 forms generally the angle of 180° therebetween is shown, the lock-shaped portion 380 may be formed such that the first neck portion 382 and the second neck portion 384 forms generally an angle of 90° therebetween, as shown in FIG. 7. Note that the first neck portion 382 and the second neck portion 384 may be formed at any angle other than 90° and 180°, whereby the second neck portion 384 can be formed at an appropriate position in consideration of the shapes and positions of an intake pipe 310 and the functional part 320.

In addition, in the second embodiment, the second neck portion 384 is formed on an extension of the first neck portion 382. However, the first neck portion 382 may be formed in such a manner as to deviate from the second neck portion 384 in a centrally axial direction of the intake pipe (the intake duct) 310.

Third Embodiment

Figure 8:
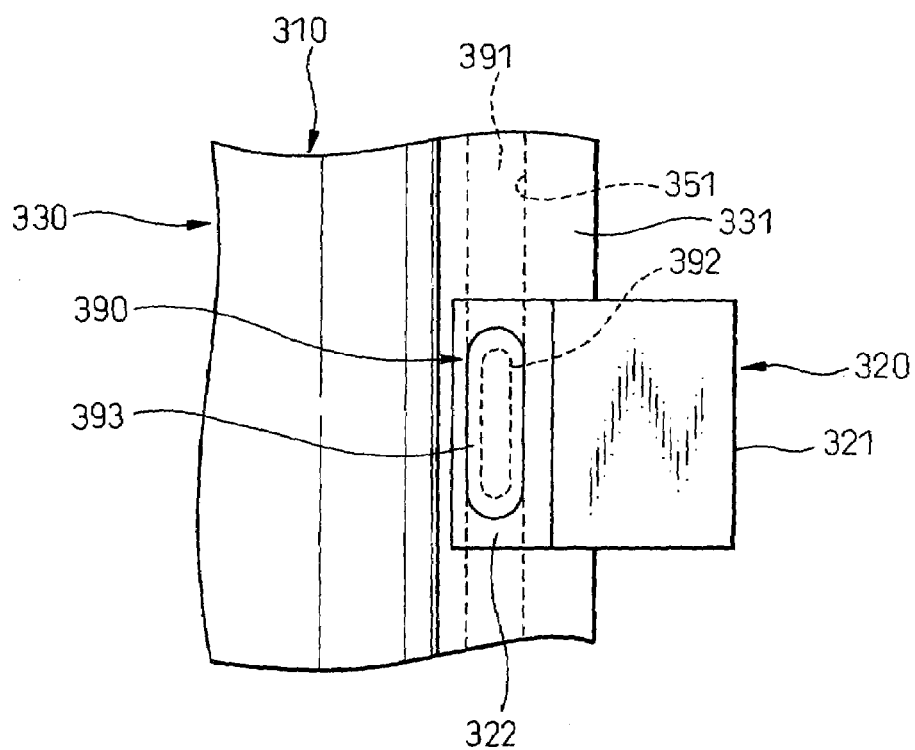
FIG. 8 is an exemplary view corresponding to FIG. 1, which illustrates an intake system according to a third embodiment of the invention.

An intake system according to a third embodiment of the invention is shown in FIG. 8. Note that like reference numerals are given to substantially like constituent locations described in the first embodiment, and the description thereof will be omitted.

Figure 9:
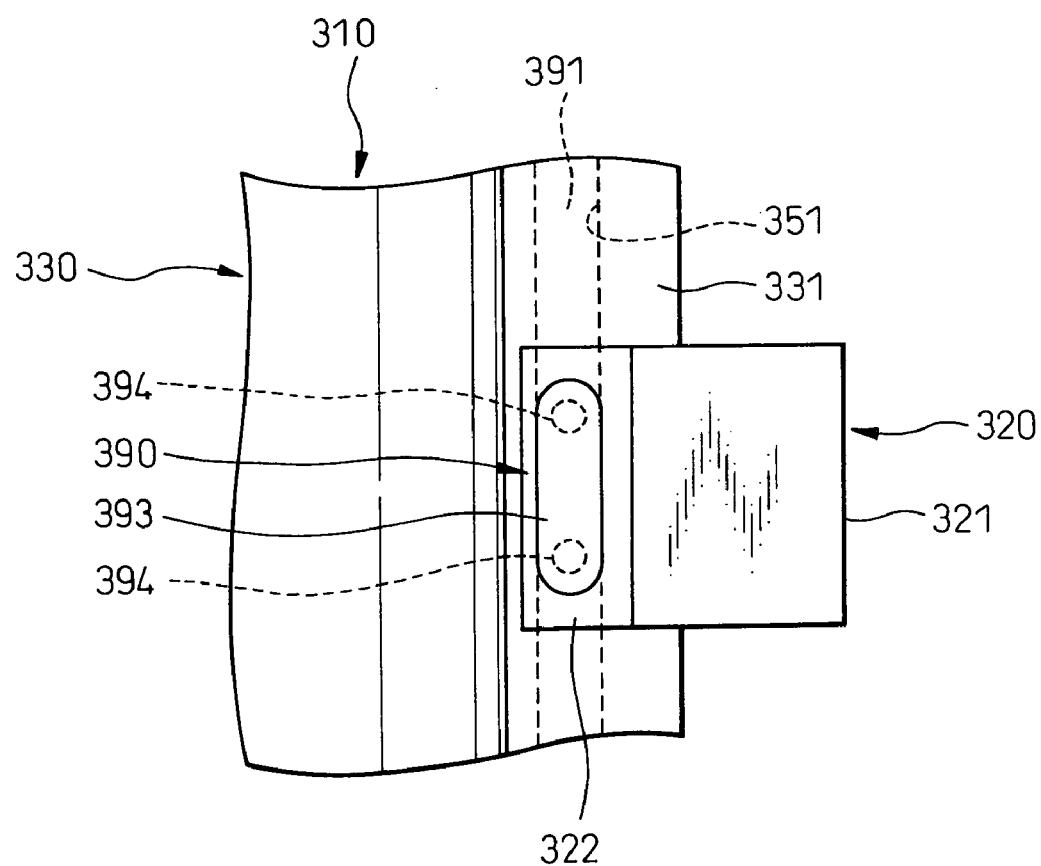
FIG. 9 is an exemplary view corresponding to FIG. 1, which illustrates a modification to the intake system according to the third embodiment of the invention.

In the case of the third embodiment, as shown in FIG. 8, a first head portion 393 of a lock-shaped portion 390 is formed in such a manner as to extend in a direction of central axis of an intake pipe (an intake duct) 310. A first neck portion 392 extends in a direction along the central axis of the induction pipe 310 according to the shape of the first head portion 393. In addition, as shown in FIG. 9, a plurality of first neck portions 394 may be formed in the direction of central axis of the intake pipe 310 so that a trunk portion 391 and the first head portion 393 are connected to each other at a plurality of positions.

In the third embodiment, as the first head portion 393 of the lock-shaped portion 390 is expanded, a functional part 320 can be fixed to the intake pipe 310 more strongly.

Fourth Embodiment

Figure 10:
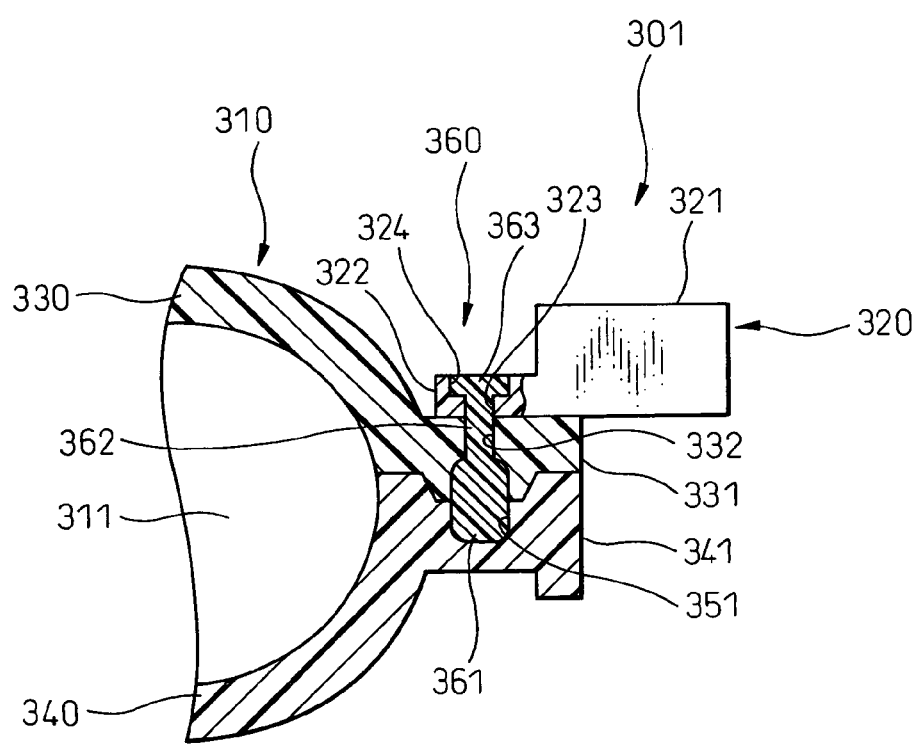
FIG. 10 is a cross-sectional view showing an intake system according to a fourth embodiment of the invention.

An intake system according to a fourth embodiment is shown in FIG. 10. Note that like reference numeral are given to substantially like constituent locations described in the first embodiment, and the description thereof will be omitted.

In the case of the fourth embodiment, as shown in FIG. 10, an arm portion 322 of a functional part 320 has an expanded hole portion 324 in addition to a second hole portion 323. The second hole portion 323 is formed as far as an intermediate position along the length of a thickness direction of the arm portion 322, and the expanded hole portion 324 is connected to an end portion of the second hole portion 323 at an end of the second hole portion 323 which is opposite to an end thereof which faces a first hole portion. Namely, the hole portions formed in the arm portion 322 are stepped, whereby a first neck portion 362 of a lock-shaped portion 360 is formed at a position corresponding to the first hole portion 332 in a half-hollow member 330 and the second hole portion 323 in a functional part 320, and a first head portion 363 of the lock-shaped portion 360 is formed at a position corresponding to the expanded hole portion 324.

In the fourth embodiment, the first head portion 363 of the lock-shaped portion 360 is embedded in the arm portion 322 of the functional part 320 and hence does not protrude to the outside of the arm portion 322. In addition, a contact area between an inner wall of the arm portion 322 and a secondary molding resin that is packed into the expanded hole portion 324, is expanded. Due to this, in a case where the arm portion 322 is formed from a resin which can be welded to the secondary molding resin, a welding area is expanded. Consequently, the arm portion 322 and the lock-shaped portion 360 can be welded together assuredly and strongly.

In the embodiments that have been described heretofore, while the examples are described where the invention is applied to the intake systems in which the functional part is disposed on one side of the intake pipe (the intake duct), the invention can also be applied to an intake system in which a functional part is disposed on both sides of an intake pipe or a functional part is disposed on a side of an edge portion which is opposite to a side thereof which faces an intake passageway. In addition, the embodiments that have been described individually may be combined in any way for application.

Fifth Embodiment

Figure 11:
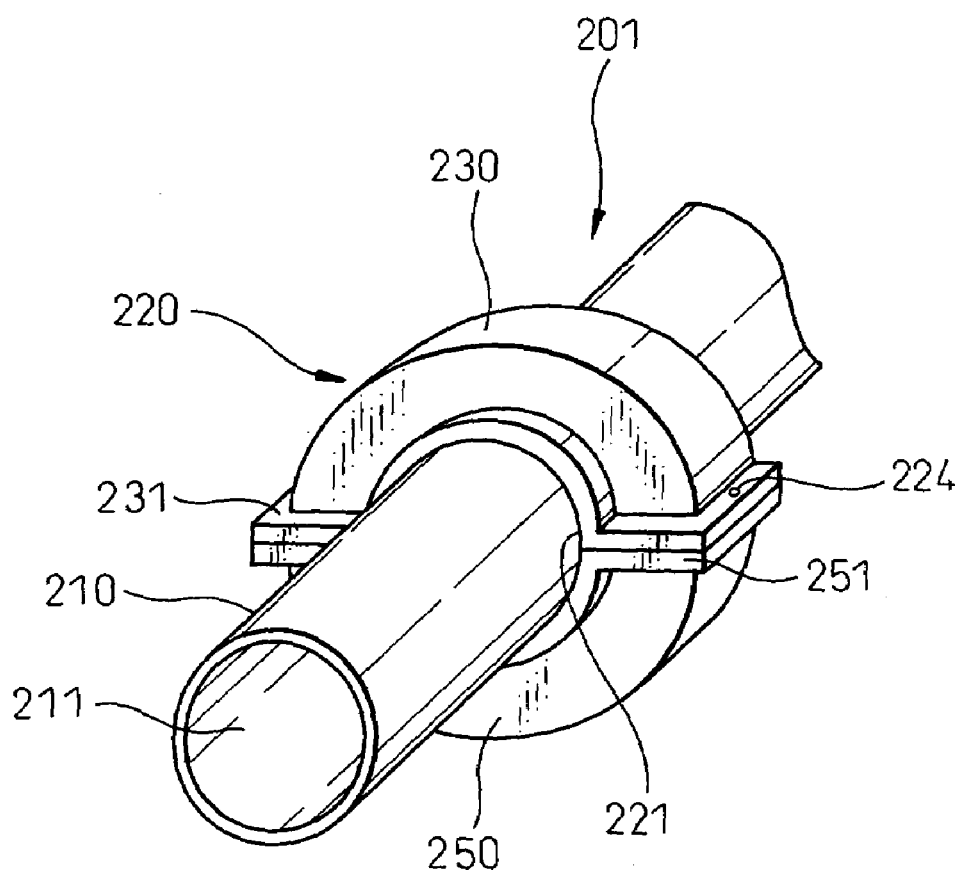
FIG. 11 is a perspective view showing an intake system according to a fifth embodiment of the invention.

An intake system according to a fifth embodiment is shown in FIG. 11. An intake system 201 includes an intake duct (an intake pipe) 210 and a casing 220 which cooperates with the intake duct 210 to form a resonator. The intake duct 210 is formed into a cylindrical shape which forms an intake passageway 211. As an example, the intake duct 210 connects to an air cleaner, not shown, at one end portion thereof and to a throttle, not shown, at the other end portion. Intake air that has passed through the air cleaner flows to the throttle by way of the intake passageway 211. A flow rate of intake air is adjusted at the throttle. The intake air whose flow rate has been so adjusted is then supplied to each cylinder of an engine by way of an intake manifold, not shown.

Figure 12:
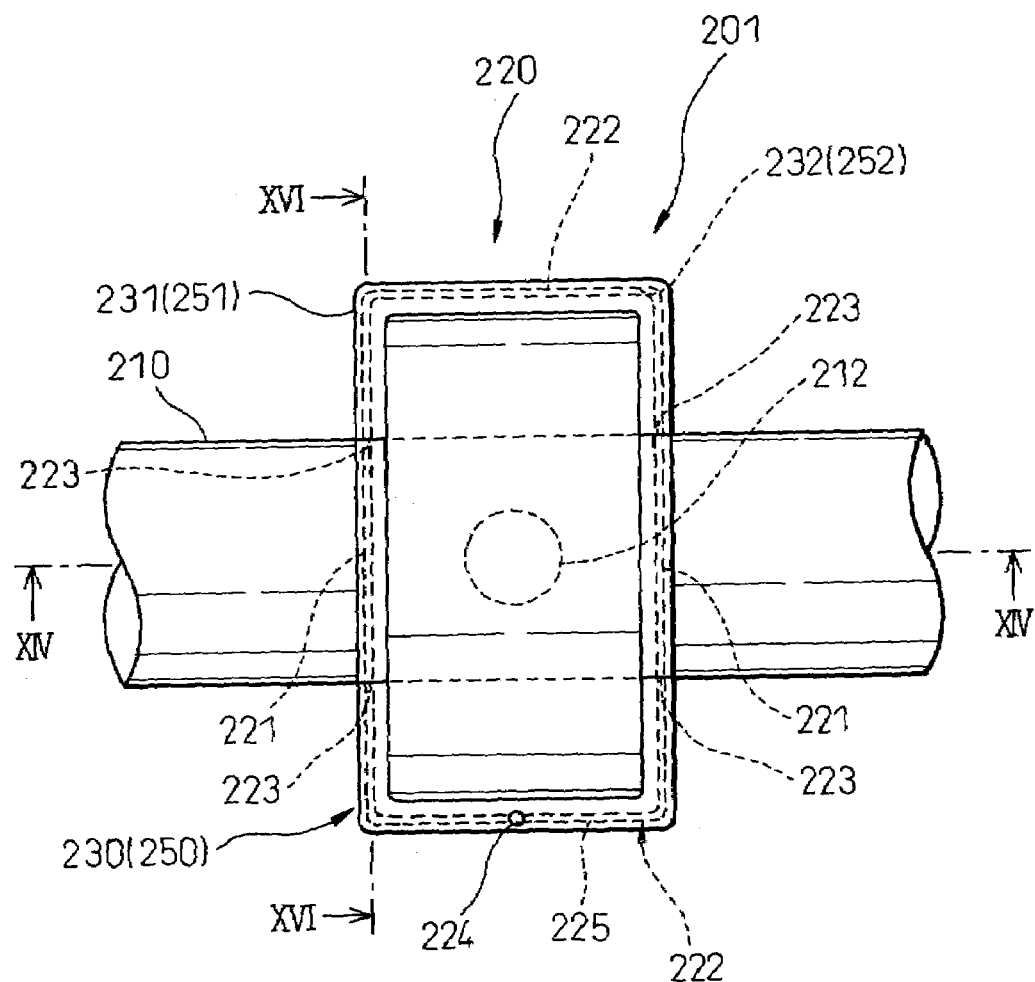
FIG. 12 is a schematic plan view showing the intake system according to the fifth embodiment of the invention.

The intake duct 210 is formed into a cylindrical shape and from resin. As shown in FIGS. 12 and 213, the intake duct 210 has a cylindrical circumferential wall and a generally circular opening 212. The opening 212 extends through the circumferential wall of the intake duct 210 so as to provide a communication between the intake passageway 211 and the outside of the intake duct 210.

Figure 13:
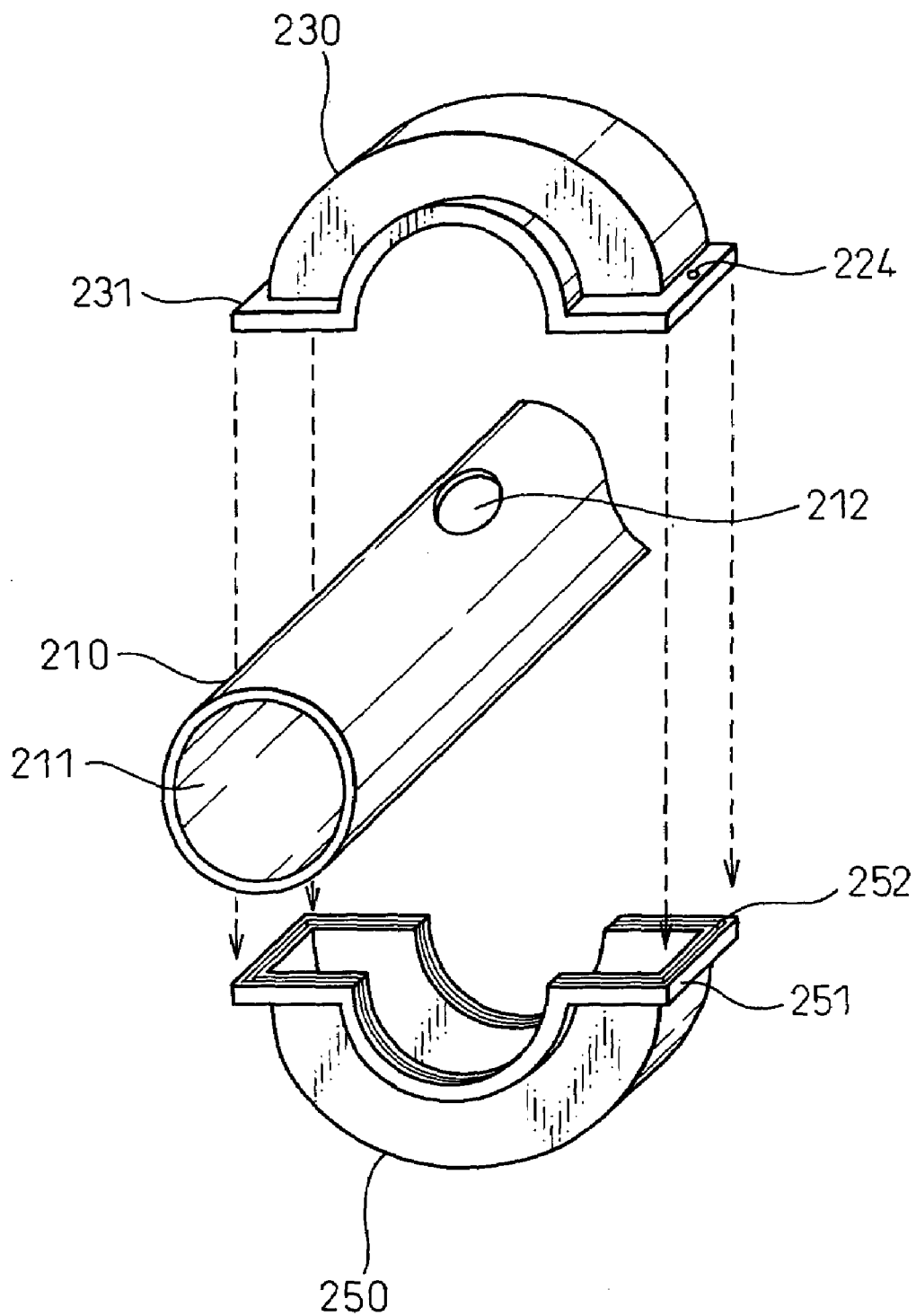
FIG. 13 is an exploded perspective view showing the construction of the intake system according to the fifth embodiment of the invention.

As shown in FIG. 11, the casing 220 is formed into a cylindrical shape and made from resin and is provided radially outwardly of the intake duct 210. The casing 220 is attached at a position where the casing 220 covers the opening 212 in the intake duct 210, whereby a resonator is formed between the intake duct 210 and the casing 220. As shown in FIG. 13, the casing 220 is divided into two by a plane containing a central axis of the intake duct 210, whereby the casing 220 has two piece portions such as a piece portion 230 and a piece portion 250 which are formed into substantially the same shape. As the casing is formed into the cylindrical shape, the two piece portions 230 and 250 are each formed into a semi-cylindrical shape.

As shown in FIG. 11, by joining together the piece portion 230 and the piece portion 250, the cylindrical casing 220 is formed which has in a central portion thereof a hole portion 221 which penetrates therethrough in an axial direction thereof. By joining together the piece portion 230 and the piece portion 250 in such a manner as to hold therebetween the intake duct 210 from the outside in the radial direction of the intake duct 210 as shown in FIG. 13, a state is realized in which the intake duct 210 is passed through the hole portion 221 as shown in FIG. 11.

As shown in FIG. 13, the piece portion 230 has, at an end portion on a side thereof which faces the piece portion 250, a flange portion 231 which protrudes outwardly along the end portion. Similarly, the piece portion 250 has, at an end portion on a side thereof which faces the piece portion 230, a flange portion 251 which protrudes outwardly along the end portion. Thus, when the casing 220 including the piece portion 230 and the piece portion 250 is attached to the intake duct 210, the piece portion 230 and the piece portion 250, and the piece portion 230 or the piece portion 250 and the intake duct 210 are brought into contact with each other at the flange portions 231, 251, respectively.

Figure 14:
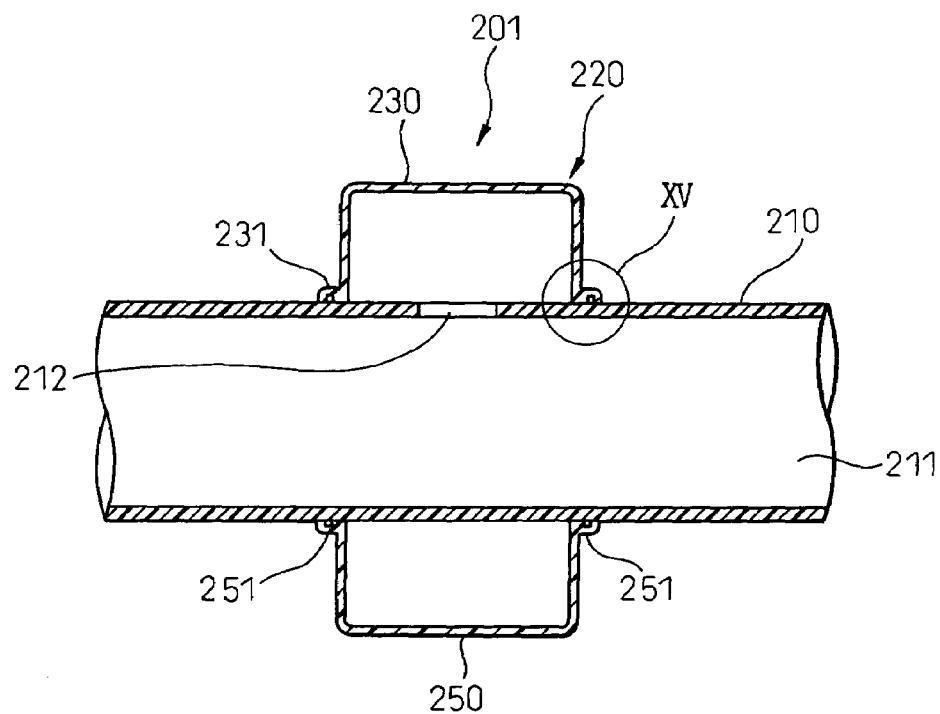
FIG. 14 is a cross-sectional view taken along the line XIV—XIV in FIG. 12.
Figure 15:
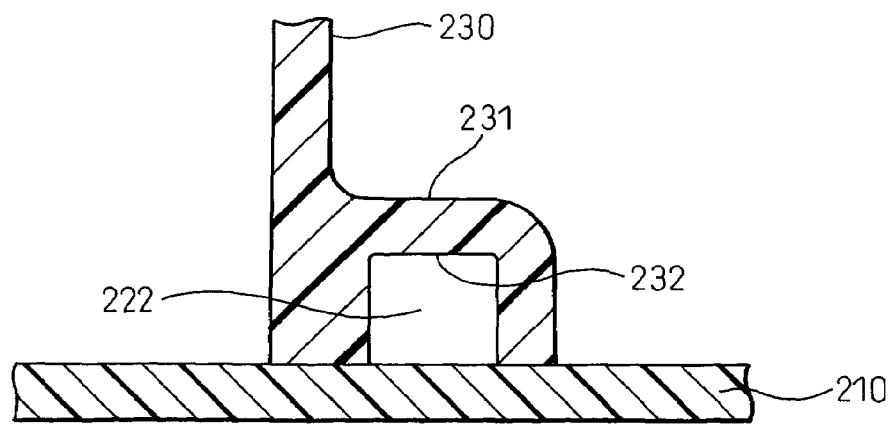
FIG. 15 is an enlarged cross-sectional view of a portion indicated by reference character XV in FIG. 14, which illustrates a state in which the secondary molding resin has not yet been packed into a space.

As shown in FIGS. 14 and 15, a recessed groove 232 which is set back in the thickness direction is formed in the flange portion 231 of the piece portion 230. The recessed groove 232 is formed along the flange portion 231 as shown in FIG. 12. Similarly, a recessed groove 252 is formed in the flange portion 251 of the piece portion 250. The recessed grooves 232, 252 which are formed in the piece portion 230 and the piece portion 250, respectively, are formed in such a manner as to extend circumferentially to the intake duct 210 at both axial end portions of the casing 220 and to extend along the shapes of the piece portion 230 and the piece portion 250, as shown in FIGS. 12 and 16.

Figure 16:
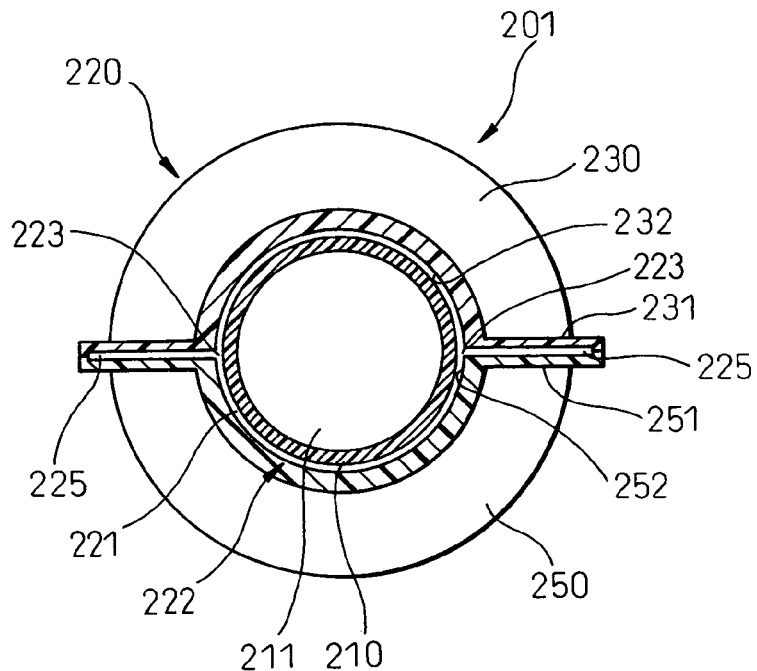
FIG. 16 is a cross-sectional view taken along the line XVI—XVI in FIG. 12, which illustrates a state in which the secondary molding resin has not yet been packed into the space.

By forming the recessed grooves 232, 252 in the flange portions 231, 251, respectively, when the casing 220 is attached to the intake duct 210, a space portion 322 is formed between the piece portion 230 and the piece portion 250 and between the piece portion 230 or the piece portion 250 and the intake duct 210 as shown in FIG. 16. The space portion 322 includes a first space portion 221, which is formed in such a manner as to extend continuously in the circumferential direction of the intake duct 210, and a second space portion 225 which is formed in such a manner as to extend along the contours of the piece portion 230 and the piece portion 250 as in the case with the recessed grooves 232, 252. As shown in FIG. 12, the first space portion 221 and the second space portion 225 communicate with each other at four intersecting portions 223. Consequently, the first space portion 221 and the second space portion 225 forms the single communicating space portion 222.

Figure 17:
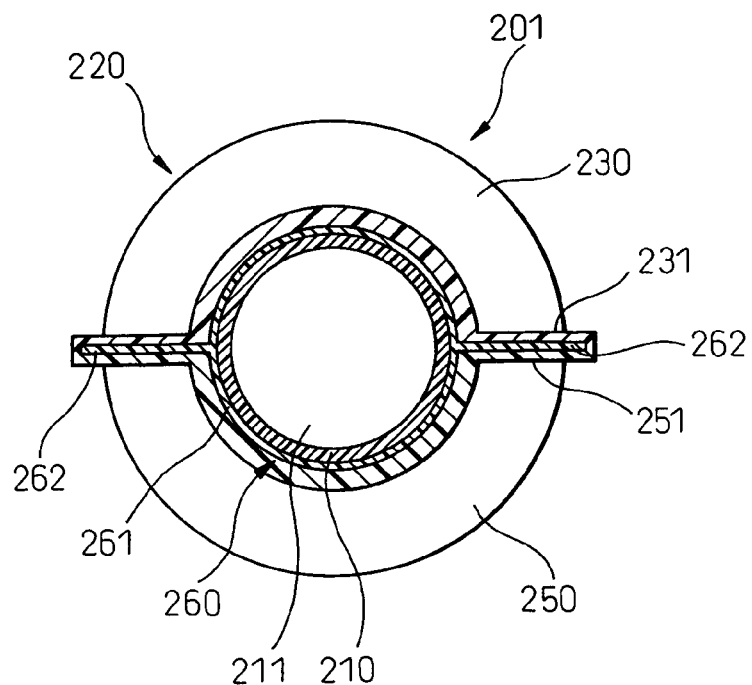
FIG. 17 is a cross-sectional view taken along the same position as that in FIG. 16, which illustrates a state in which the secondary molding resin has been packed into the space and a joint is formed.
Figure 18:
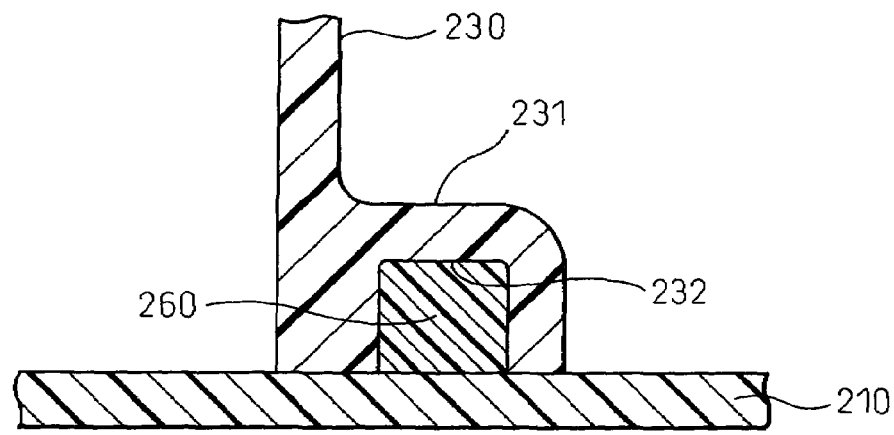
FIG. 18 is a cross-sectional view taken along the same position as that in FIG. 15, which illustrates a state in which the secondary molding resin has been packed into the space and a joint is formed.

As shown in FIGS. 17 and 18, a secondary molding resin is packed into the space portion 222 which is formed between the piece portion 230 and the piece portion 250 and between the piece portion 230 or the piece portion 250 and the intake duct 210, whereby a joint 260 is formed. The joint 260 is formed from the secondary molding resin which is formed from a resin made from the same material as that of the casing 220 constituted by the piece portion 230 and the piece portion 250, and that of the intake duct 210. The intake duct 210 and the casing 220 which form the space portion 222 are molten when the secondary molding resin in a molten state is packed into the space portion 222 so as to be welded to the secondary molding resin which forms the joint 260. As a result, the piece portion 230 and the piece portion 250, and the piece portion 230 or the piece portion 250 and the intake duct 210 are joined together by the joint 260.

As shown in FIG. 11, an injection port 224 communicating with the space portion 222 is formed in the casing 220. The injection port 224 is formed in the piece portion 230 or the piece portion 250 at a single or a plurality of positions. In the case of this embodiment, the injection port 224 is formed in the piece portion 230 at a single position, whereby, when a resin is injected into the injection port 224, the resin so injected is then packed into the first space portion 221 and the second space portion 225.

In the case of the fifth embodiment, as a resin packed from the injection port 224, a resin having the same material as the resin forming the intake duct 210 and the casing 220 is used. The resin is heated to a state in which the resin is molten as the secondary molding resin or to a temperature which is equal to or higher than a melting point thereof and is then injected from the injection port 224 in a state in which it is having the fluidity. Thus, the resin injected from the injection port 224 is then packed into the space portion 222 while melting wall surfaces of the intake duct 210 and the casing 220 which form the space portion 222. The molten wall surfaces of the intake duct 210 and the casing 220 are welded with the secondary molding resin so as to make a complex joint. Then, when the secondary molding resin is cooled and sets, the piece portion 230 and the piece portion 250, and the piece portion 230 or the piece portion 250 and intake duct 210 are joined together strongly via the secondary molding resin at the joint 260 strongly. In addition, the piece portion 230 and the piece portion 250, and the piece portion 230 or the piece portion 250 and intake duct 210 are tightly sealed by the joint 261. The secondary molding resin packed into the first space portion 221 forms a first joint 261 which extends continuously in the circumferential direction of the intake duct 210. In addition, the secondary molding resin packed into the second space portion 225 forms a second joint 262 along the contours of the piece portion 230 and the piece portion 250.

As shown in FIG. 11, as the casing 220 is divided into the piece portion 230 and the piece portion 250, the intake duct 210 is put between the piece portion 230 and the piece portion 250 from the outside in the radial direction to be attached in place. The piece portion 230 and the piece portion 250 are made smaller in size by dividing the casing 220. Due to this, even in the event that there is no extra space around the intake duct 210, the casing 220 including the piece portion 230 and the piece portion 250 which are divided separately can be attached to the intake duct 210 easily. In addition, even in the event that the intake duct 210 is formed into a winding shape, the casing 220 can be attached to a desired position on the intake duct 210 by putting the intake duct 210 in the casing 220 so divided. The piece portion 230 and the piece portion 250 are attached to the intake duct 210 and are then temporarily fixed thereto, and the secondary molding resin is then packed into the space portion 222 from the injection port 224, whereby the piece portion 230 and the piece portion 250, and the piece portion 230 or the piece portion 250 and the intake duct 210 are welded together.

In the fifth embodiment, the casing 220 is divided into the piece portion 230 and the piece portion 250. The casing 220 is attached to the intake duct 210 by putting the intake duct 210 between the piece portion 230 and the piece portion 250 which are so divided. Due to this, the casing 220 can easily be attached to the intake duct 210 despite the configuration of the intake duct 210 and the configuration and size of the space formed around the periphery of the intake duct 210. Consequently, the degree of freedom in designing the intake system 201 can be increased.

In addition, in the fifth embodiment, the piece portion 230 and the piece portion 250 which constitute the casing 220, and the piece portion 230 or the piece portion 250 and the intake duct 210 are welded together by the secondary molding resin at the joint 223. Due to this, the piece portion 230 and the piece portion 250, and the piece portion 230 or the piece portion 250 and the intake duct 210 are sealed assuredly by the joint 223, whereby no other member for fixing the casing 220 to the intake duct 210 is required. Consequently, the number of components and a space required for placing the casing 220 can be reduced.

In the fifth embodiment, the piece portion 230 and the piece portion 250, and the piece portion 230 or the piece portion 250 and the intake duct 210 are assuredly sealed by the joint 260 and are strongly fixed together by the joint 260. Due to this, the leakage of intake air from between the piece portion 230 and the piece portion 250 and between the piece portion 230 or the piece portion 250 and the intake duct 210 is prevented. Consequently, noise generated by the flowing intake air can be reduced.

In the fifth embodiment, the attachment of the casing 220 to the intake duct 210 is completed according to a procedure in which the piece portion 230 and the piece portion 250 are attached to the intake duct 210, and then the secondary molding resin is packed into the joint 260. Consequently, the number of processes for assembling can be reduced.

Sixth Embodiment

Figure 19:
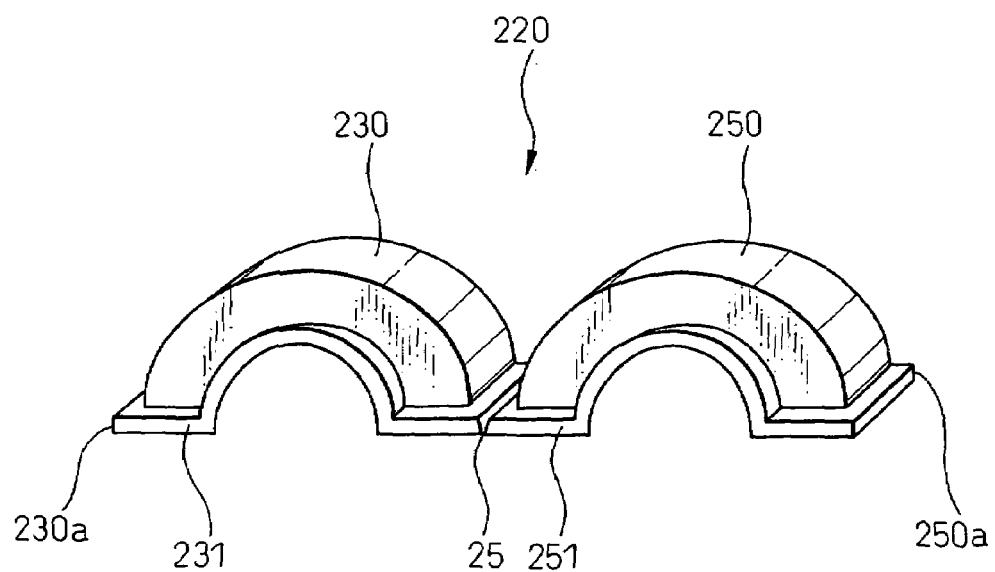
FIG. 19 is a schematic perspective view showing a casing of an intake system according to a sixth embodiment of the invention.

A casing for an intake system according to a sixth embodiment of the invention is shown in FIG. 19. Note that like reference numerals are given to substantially like constituent locations to those described in the fifth embodiment, and the description thereof is omitted.

In the case of the sixth embodiment, as shown in FIG. 19, a piece portion 230 and a piece portion 250 which constitute a casing 220 are connected to each other by a hinge portion 25. The hinge portion 225 is formed from a resin having the same material as that of the piece portion 230 and the piece portion 250. As the hinge portion 25 is formed thinner than the piece portion 230 and the piece portion 250, the hinge portion 25 is flexible and can be bent or folded freely. In the case of this embodiment, when the piece portion 230 and the piece portion 250 are folded from the hinge portion 25, an end portion 230a of the piece portion 230, which is opposite to an end portion thereof which faces the hinge portion 225, and an end portion 250a of the piece portion 250, which is opposite to an end portion thereof which faces the hinge portion 25, are made to face each other, whereby the cylindrical casing 220 is formed. Namely, while the piece portion 230 and the piece portion 250 are being folded from the hinge portion 25, an intake duct 210 is put between the piece portion 230 and the piece portion 250, whereby the casing 220 is attached to the intake duct 210 as shown in FIG. 11.

In the sixth embodiment, the piece portion 230 and the piece portion 250 are formed integrally by the hinge portion 225. Due to this, even if the casing 220 is divided into the piece portion 230 and the piece portion 250, an increase in number of components is not called for. In addition, when assembling the casing 220, the dislocation of one of the piece portions from the other piece portion is prevented, the assembling of the casing 220 can be facilitated.

Seventh, Eighth and Ninth Embodiments

Figure 20A:
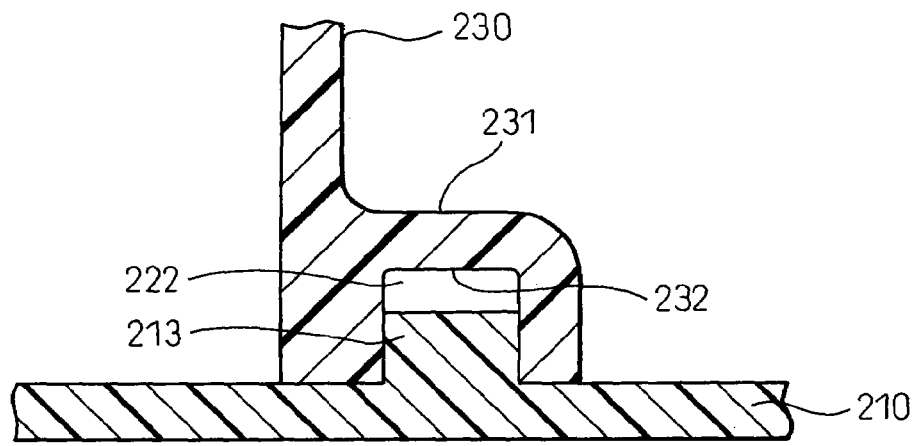
Figure 20B:
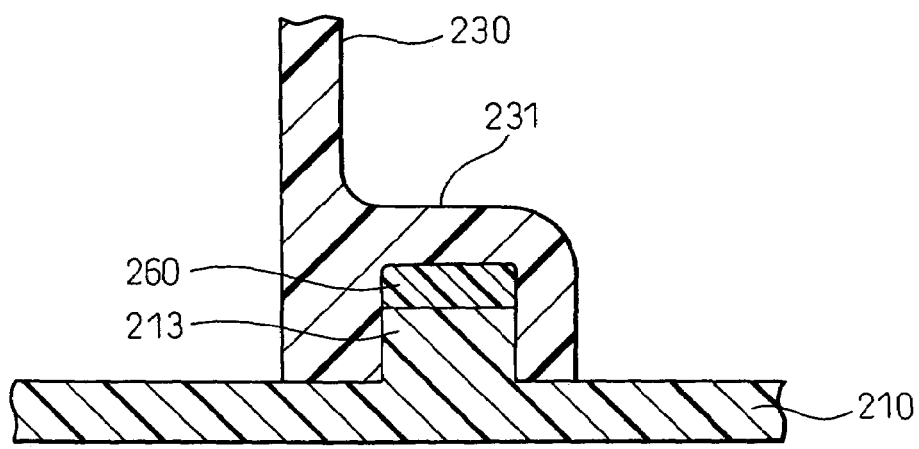
Figure 21A:
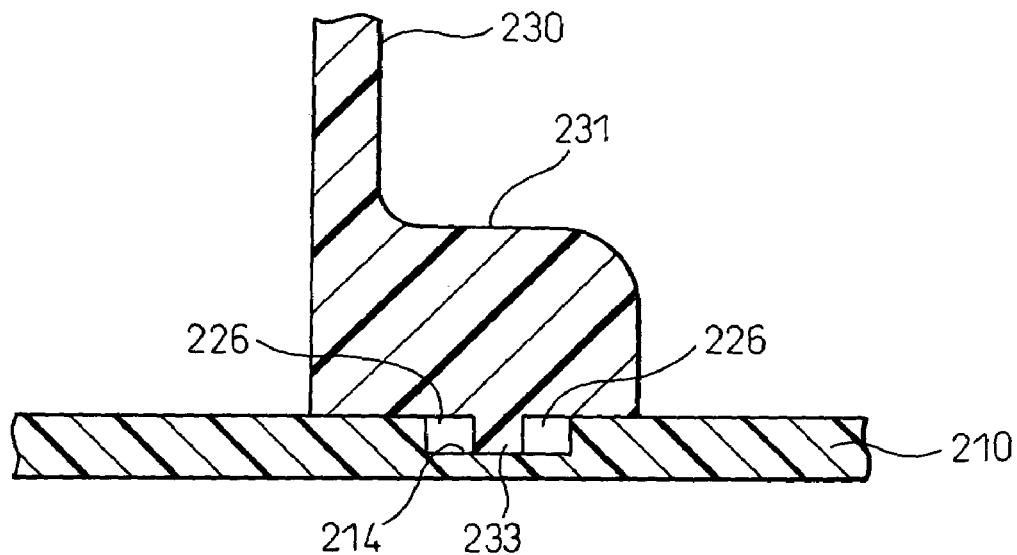
Figure 21B:
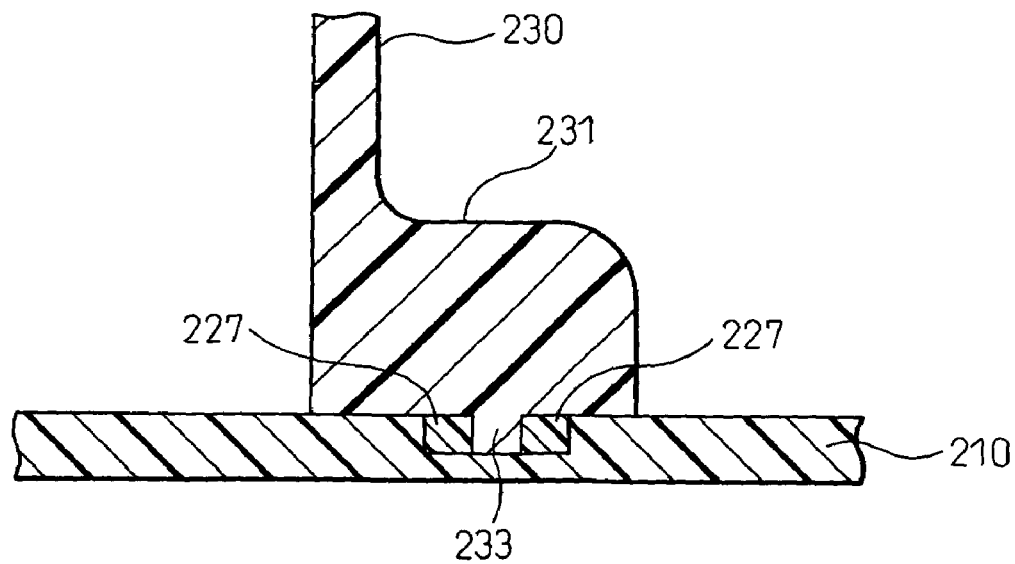
Figure 22A:
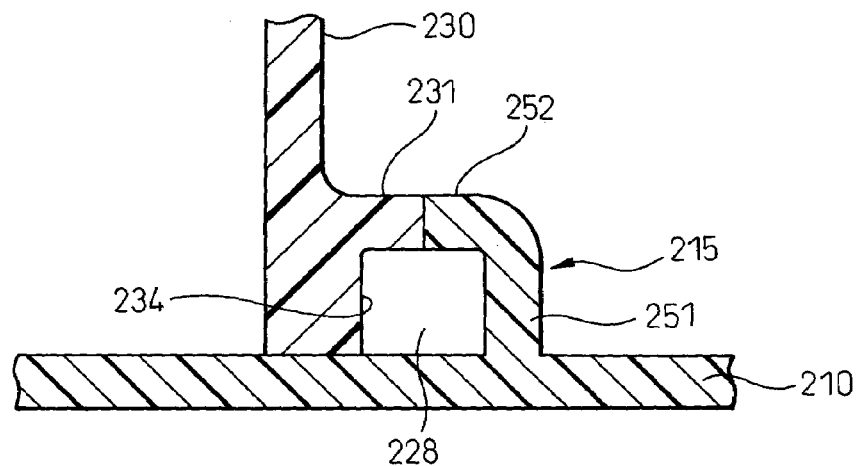
Figure 22B:
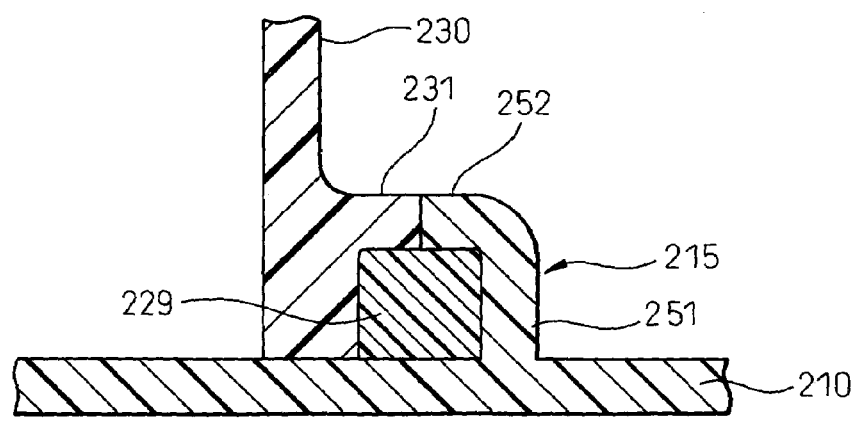

Intake systems according to seventh, eighth and ninth embodiments of the invention are shown in FIGS. 20B, 21B and 22B, respectively. Note that like reference numerals are given to substantially like constituent locations to those described in the fifth embodiment, and the description thereof will be omitted.

In the case of the seventh embodiment, as shown in FIG. 20A, a protruding portion which protrudes radially outwardly is formed on an intake duct 210. The protruding portion 13 is formed continuously or discontinuously in a circumferential direction of the intake duct 210. The height of the protruding portion 213, that is, an amount by which the protruding portion 13 protrudes from the intake duct 210 is set smaller than the depth of a recessed groove 232 formed in the piece portion 230 or a recessed groove 252 formed in the piece portion 250. Due to this, a predetermined space portion 222 is formed between the protruding portion 13 on the intake duct 210 and the recessed groove 232 in the piece portion 230 or the recessed groove 252 in the piece portion 250. A secondary molding resin injected from an injection port 224 is packed into the space portion 222 formed between the protruding portion 13 and the recessed groove 232 or the recessed groove 252, whereby as shown in FIG. 20B, a joint 260 is formed between the intake duct 210 and the piece portion 230 constituting the casing 220.

In the case of the seventh embodiment, by forming the protruding portion 13 on the intake duct 210, the recessed groove 232 in the piece portion 230 or the recessed groove 252 in the piece portion 250 is fitted on the protruding portion 13. Due to this, the attachment position of the casing 220 constituted by the piece portion 230 and the piece portion 250 is positioned by the protruding portion 13. In other words, the protruding portion 13 constitutes a positioning means for positioning the casing 220 to the intake duct 210. Consequently, the casing 220 can easily be positioned at a predetermined position on the intake duct 210. In addition, the protruding portion 13 is formed integrally with the intake duct 210 from a resin having the same material as that from which the intake duct 210 is formed. Due to this, the protruding portion 13 can be molded at the same time as the intake duct 210 is formed. Consequently, there exists no case where an increase in number of processes is called for.

In the case of the eighth embodiment, as shown in FIG. 21A, the configuration of a joint portion between a piece portion 230 and an intake duct 210 is different from that of the fifth embodiment. A groove portion 14 which sets back radially inwardly is formed in the intake duct 210. The groove portion 14 is formed in such a manner as to extend continuously in a circumferential direction of the intake duct 210.

On the other hand, a projection 33 is formed on a piece portion 230 which projects from a flange portion 231 radially inwardly of the intake duct 210. The projection 33 is formed continuously or discontinuously in a circumferential direction of the piece portion 230. According to the construction, the projection 33 projecting from the piece portion 230 is inserted into the groove portion 14 in the induction duct 210. The projection 33 is set smaller than the groove portion 14. Due to this, a predetermined space portion 26 is formed between the projection 33 and the groove portion 14. A secondary molding resin injected from an injection port 24 is packed into the space portion 26 formed between the projection 33 and the groove portion 14, whereby, as shown in FIG. 21B, a joint 27 is formed between the intake duct 210 and the piece portion 230 constituting a casing 220. Note that a piece portion 250 can be configured similarly to the piece portion 230.

In the case of the eighth embodiment, by forming the groove portion 14 in the intake duct 210 and the projection 33 on the piece portion 230, the projection 33 is fitted in the groove portion 14. Due to this, the attachment position of the piece portion 230 is positioned by the projection 33. Namely, the groove 14 constitutes a positioning means for positioning the casing 220 to the intake duct 210. Consequently, the casing 220 can easily be attached to a predetermined position on the intake duct 210. In addition, the groove portion 14 is formed integrally with the intake duct 210 from a resin having the same material from which the intake duct 210 is formed. Due to this, the groove portion 14 can be molded at the same time as the formation of the intake duct 210. Consequently, there exists no case where an increase in number of processes is called for.

In the case of the ninth embodiment, as shown in FIG. 22A, the configuration of a joint portion between a piece portion 230 and an intake duct 210 is different from that of the fifth embodiment. A protruding portion 215 rising radially outwardly is formed on the intake duct 210. The protruding portion 215 is formed continuously in a circumferential direction of the intake duct 210. The protruding portion 215 has a main body portion 251 rising from the intake duct 210 and a head portion 252 extending from an end portion of the main body portion 251 which is opposite to an end portion thereof which faces an intake passageway in substantially parallel with a central axis of the intake duct 210.

On the other hand, a recessed groove 234 which is set back in part of a flange portion 231 is formed in the piece portion 230. The recessed groove 34 is formed continuously or discontinuously in a circumferential direction of the piece portion 230. The flange portion 231 can be brought into abutment with the head portion 252 of the protruding portion 215 at an axial end portion of the piece portion 230. Due to this, a predetermined space portion 28 is formed between the protruding portion 215 and the flange portion 231 by bringing the head portion 252 of the protruding portion 15 into abutment with the flange portion 231 of the piece portion 230. The space portion 228 is formed circumferentially of the intake duct 210. Due to this, a secondary molding resin injected from an injection port 224 is packed into the space portion 228 formed between the protruding portion 15 and the flange portion 231, whereby, as shown in FIG. 22B, a joint 229 is formed between the intake duct 210 and the piece portion 230 constituting a casing 220. Note that a piece portion 250 can be configured similarly to the piece portion 230 described above.

In the case of the ninth embodiment, by forming the protruding portion 215 on the intake duct 210 and the recessed groove 232 in the flange portion 231 of the piece portion 230, the protruding portion 215 and the flange portion 231 are brought into abutment with each other. Due to this, the attachment position of the piece portion 230 is positioned by the abutment between the protruding portion 215 and the flange portion 231. In other words, the protruding portion 15 constitutes a positioning means for positioning the casing 220 to the intake duct 210. Consequently, the casing can easily be attached to a predetermined position on the intake duct 210.

Tenth Embodiment

A casing for an intake system according to a tenth embodiment is shown in FIG. 23.

In the tenth embodiment, as shown in FIG. 23, a casing 60 is divided into three piece portions 61, 62, 63. The casing 60 is divided by three planes which extend radially from a central axis of an intake duct 10 at intervals of 1200. Due to this, the casing 60 has the piece portion 61, the piece portion 62 and the piece portion 63. The piece portion 61, the piece portion 62 and the piece portion 63 are generally formed into the same shape. In a case where the casing is formed into a cylindrical shape, the piece portion 61, the piece portion 62 and the piece portion 63 are each formed into a fan-like shape. In addition, the piece portion 62 is connected to the adjacent piece portion 61 and the piece portion 63 by hinge portions 64.

In the tenth embodiment, by increasing the number of divisions in the casing 60, the size of the respective piece portions 61, 62, 63 is decreased. Consequently, even in the event that there is no extra space around the periphery of the intake duct 10, the casing 60 can easily be attached to the intake duct 10. In addition, the piece portion 61, the piece portion 62 and the piece portion 63 are connected integrally to each other by the hinge portions 64. Consequently, even if the number of divisions in the casing 60 is increased, there is no risk that an increase in number of components is called for. In addition, the handling of the casing 60 is facilitated.

Note that while, in the tenth embodiment, an example is described where the casing 60 is divided into the three piece portions 61, 62, 63 by the three planes, the casing 60 may be divided into five or more piece portions by three or more planes such as by dividing the casing 60 into four piece portions by two planes which intersect with each other at right angles.

Thus, while, in the embodiments that have been described heretofore, the casing is described as being formed into the cylindrical shape, the shape of the casing is not limited to the cylindrical shape. For example, the casing may be molded into a rectangular parallelepiped, and each piece portion may be molded into a box-like shape which is opened at one end portion.

In addition, while, in the above embodiments, the casing and the intake duct are described as being joined together by packing the secondary molding resin into the space portion, an adhesive having a fluidity may be packed into the space portion to thereby join together the casing and the intake duct with the adhesive.

Eleventh Embodiment

An intake manifold (hereinafter, simply referred to as a manifold) as an intake member according to an eleventh embodiment is shown in FIGS. 25 to 28. A manifold 1 is installed on an engine of a vehicle. The manifold 1 is adapted to distribute and supply, to a plurality of cylinders of the engine, intake air which is adjusted with respect to flow rate by a throttle valve and is then sent out from a throttle body.

The manifold 1 has a surge tank portion 2 and a distributing portion 5. The surge tank portion 2 forms an inlet port 3 and an intake passageway 4. The inlet port 3 is connected to a downstream side of the throttle body so as to allow intake air sent out from the throttle body to flow into the intake passageway 4. The distributing portion 5 forms a plurality of branch passageways 6 and a plurality of intake air outlet ports 7. The plurality of branch passageways 6 extend in parallel with each other as curved lines, and the intake air outlet port 7 is provided at an extended end portion at a downstream end of each branch passageway 6. The plurality of intake air outlet ports 7 are connected to any of the plurality of cylinders of the engine. The distributing portion 5 is adapted to distribute and supply, to the respective branch passageways 6, intake air that has flowed into the intake passageway 4 of the surge tank portion 2.

The manifold 1 is fabricated by joining together a plurality of resin molded bodies (hereinafter, simply referred to as molded bodies) 10, 20, 30.

The first molded body 10 constitutes an outer wall portion of the surge tank portion 2, and the second molded body 20 constitutes an outer wall portion of the distributing portion 5. The first molded body 10 and the second molded body 20 have flange portions 12, 22 which extend in a loop-like fashion along outer circumferential edge portions thereof, respectively. The third molded body 30 constitutes an inner wall portion which is common to the surge tank portion 2 and the distributing portion 5 and has a thin flange 32 formed along an outer circumferential edge portion thereof. The flange 32 extends along the outer circumferential edge portion of the third molded body 30 in a substantially U-shaped fashion except for a portion which constitutes upstream end portions of the branch passageways 6. The third molded body 30 and the second molded body 20 have a plurality of partitions 34, 24 which partition the respective branch passageways 6 in a direction in which they extend.

The first molded body 10 and the second molded body 20 are joined together at portions 12a, 22a of the respective flanges 12, 22 which form upstream end portions of the respective branch passageways 6. The third molded body 30 is joined to the first molded body 10 and the second molded body 20 in such a manner that the flange 32 is held between portions 12b, 22b of the respective flanges 12, 22 except for the portions 12a, 22a. The third molded body 30 and the second molded body 20 are joined together at end portions of the respective partitions 34, 24. In this embodiment, the first molded body 10 and the second molded body 20 constitute outer resin molded bodies and the third molded body 30 constitutes an intermediate resin molded body.

Figure 29:
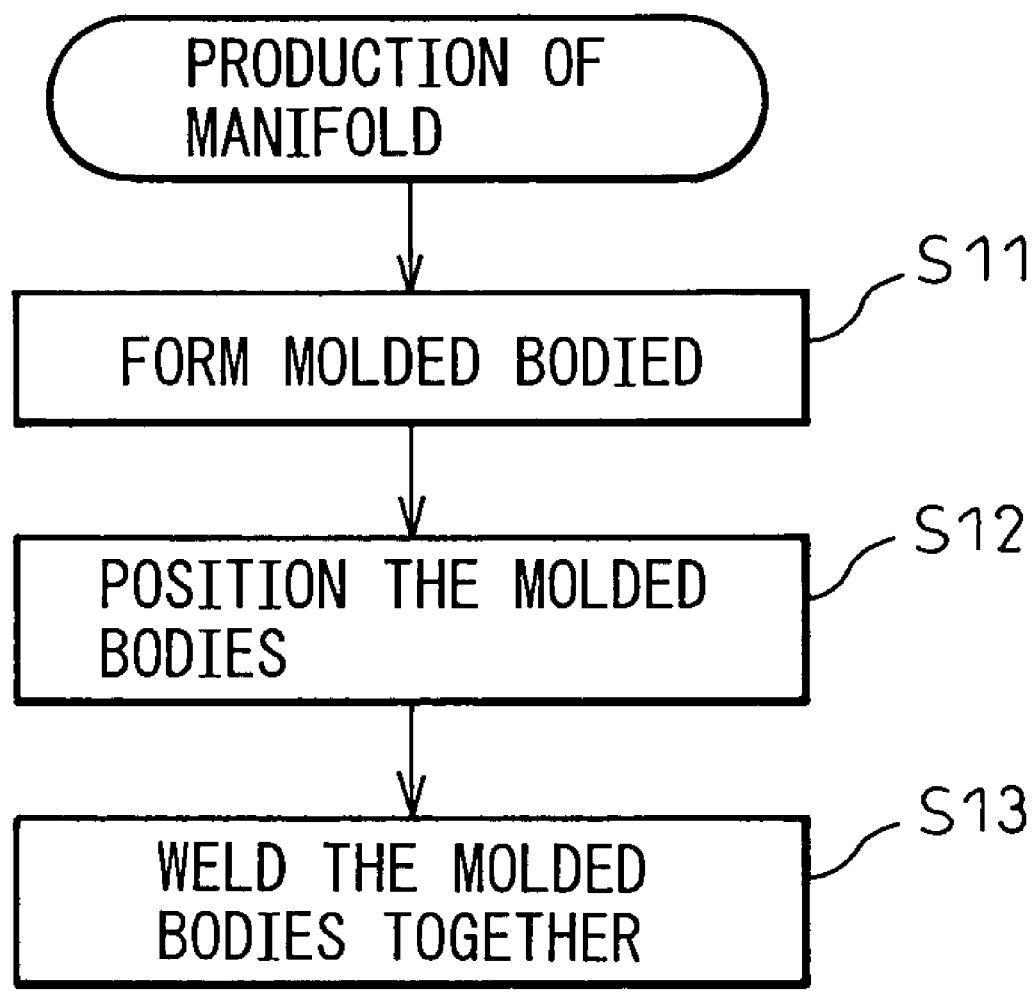
FIG. 29 is a flowchart illustrating a method for producing the intake manifold according to the eleventh embodiment and an intake manifold according to a twelfth embodiment of the invention.

Next, a method for producing the manifold 1 will be described according to a flowchart shown in FIG. 29.

Figure 30:
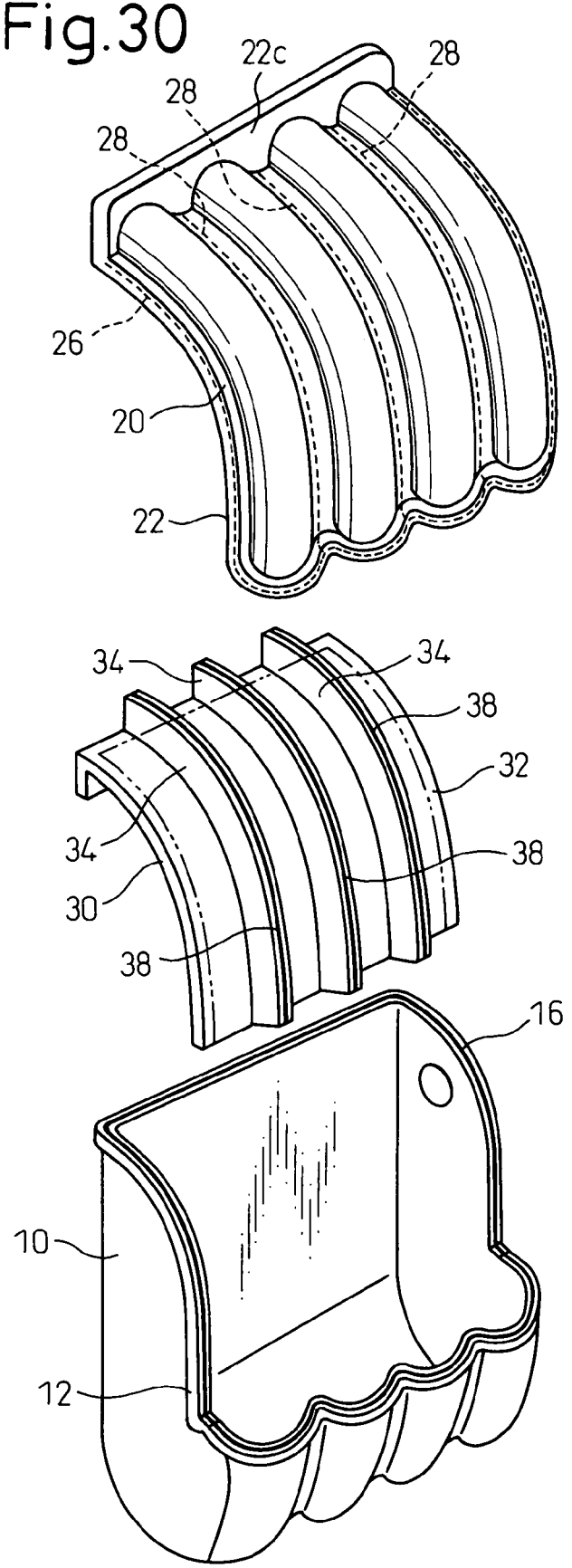
FIG. 30 is a perspective view explaining the method for producing the intake manifold according to the eleventh embodiment.
Figure 31A:
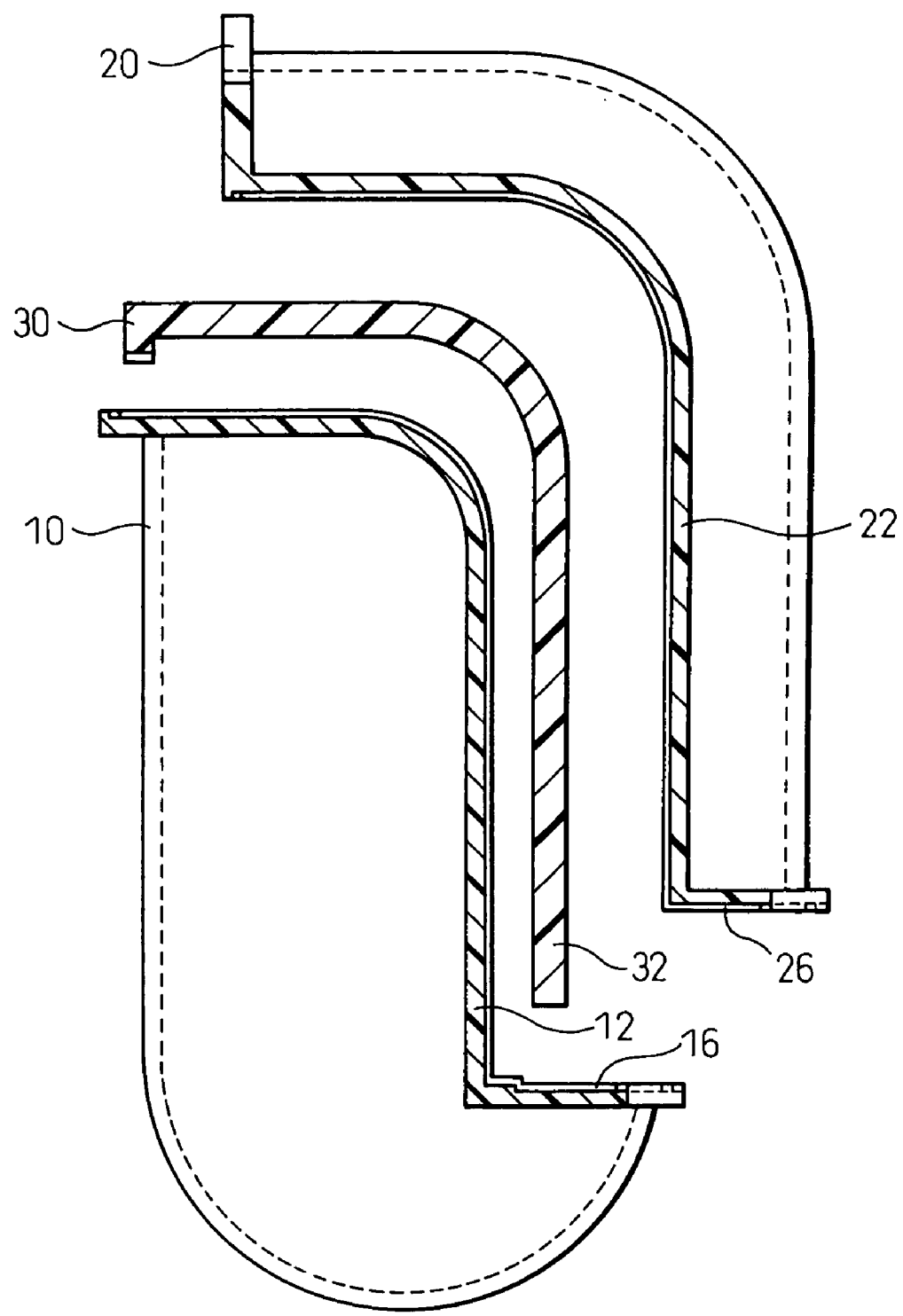

In step S11, as shown in FIGS. 30, 31A, 31B, the respective molded bodies 10, 20, 30 which constitute the predetermined locations of the manifold 1 are formed through resin molding. As to a resin for forming the respective molded bodies 10, 20, 30, the molded bodies 10, 20, 30 are formed from the same resin or resins which are different from one another.

Flow path grooves 16, 26 are formed in the flanges 12, 22 of the first and second molded bodies 10, 20, respectively, on planes which constitute joining interfaces with the other flanges 12, 22, 32 in the manifold 1. Here, the flow path groove 16 is formed into a loop shape which extends in a direction in which the flange 12 extends, and the flow path groove 26 is formed generally into a U-shape which extends in a direction in which the flange 22 extends except for a portion 22c of the flange 22 which forms the intake air outlets 7. Flow path grooves 28, 38 are formed in the partitions 24, 34 of the second and third molded portions 20, 30, respectively, on planes which constitute joining interfaces with the other partitions 24, 34 in the manifold 1. Here, the flow path grooves 28, 38 are formed into curved shapes which extend along an end edge portions of the corresponding partitions 24, 34 in a direction in which the respective branch passageways 6 extend, and one end portion of the flow path groove 28 is formed in such a manner as to connect to the flow path groove 26.

Figure 24A:
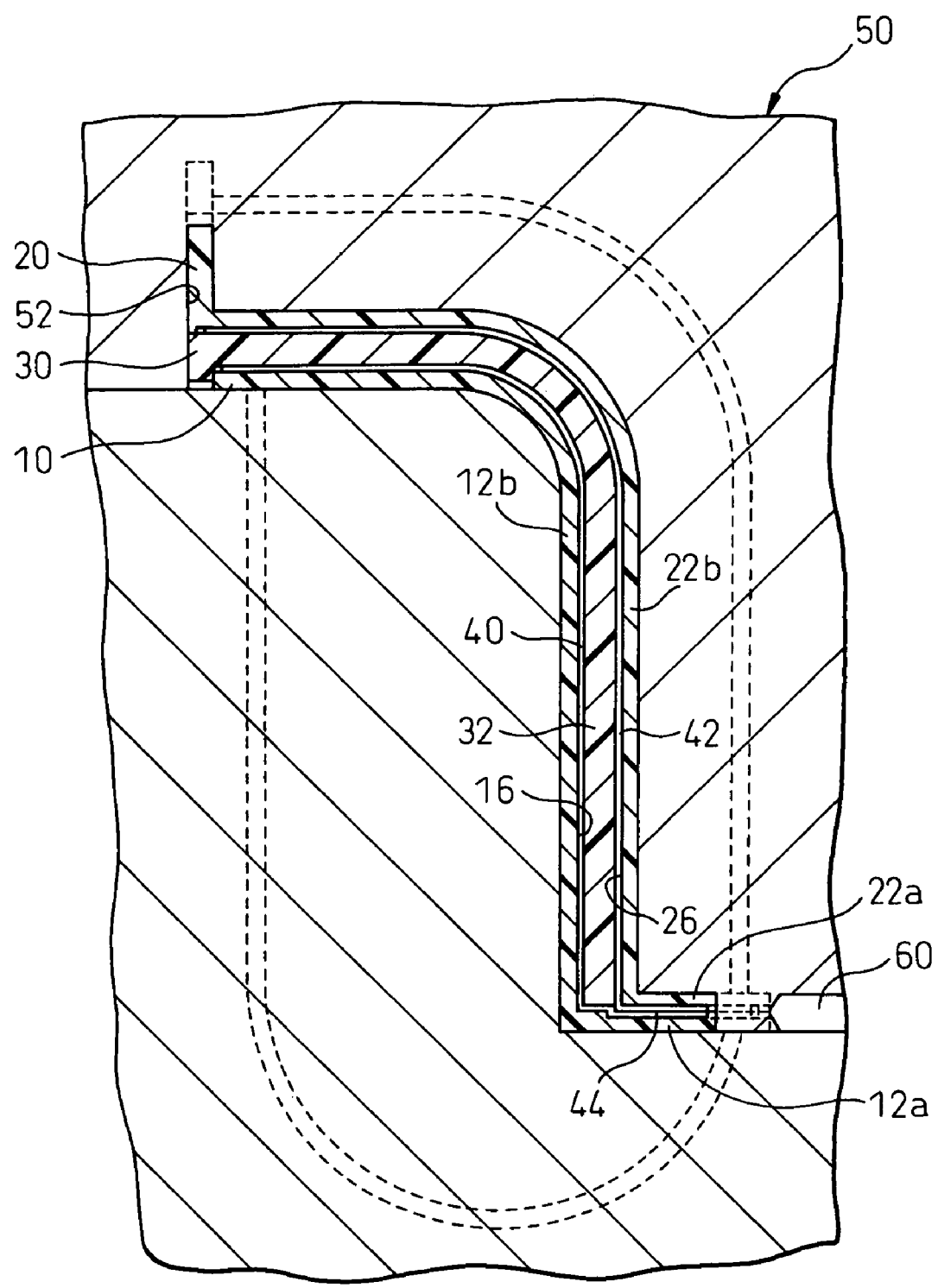
FIGS. 24A, 24B are cross-sectional views explaining a method for producing an intake manifold according to an eleventh embodiment of the invention, which correspond to FIGS. 27, 26, respectively.
Figure 24B:
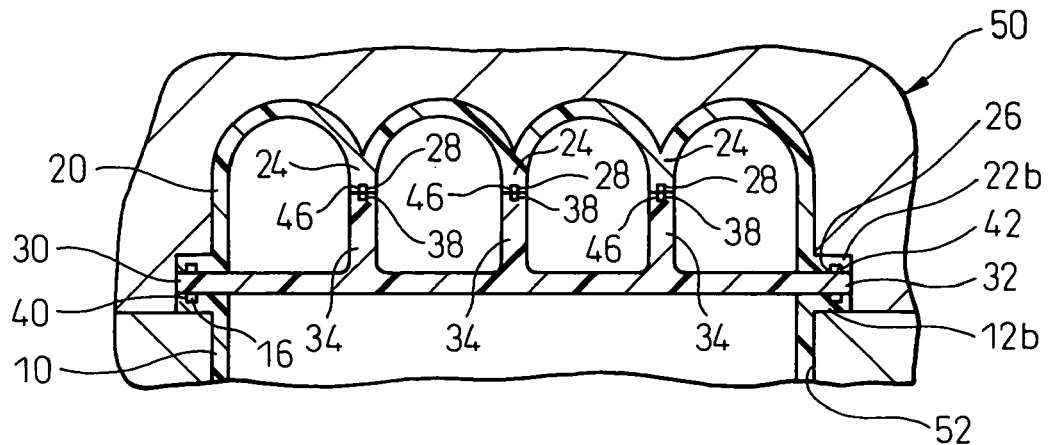
Figure 25:
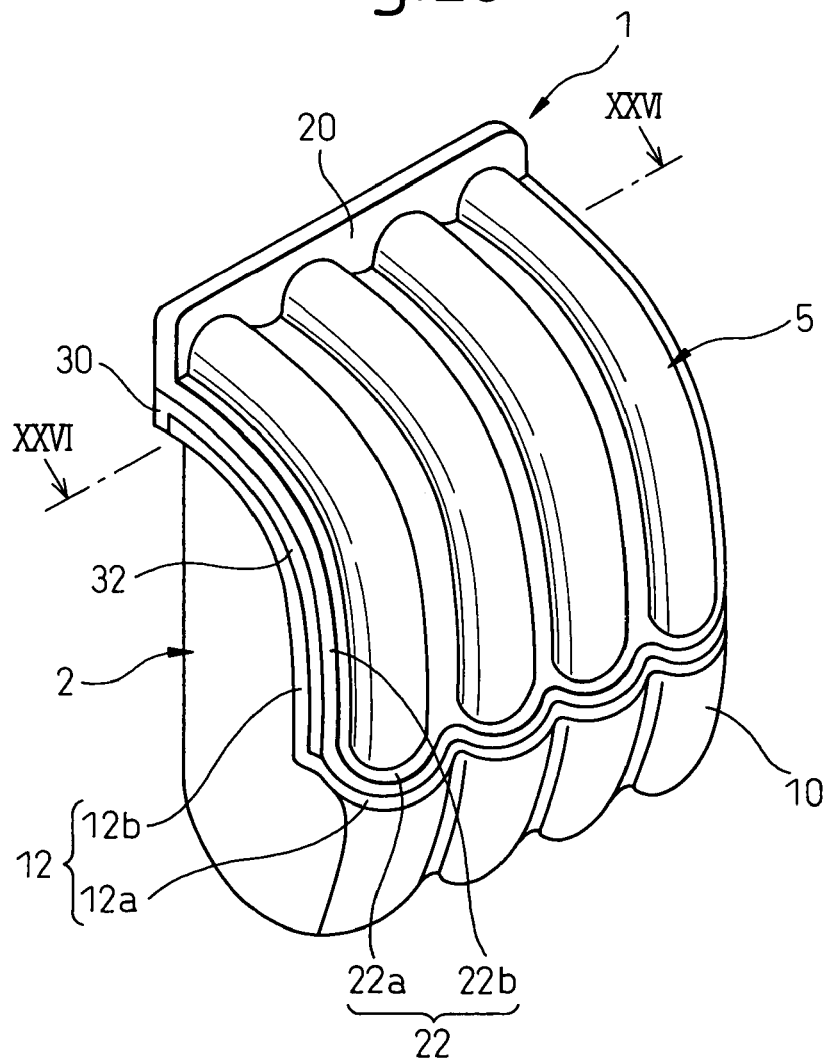
FIG. 25 is a perspective view showing the intake manifold according to the eleventh embodiment of the invention.

In step S12, as shown in FIG. 24A, the respective molded bodies 10, 20, 30 are positioned by means of a mold 50 as a fixture.

To be specific, the respective molded bodies 10, 20, 30 are disposed in a cavity 52 in the mold 50. As this occurs, the flange 32 is put between the portion 12b of the flange 12 and the portion 22b of the flange 22, the portion 12a of the flange 12 and the portion 22a of the flange 22 are overlapped on each other, and furthermore, the partitions 24 and the partitions 34 are overlapped on each other, whereby the opening of the flow path groove 16 is closed by the flange 32 at the interface between the flange 12 and the flange 32 and, thereby, a resin flow path 40 is formed by inner surfaces of the groove 16. The flow path groove 26 is closed by the flange 32 at the interface between the flange 22 and the flange 32 to thereby form a resin flow path 42 by inner surfaces of the flow path groove 26. The flow path groove 16 faces the flow path groove 26 directly at the interface between the flange 12 and the flange 22, and a resin flow path 44 is formed by the inner surfaces of the grooves 16, 26. The flow path grooves 28 and the flow path grooves 38 face each other directly at the interface between the partitions 24 and the partitions 34 to thereby form resin flow paths 46 by inner surfaces of the grooves 28, 38. Thus, the respective resin flow paths 40, 42, 44, 46 are made to communicate with each other.

In this embodiment, this step S12 corresponds to the positioning process.

In step S13, the respective molded bodies 10, 20, 30 are joined together through welding.

Figure 26:
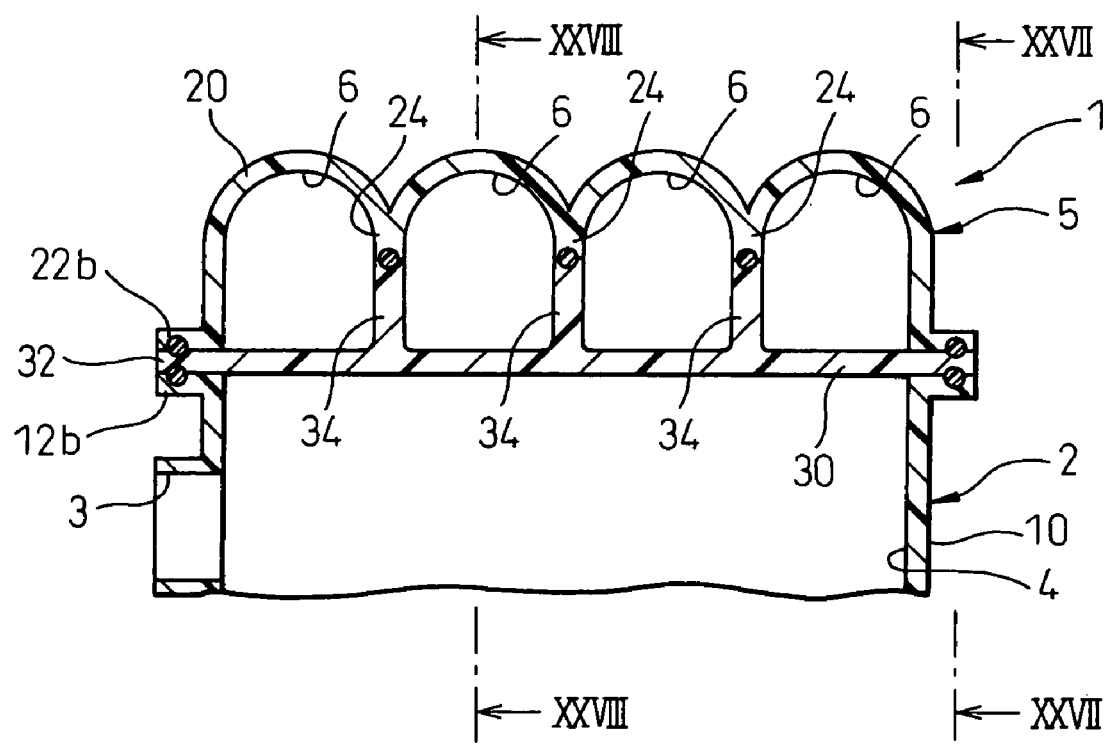
FIG. 26 is a cross-sectional view taken along the line XXVI—XXVI in FIG. 25.
Figure 27:
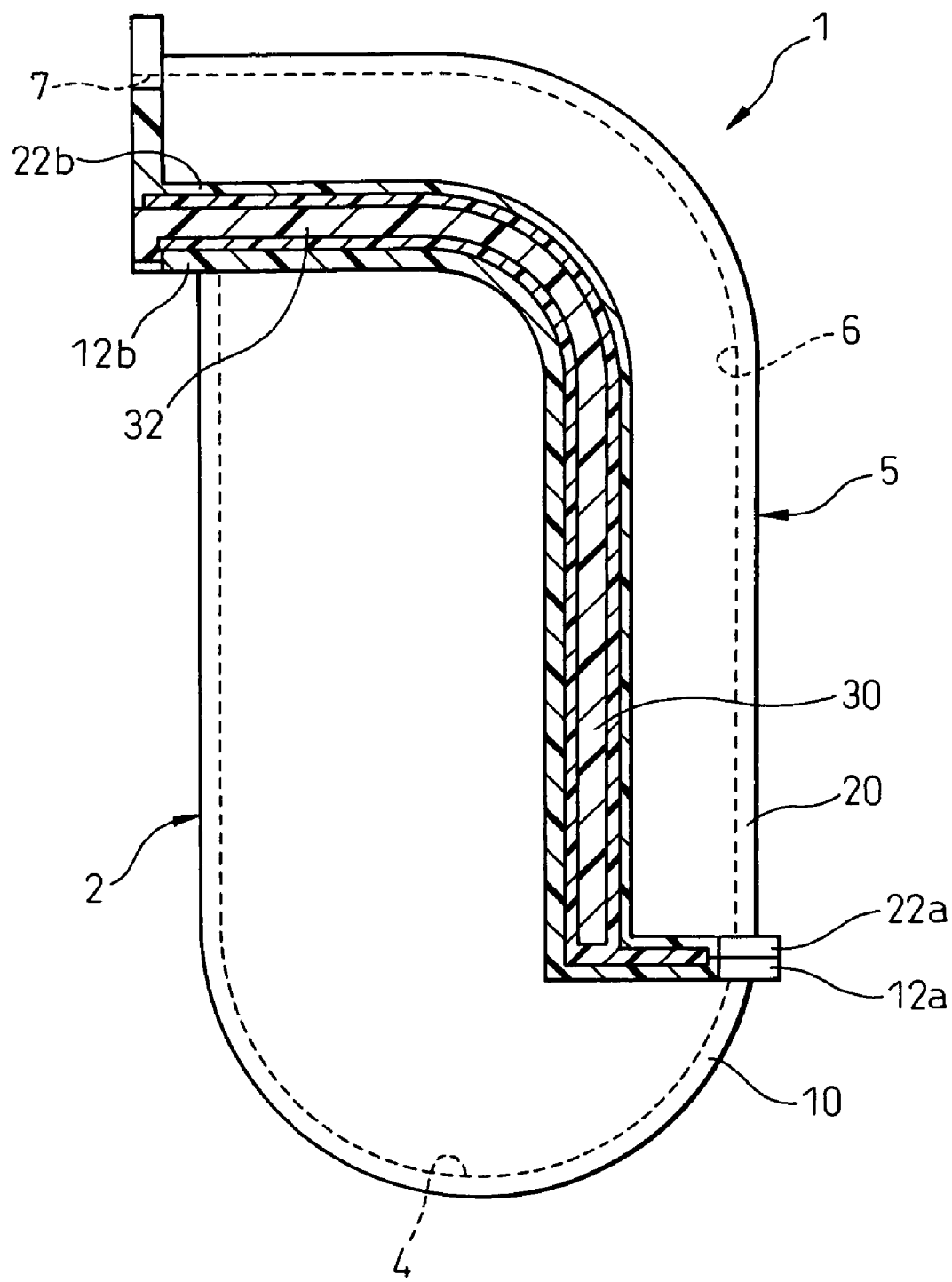
FIG. 27 is a cross-sectional view taken along the line XXVII—XXVII in FIG. 26.
Figure 28:
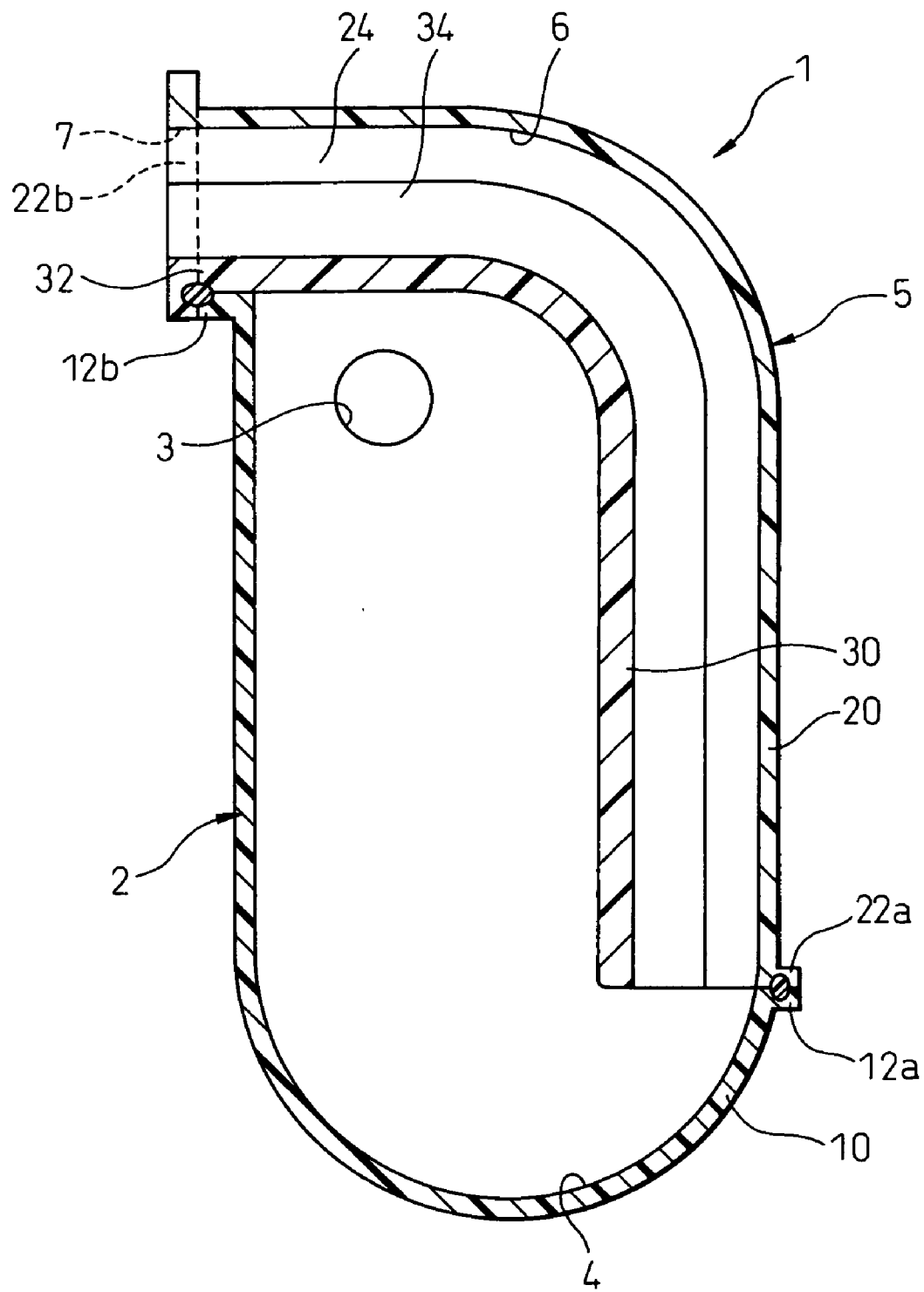
FIG. 28 is a cross-sectional view taken along the line XXVIII—XXVIII in FIG. 26.

To be specific, as shown in FIG. 24A, a molten resin is injected into the resin flow path 44 from an injection nozzle 60 of an injector, whereby the molten resin is injected uniformly over the entire area of each of the resin flow paths 40, 42, 44, 46. As this occurs, the molten resin flows into the resin flow path 40 and the resin flow path 42 substantially simultaneously. The inner surfaces of the flow path grooves 16, 26, 28, 38 which forms the resin flow paths 40, 42, 44, 46, respectively are molten again by virtue of heat from the molten resin so as to mix with the molten resin. A mixture of the resin that has been so molten again and the molten resin is cooled and sets after the elapse of predetermined period of time. As a result, as shown in FIGS. 26 to 28, the portion 12b of the flange 12 and the flange 32, the portion 22b of the flange 22 and the flange 32, the portion 12a of the flange 12 and the portion 22a of the flange 22 and the partitions 24 and the partitions 34 are jointed together, respectively, whereby the manifold 1 is completed. As to the molten resin injected into the respective resin flow paths 40, 42, 44, 46, the same resin as that used for forming the molded bodies 10, 20, 30 may be used, or a different resin may be used.

In this embodiment, the aforesaid step S12 and step S13 correspond to the secondary molding process.

According to the production method according to the eleventh embodiment that has been described heretofore, as the molten resin is uniformly distributed to the entire area of each of the resin flow paths 40, 42 which pass through the interfaces between the respective flanges 12, 22, 32 at the locations where the flange 32 is held between the flanges 12, 22, the respective flanges 12, 22, 32 are welded together assuredly. At the same time as this occurs, as the molten resin is also uniformly distributed to the entire area of each of the resin flow paths 40, 42 at the locations where the flange 12 and the flange 22 are directly joined together and the locations where the partitions 24 and the partitions 34 are joined together, the welding at those joining locations is ensured. Consequently, the airtightness and joining strength are secured at all the joining interfaces between the molded bodies 10, 20, 30.

In addition, according to the production method of the eleventh embodiment, as the molten resin is injected substantially at the same time into the resin flow paths 40, 42 on the both sides of the thin flange 32, the heat conduction amount from the molten resin is increased and hence the thin flange 32 becomes easy to be fused again. Consequently, the molten resin so injected can mix with resin molted from the flange 32 sufficiently, whereby a high joining strength can be realized when the resins set which have mixed with each other at the respective interfaces between the flange 12 and the flange 22 and the flange 32.

Furthermore, according to the production method of the eleventh embodiment, since the welding of the three molded bodies 10, 20, 30 can be implemented at one time instead of being divided into a plurality of steps, the improvement in productivity and reduction in production costs can be attempted.

Moreover, according to the production method of the eleventh embodiment, the respective molded bodies 10, 20, 30 can be positioned at a high accuracy by the mold 50 for welding. Consequently, the molded body 30 can be disposed at the predetermined position with accuracy which would otherwise be easy to be diverged from the predetermined position due to being interposed between the flanges 12, 22 of the two molded bodies 10, 20.

(Modification)

Figure 32A:
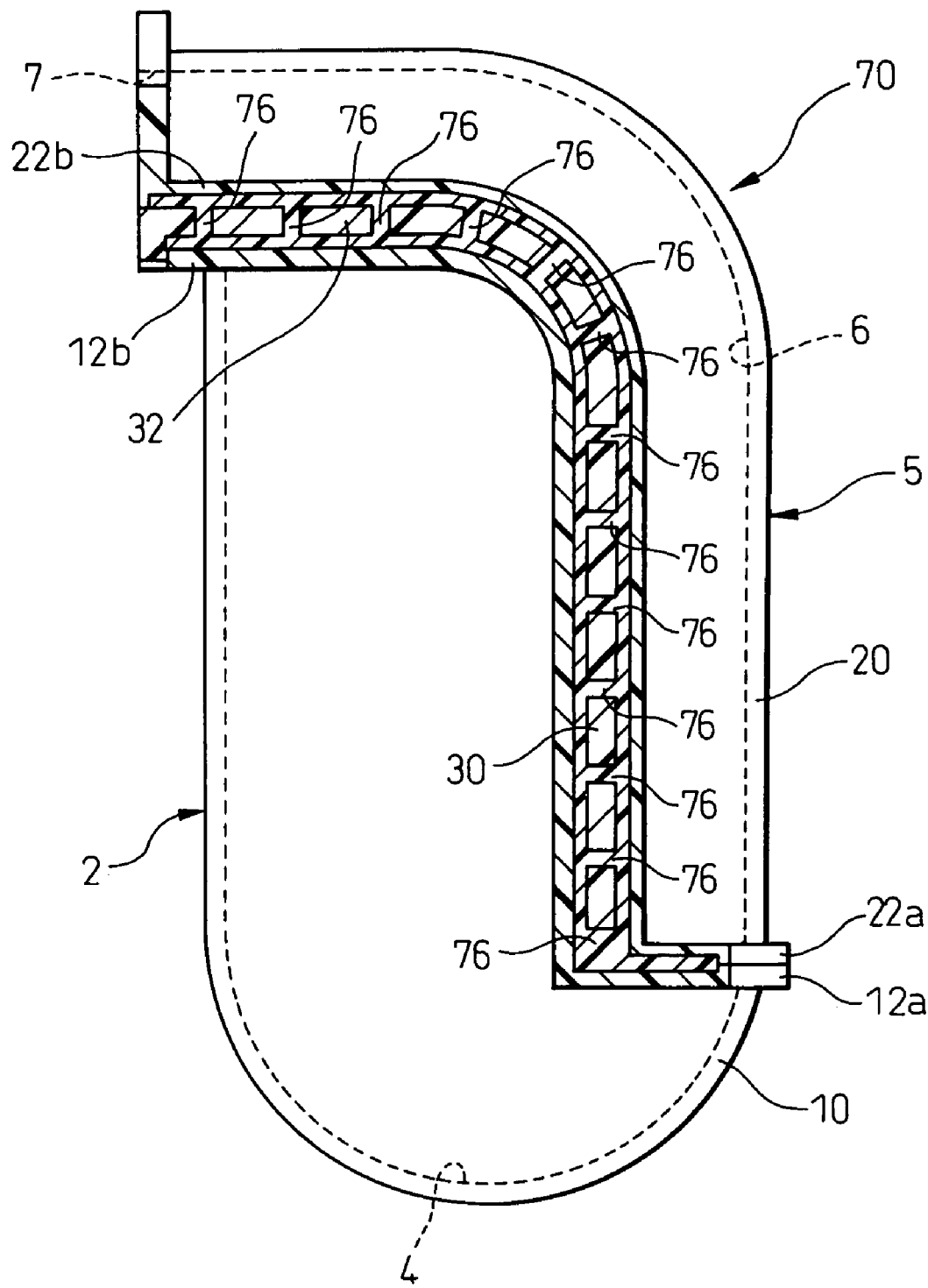
FIGS. 32A, 32B are cross-sectional views showing a modification to the intake manifold according to the eleventh embodiment, which correspond to FIGS. 27, 26, respectively.
Figure 32B:
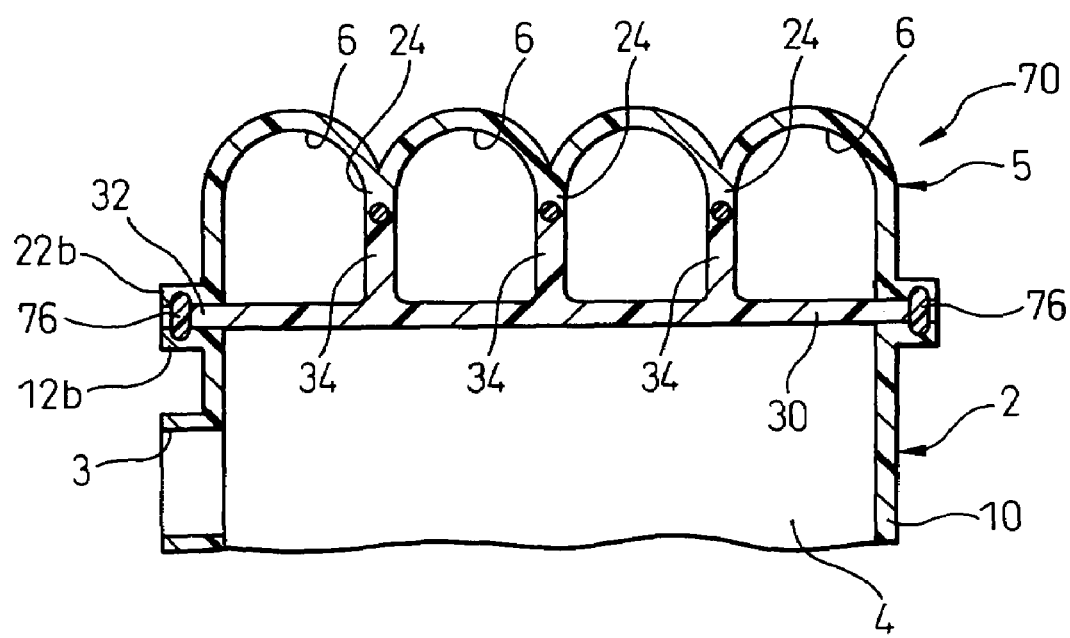

A manifold is shown in FIGS. 32A, 32B which is a modification to the manifold according to the eleventh embodiment. Like reference numerals are given to substantially like constituent locations of the manifold described in the eleventh embodiment above.

Figure 33A:
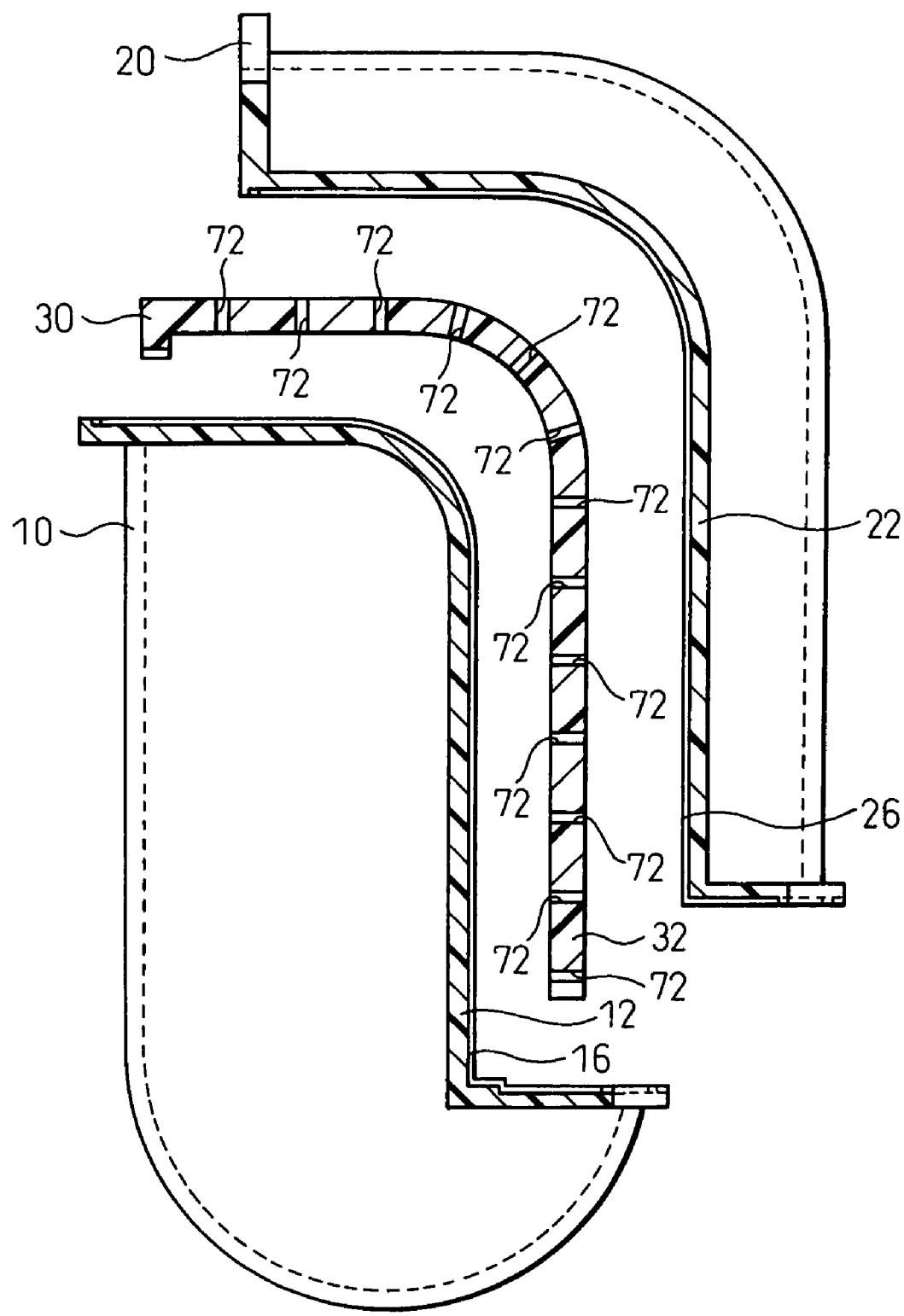
FIGS. 33A, 33B are cross-sectional views showing a method for producing the modification to the intake manifold according to the eleventh embodiment, which correspond to FIGS. 32A, 32B, respectively.
Figure 33B:
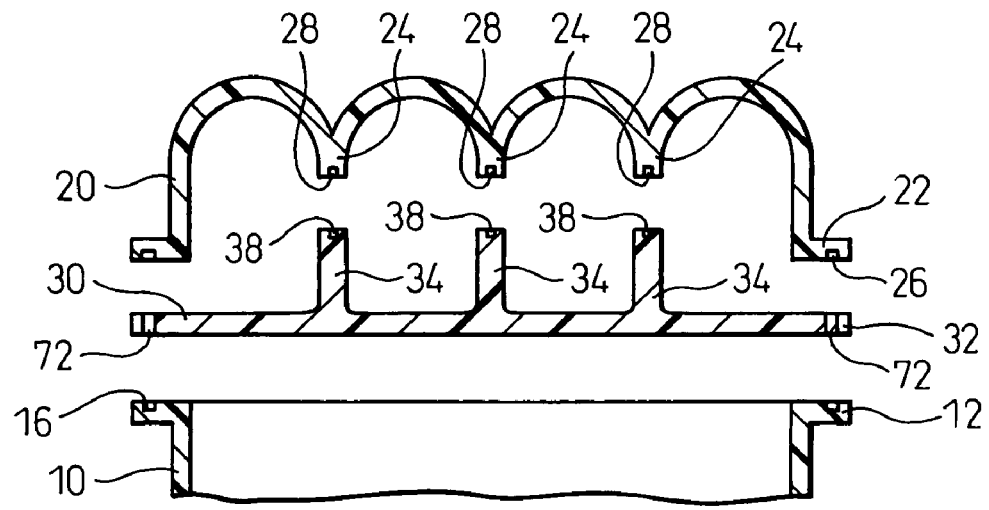
Figure 34:
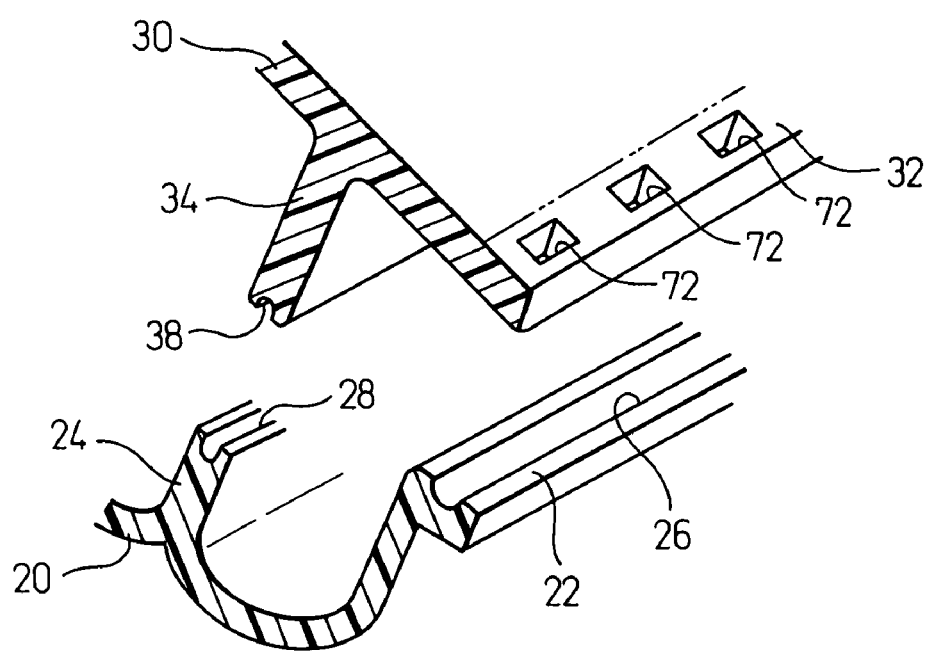
FIG. 34 is a perspective view explaining the method for producing the modification to the intake manifold according to the eleventh embodiment.

In a method for producing a manifold 70 according to the modification, firstly, in step S11, as shown in FIGS. 33A, 33B, 34, a plurality of flow path holes 72 are formed in a flange 32 of a third molded body 30 through resin molding. The flow path holes 72 formed in this step penetrate the flange 32 in a thickness direction and are arranged at substantially regular intervals in a direction in which the flange 32 extends.

Figure 35A:
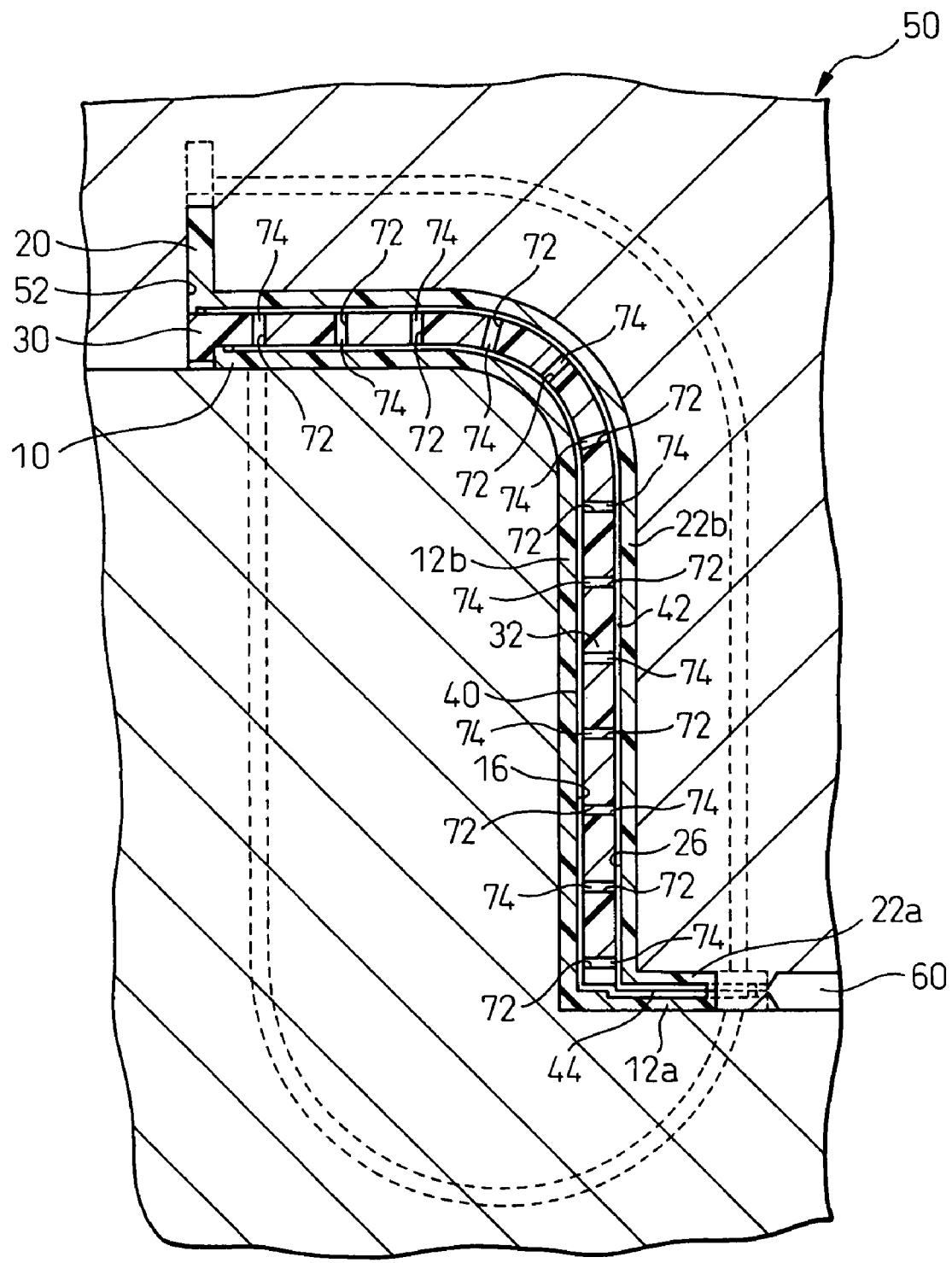
FIGS. 35A, 35B are cross-sectional views explaining the method for producing the modification to the intake manifold according to the eleventh embodiment, which correspond to FIGS. 32A, 32B, respectively.
Figure 35B:
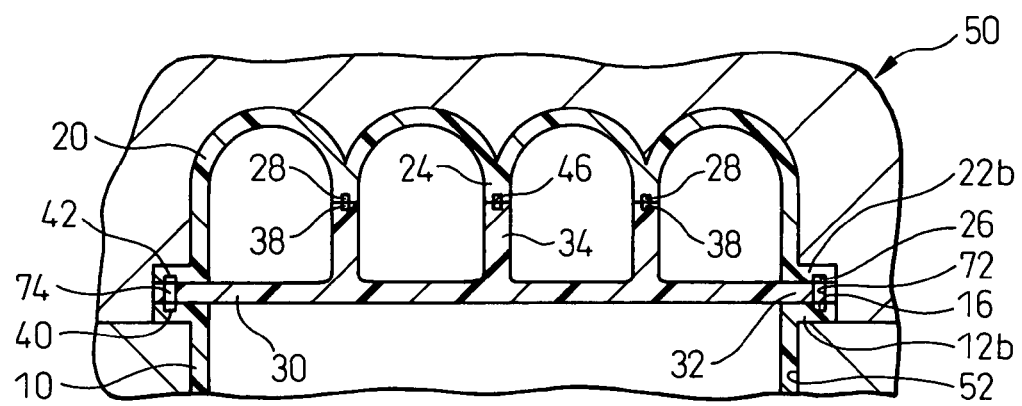

Next, in step S12, when respective molded bodies 10, 20, 30 are set in a cavity 51 in a mold 50, the respective flow path holes 72 are made to open towards a flow path groove 16 at an interface between a flange 12 of the first molded body 10 and the flange 32, and the respective flow path holes 72 are made to open towards a flow path groove 26 at an interface between a flange 22 of the second molded body 20 and the flange 32, as shown in FIG. 35A, whereby communicating flow paths 74 which communicate with resin flow paths 40, 42 on both sides of the flange 32 are formed by inner surfaces of the respective flow path holes 72.

Next, in step S13, as shown in FIG. 35A, when a molten resin is injected toward a resin flow path 44 from an injection nozzle 60, the molten resin injected into the resin flow paths 40, 42 then flows into the respective communicating flow paths 74 from both end openings of the respective flow path holes 72. As the amount of the flange 32 that is molten again by heat from the molten resin that has flowed into the plurality of communicating flow paths 74 is increased, the mixing between the molten resin so injected and the resin molten from the flange is promoted, whereby a further improvement in joining strength is attempted. In addition to this, the molten resin in the resin flow paths 40, 42 is allowed to link with the molten resin in the communicating flow paths 74 at a plurality of locations on the flange 32. Due to this, the flanges 12, 22 set in such a manner as to draw each other by virtue of a contraction resulting as the molten resin in the communicating flow paths 74 is cooled. As a result, as shown in FIGS. 32A, 32B, the flanges 12, 22 are linked with each other strongly by way of the resin 76 which has set in the communicating flow paths 74.

Twelfth Embodiment

A manifold according to a twelfth embodiment of the invention is shown in FIGS. 36 to 39. Like reference numerals are given to substantially like constituent locations of the manifold described in the eleventh embodiment.

Figure 39:
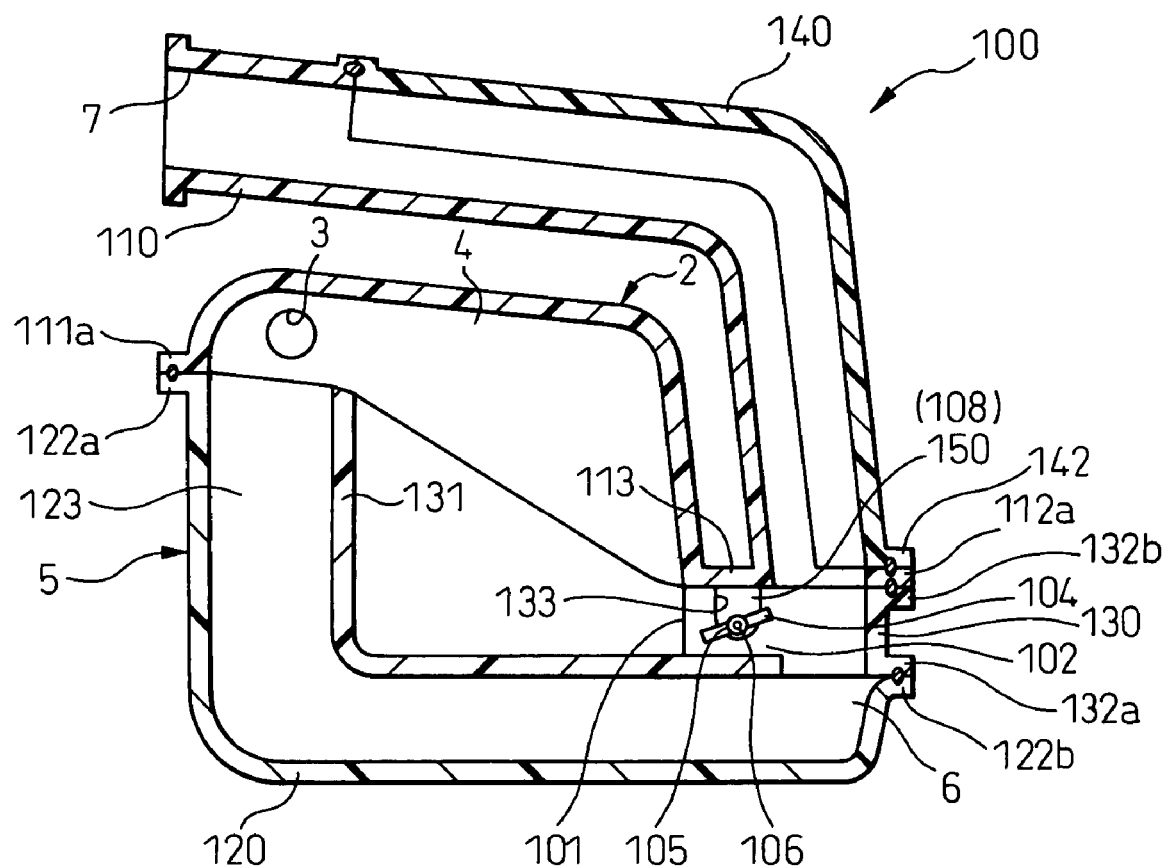
FIG. 39 is a cross-sectional view taken along the line XXXIX—XXXIX in FIG. 37.

In a manifold 100 according to the twelfth embodiment, a surge tank portion 2 is branched into a plurality of short-circuit passageways 102 by a plurality of partitions 101 at a downstream end of an intake passageway 4. The respective short-circuit passageways 102 connect to an intermediate portion of any of branch passageways 6 at an end thereof which is opposite to an end which faces the intake passageway 4 (that is, at a downstream end). The length of a path from an inlet port 3 to the intermediate portion of the branch passageway 6 by way of the short-circuit passageway 102 is shorter than the length of any of paths reaching to the branch passageway 6 without passing through the short-circuit passageway 102. A valve member 104 is individually disposed in each short-circuit passageway 102. Each valve member 104 has an integral cylindrical sleeve 105. The sleeve 105 is rotationally supported at both end portions thereof by an internal hole of a bearing 108 embedded in each partition 101. A common shaft 106 is fixedly fitted in the sleeve 105 of each valve member 104, and all the valve members 104 can rotate through the same angle in association with the rotation of the shaft 106. The shaft 106 can be rotated by a driving circuit, not shown, and each valve member 104 opens or closes each short-circuit passageway 102 according to the rotational angle of the shaft 106. As shown in FIG. 39, when each valve member 104 opens each short-circuit passageway 102, intake air that has flowed into the inlet port 3 is distributed to the plurality of short-circuit passageways 102 having a smaller flow path resistance and then flows into the respective branch passageways 6. The sleeve 105 and the shaft 106 correspond to the rotational shaft.

The manifold 100 is fabricated when a first molded body 110, a second molded body 120, a third molded body 130, a fourth molded body 140 and a plurality of fifth molded bodies 150 are joined together.

The first molded body 110 constitutes an outer wall portion of the surge tank portion 2 and part of an outer wall portion which forms downstream-side areas of the respective branch passageways 6 at a distributing portion 5. The first molded body 110 has a flange 111 which extends along an outer edge portion of the surge tank portion 2 in a U-shaped fashion and a thin flange 112 which extends along an outer edge portion of the distributing portion 5 in a loop-like fashion. End portions of the flange 111, in a direction in which it extends, link with two circumferential locations of the flange 112 in the vicinity of an intermediate portion of the respective branch passageways 6 to which the respective short-circuit passageways 102 connect. The second molded body 120 constitutes an outer wall portion which forms upstream-side areas of the respective branch passageways 6 at the distributing portion 5. The second molded body 120 has a flange 122 which extends along the outer edge portion in the loop-like fashion and a plurality of partitions 123 which partition the upstream-side areas of the respective branch passageways 6. The third molded portion 130 constitutes an inner wall portion which forms the upstream-side areas of the respective branch passageways 6 at the distributing portion 5 and which is common to the surge tank portion 2 and respective partitions 101 of the surge tank 2. The third molded body 130 has a flange 132 which extends along the outer circumferential edge portion in the loop-like fashion. The fourth molded body 140 constitutes the remaining portion of the outer wall portion which constitutes the downstream-side areas of the respective branch passageways 6 at the distributing portion 5 and has a flange 142 which extends along the outer edge portion in the loop-like fashion. The plurality of fifth molded bodies 150 constitute any of the bearings 108 in the surge tank portion 2.

The first molded body 110 and the second molded body 120 are jointed together at a portion 111a of the flange 11 which is near the upstream-side end portions of the respective branch passageways 6 and at a portion 122a of the flange 122 which forms the upstream-side end portion of the respective branch passageways 6. The second molded body 120 and the third molded body 130 are joined together at a portion 122b of the flange 22 which excludes the portion 122a and a portion 132a of the flange 132 which forms the upstream-side areas of the respective branch passageways 6. Furthermore, the second molded body 120 and the third molded body 130 are joined together at edge portions of ends of the respective partitions 123 and at a wall portion 131 which form upstream end portions of the respective branch passageways 6. The first molded body 110 and the third molded body 130 are joined together at a portion 111b of the flange 111 which excludes the portion 111a and a portion 112a of the flange 112 which forms intermediate portions of the respective branch passageways 6, and a portion 132b of the flange 132 which excludes the portion 132a. Furthermore, the first molded body 110 and the third molded body 130 are joined together at a wall portion 113 which forms the respective short-circuit passageways 102 inside the flange 111 and edge portions of end portions of the respective partition 101. The first molded body 110 and the fourth molded body 140 are joined together at the flange 112 and the flange 142.

Figure 36:
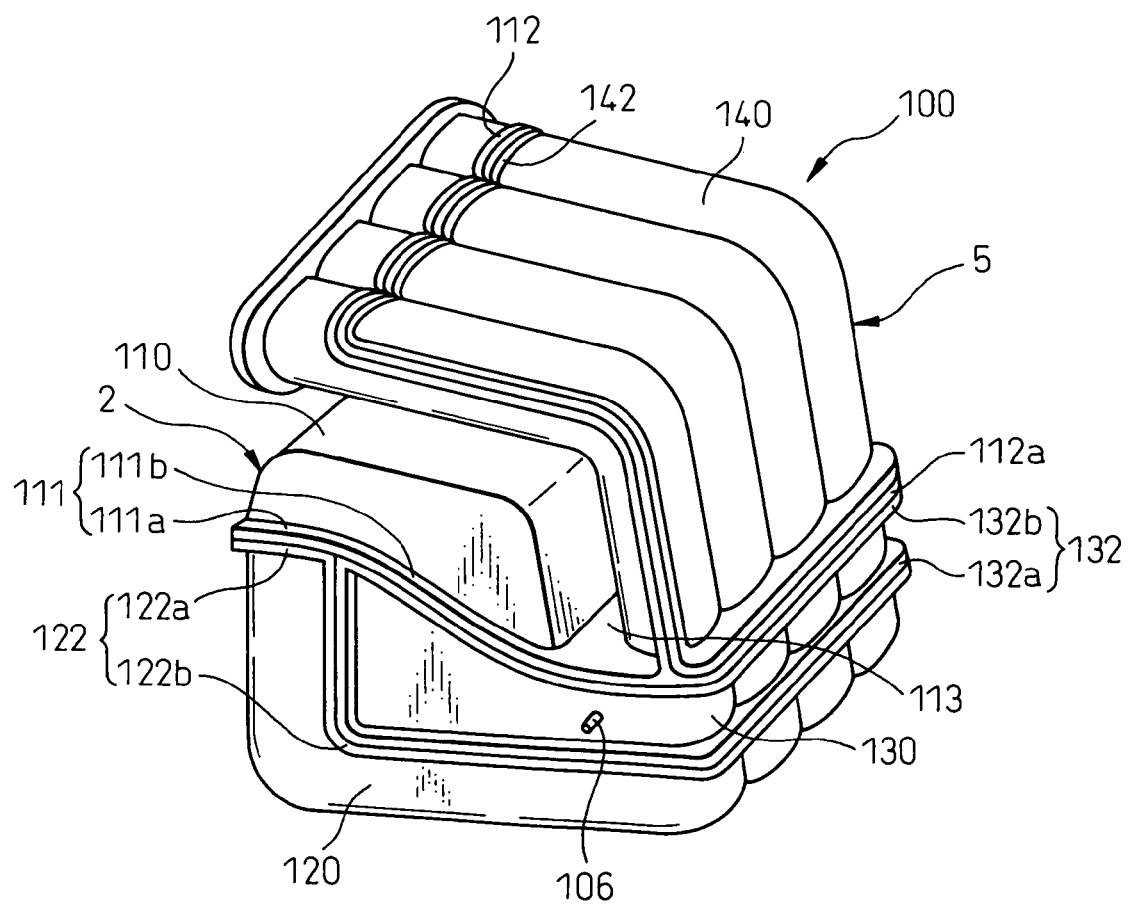
FIG. 36 is a perspective view showing an intake manifold according to the twelfth embodiment.
Figure 37:
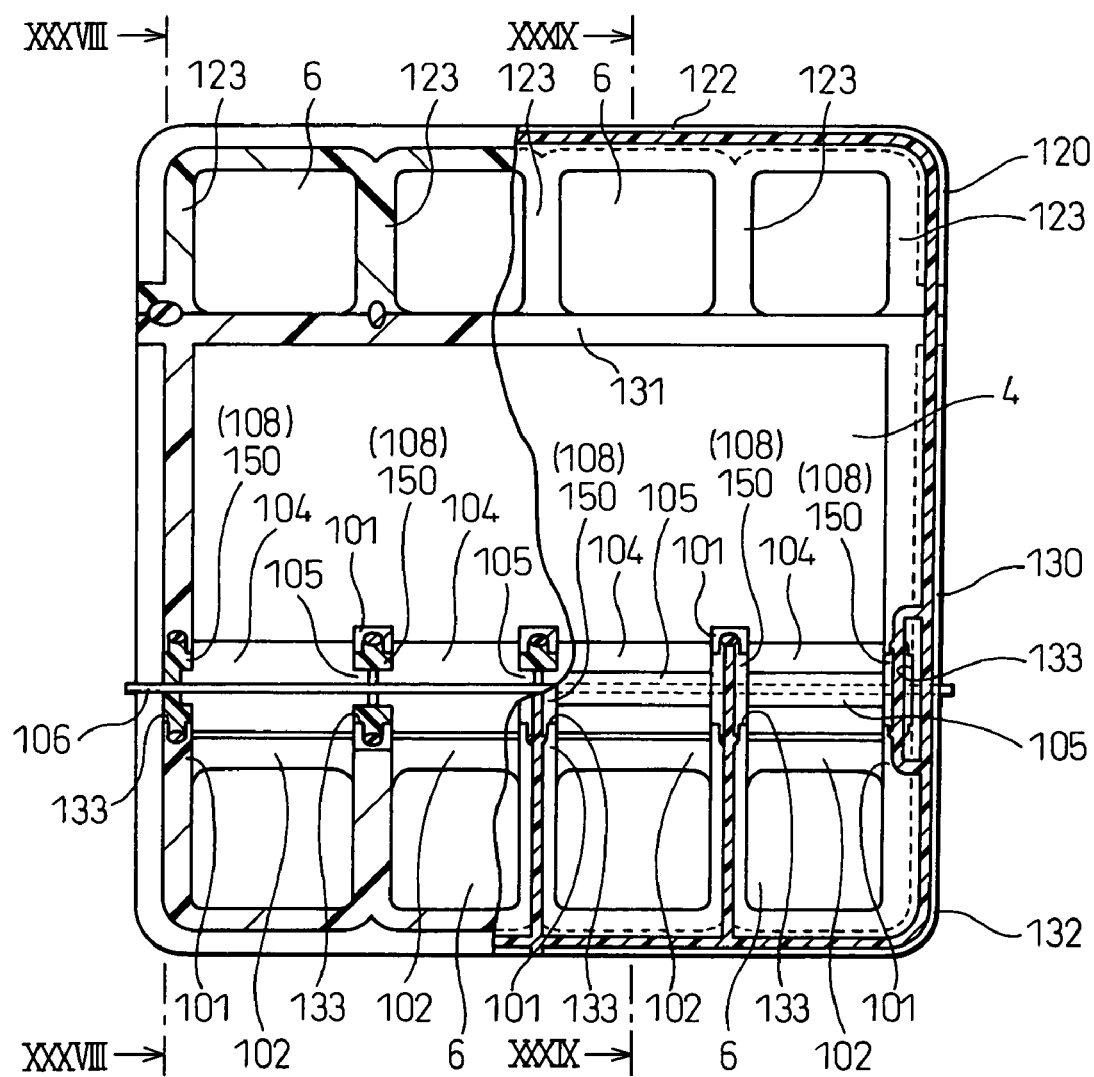
FIG. 37 is a cross-sectional view showing the intake manifold according to the twelfth embodiment.
Figure 38:
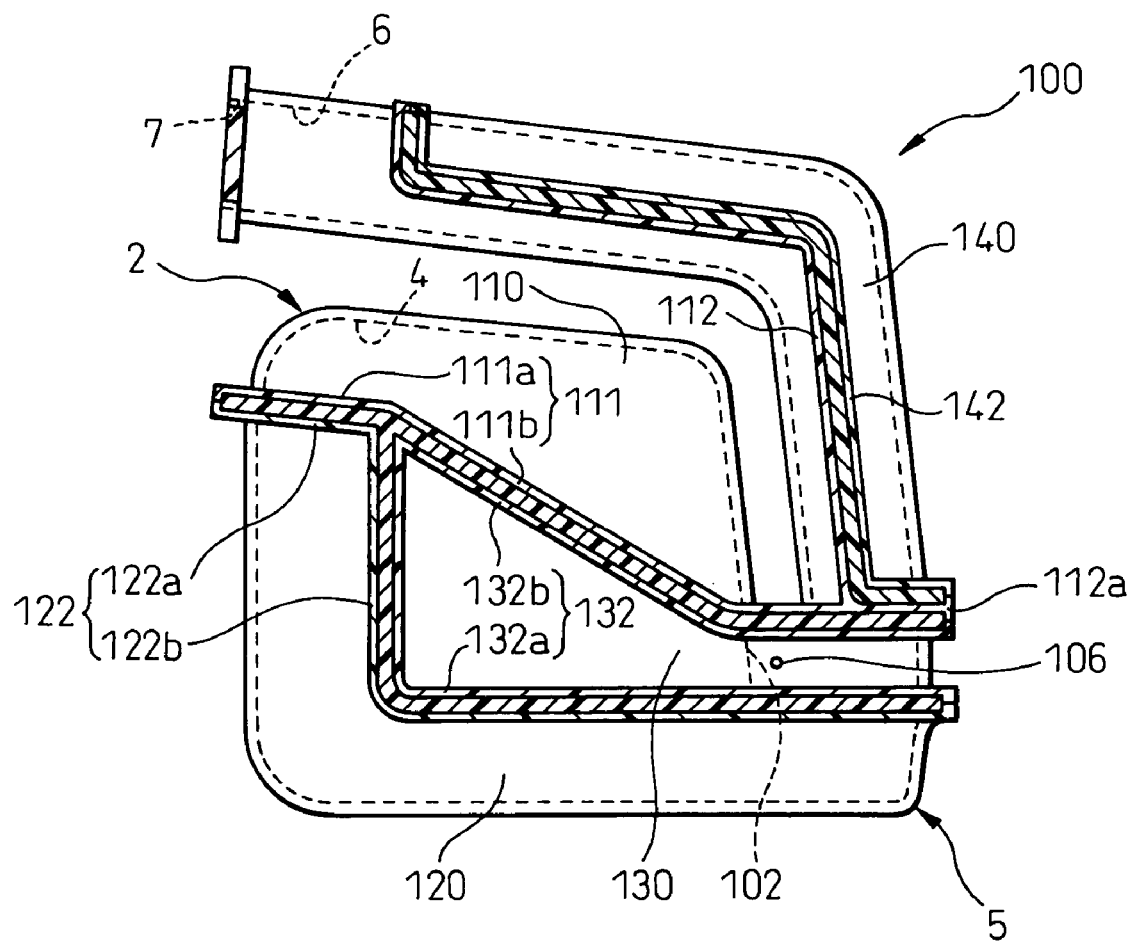
FIG. 38 is a cross-sectional view taken along the line XXXVIII—XXXVIII in FIG. 37.

As shown in FIGS. 36, 39, in the joining mode that has been described above, the flange 112 of the first molded body 110 is held between the flange 132 of the third molded body 130 and the flange 142 of the fourth molded body 140. In this embodiment, the third molded body 130 and the fourth molded body 140 can be considered to constitute the outer resin molded bodies and the first molded body 110 can be considered to constitute the intermediate molded body. In addition, in the aforesaid joining mode, the third molded body 130 is held between the flange 112 of the first molded body 110 and the flange 122 of the second molded body 120. In this embodiment, the first molded body 110 and the second molded body 120 can be considered to constitute the outer resin molded bodies and the third molded body can be considered to constitute the intermediate molded body.

The fifth molded bodies 150 are provided and are accommodated in recessed portions 133 which are made to open to end portions of the partitions 101 which correspond thereto. As shown in FIG. 39, the respective fifth molded bodies 150 are held at outer circumferential edge portions by the recessed portions 133 and the wall portion 113 of the first molded body 110. In this embodiment, the first molded body 110 and the third molded body 130 can be considered to constitute the outer resin molded bodies and the respective fifth molded bodies can be considered to constitute the intermediate resin molded body.

Next, a method for producing the manifold 100 will be described according to the flow chart shown in FIG. 29.

Figure 40:
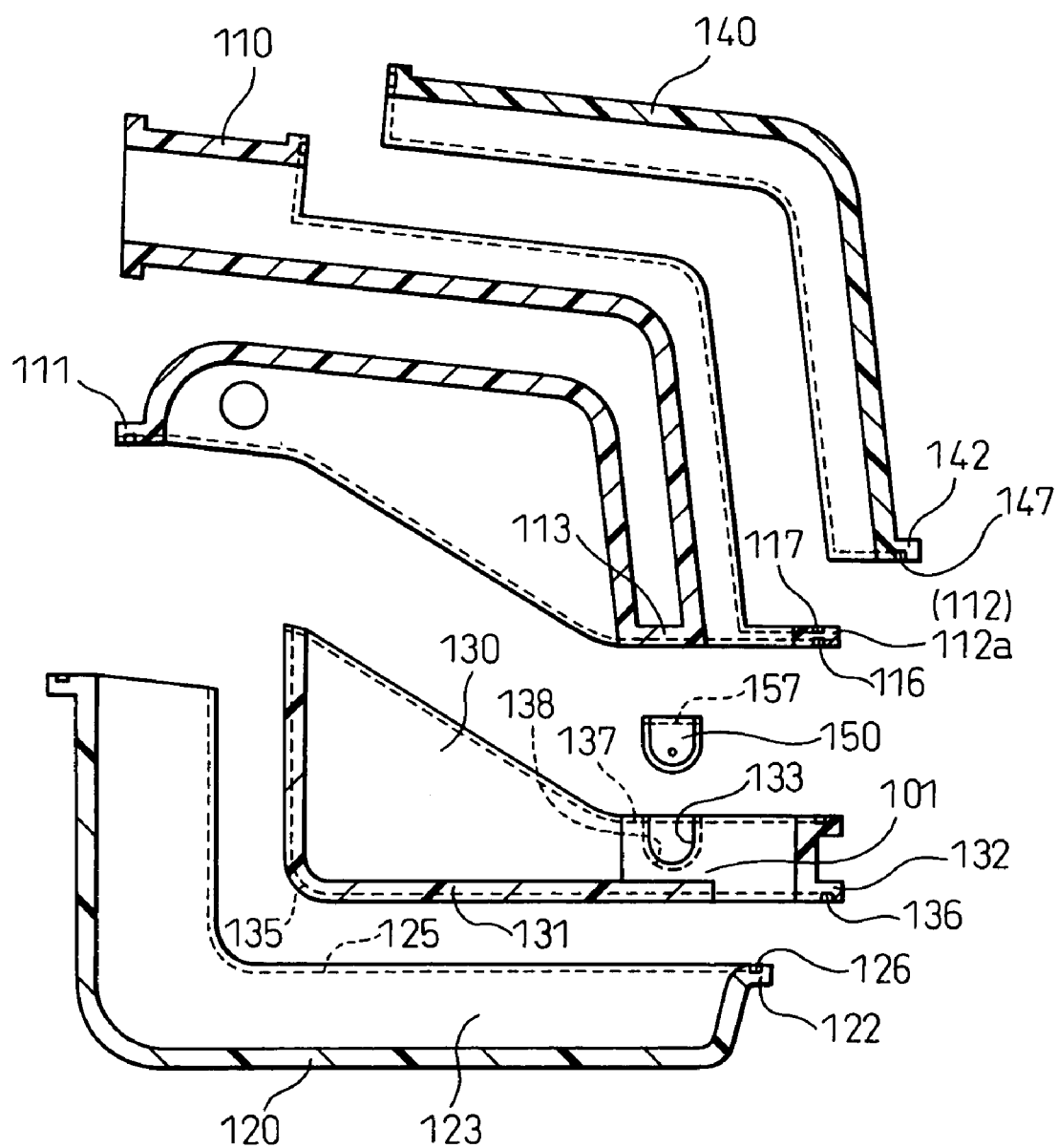
FIG. 40 is a cross-sectional view explaining the method for producing the intake manifold according to the twelfth embodiment, which corresponds to FIG. 39, FIGS. 41A, 41B are cross-sectional views explaining the method for producing the intake manifold according to the twelfth embodiment, which correspond to FIGS. 38, 37, respectively.

In step S11, as shown in FIG. 40, the respective molded bodies 110, 120, 130 140, 150 which constitute the predetermined locations of the manifold 100 are formed through resin molding. As to the resin from which the respective molded bodies 110, 120, 130, 140, 150 are formed, all the molded bodies are formed from the same resin, similarly to the eleventh embodiment, or different resins may be used.

A flow path groove 116 is formed in the flanges 111, 112 of the first molded body 110 at a plane which constitutes the joining interface between the flanges 122, 132 in the manifold 100 through resin molding in step S11. Here, the flow path groove 116 is formed into a loop-like shape which extends along the flange 111 in a direction in which the flange 111 extends and which links both end portions thereof in the direction in which the flange 111 extends at the portion 112a of the flange 112. Flow path grooves 117, 147 are formed in the flanges 112, 142 of the first and fourth molded bodies 110, 140, respectively, at a plane which constitutes the joining interface between the other flanges 112, 142 in the manifold 100. Here, the flow path grooves 117, 147 are formed into a loop-like shape which extends in a direction in which the corresponding flanges 112, 142 extend. A flow path groove 126 is formed in the flange 122 of the second molded body 120 at a plane which constitutes the joining interface between the flanges 111, 132 in the manifold 100. Here, the flow path groove 126 is formed into a loop-like shape which extends in a direction in which the flange 122 extends.

In addition, a flow path groove 136 is formed in the flange 132 of the third molded body 130 at a plane which constitutes the joining interface between the flanges 111, 112, 122 in the manifold 100 through resin molding in step S11. Here, the flow path groove 136 is formed into a loop-like shape which extends in a direction in which the flange 132 extends. Flow path grooves 135, 125 are formed in the wall portion 131 of the third molded body 130 and in the partitions 123 of the second molded body 120, respectively, at planes which constitute the joining interfaces in the manifold 100. Here, the flow path grooves 135, 125 are formed in such a manner as to extend in an L-shaped fashion and to connect to the flow path grooves 136, 126 at one end portions thereof, respectively. Flow path grooves 137, 157 are formed in the partitions 101 of the third molded body 130 and the fifth molded bodies 150, respectively, at a plane which constitutes the joining interface with the wall portion 113. Here, one end portion of the flow path groove 137 is formed in such a manner as to connect to the flow path groove 136, and the flow path grooves 137, 157 in the partitions 101 and the fifth molded bodies 150 which correspond to each other are formed in such a manner as to connect to each other in a later step S12 (refer to FIG. 43). Furthermore, a flow path groove 138 is formed in the recessed portions 133 in the partitions 101 at a plane which constitutes the joining interface with the corresponding fifth molded bodies 150 in the manifold 100. Here, the flow path groove 138 is formed in such a manner as to extend along an inner surface of the recessed portion 133 in an U-shaped fashion and to connect to the flow path groove 137 at both end portions thereof.

Figure 41A:
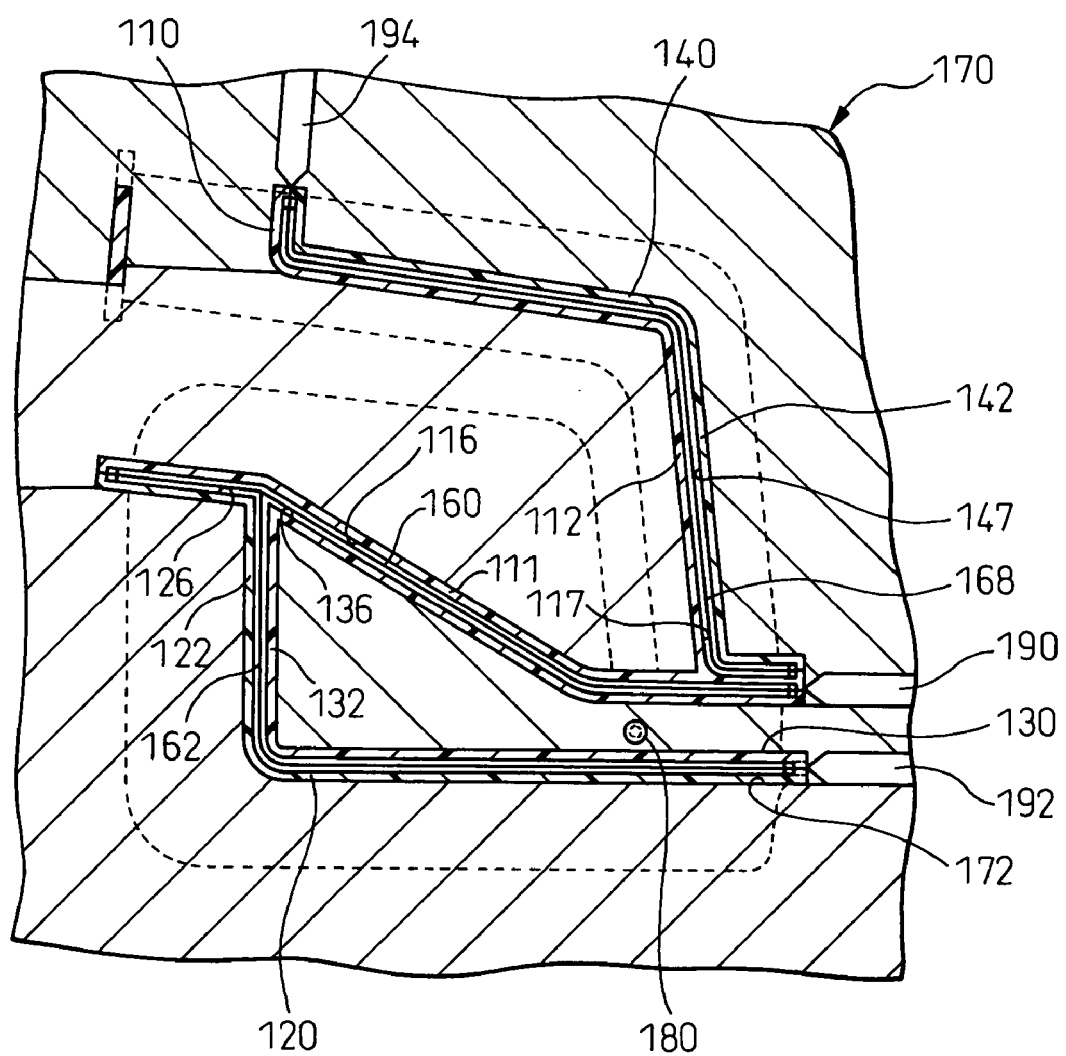
Figure 41B:
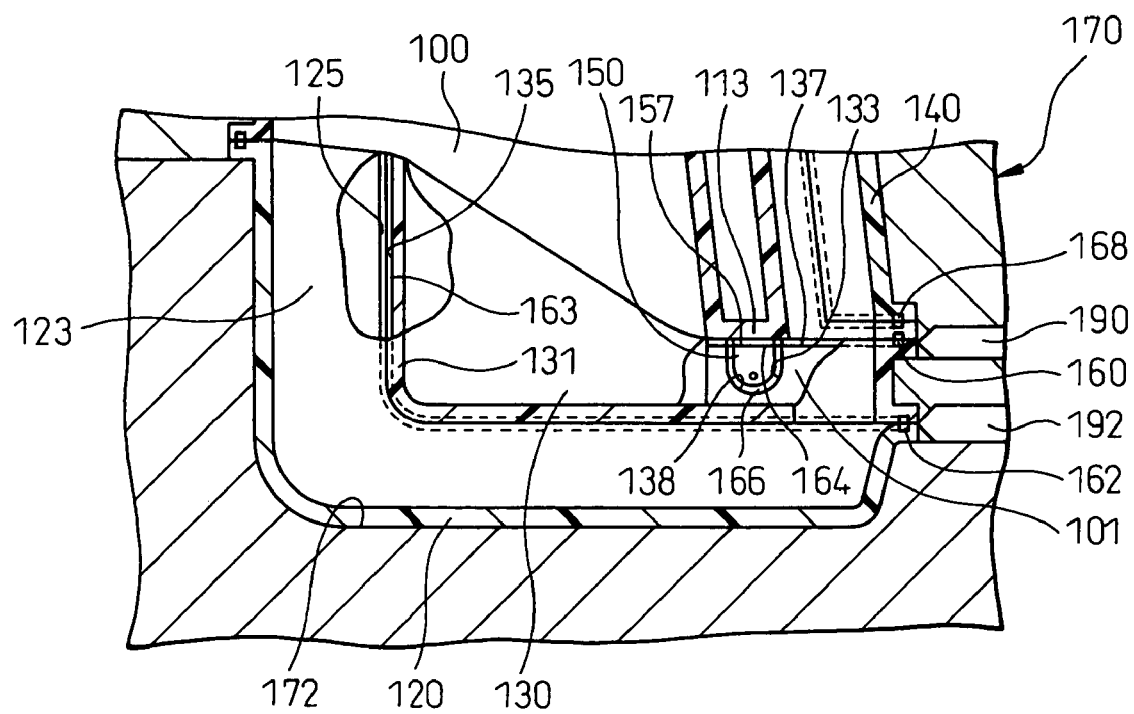

In step S12, as shown in FIGS. 41A, 41B, the respective molded bodies 110, 120, 130, 140, 150 are positioned by a mold 170 as a fixture and a positioning shaft 180.

Figure 42:
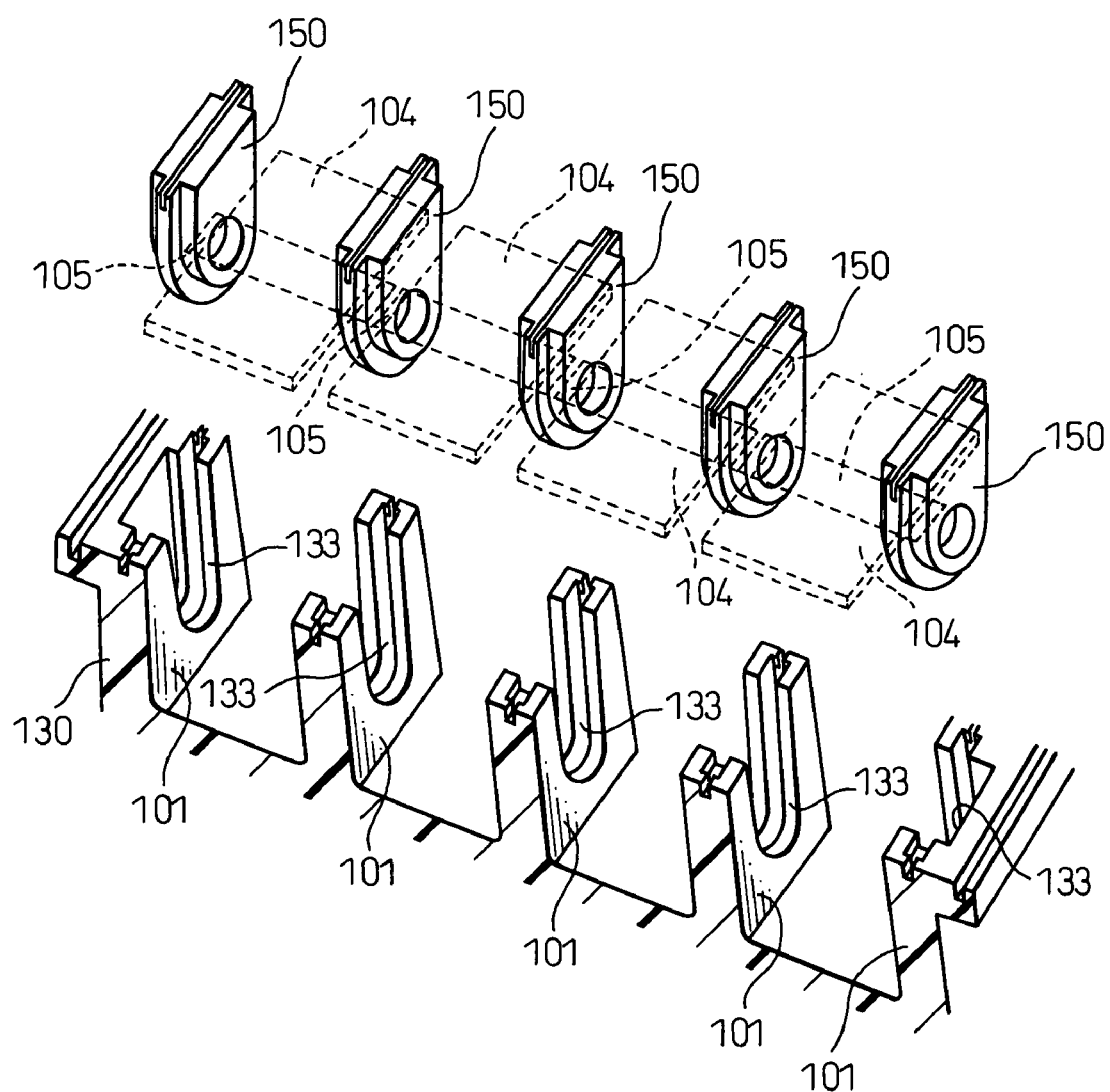
FIG. 42 is a perspective view explaining the method for producing the intake manifold according to the twelfth embodiment.
Figure 43:
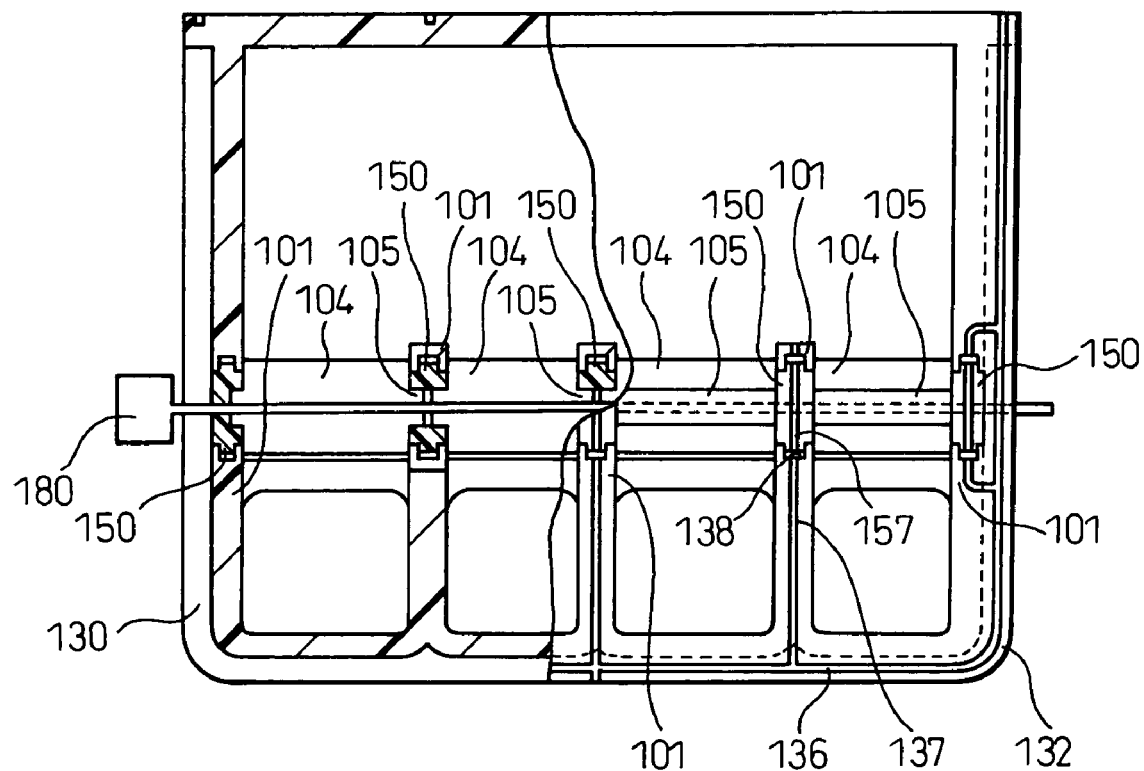
FIG. 43 is a cross-sectional view explaining the method for producing the intake manifold according to the twelfth embodiment, which corresponds to FIG. 37.

To be specific, the respective molded bodies 110, 120, 130, 140, 150 are disposed in a cavity 172 in the mold 170. As this occurs, for example, firstly, as shown in FIG. 42, the both end portions of the sleeve 105 of each valve member 104 are inserted into the internal holes of the fifth molded bodies 150, and the respective fifth molded bodies 150 are fitted in the corresponding recessed portions 133. Next, as shown in FIG. 43, the positioning shaft 180 is inserted from the outside of the third molded body 130 so as to be fitted in the sleeves 105 of all the valve members 104. Following this, as shown in FIGS. 41A, 41B, in the cavity 172, the flanges 111, 112 and the flange 132 are made to overlap each other, the wall portion 113 and the edge portions of the ends of each partition 101 are made to overlap each other, and each fifth molded body 150 is held by the wall portion 113 and the recessed portion 133 of each partition 101. In conjunction with this, the flanges 111, 132 and the flange 122 are made to overlap each other, the edge portions of the ends of each partition 123 and the wall portion 131 are made to overlap each other, and the flange 112 and the flange 142 are made to overlap each other.

The flow path groove 116 faces directly the flow path grooves 126, 136 at the interface between the flange 111 and the flanges 122, 132 and the interface between the flange 112 and the flange 132 as a result of the positioning in step S12, and a resin flow path 160 is formed by inner surfaces of the grooves 116, 126, 136. The flow path groove 126 faces directly the flow path groove 136 at the interface between the flange 122 and the flange 132, and a resin flow path 162 is formed by inner surfaces of the grooves 126, 136. The flow path groove 125 faces directly the flow path groove 135 at the interface between the edge portions of the ends of each partition 123 and the wall portion 131, a resin flow path 163 is formed by inner surfaces of the grooves 125, 135. The openings of the flow path grooves 137, 157 are closed by the wall portion 113 at the interface between the edge portions of the ends of each partition 101 and each fifth molded body 150 and the wall portion 113, and a resin flow path 164 is formed by inner surfaces of the grooves 137, 157. The opening of the flow path groove 138 is closed by the outer circumferential edge portion of the fifth molded body at the interface between each recessed portion 133 and the fifth molded body 150, and a resin flow path 166 is formed by inner surfaces of the flow path groove 138. Thus, the respective resin flow paths 160, 162, 164, 166 are made to communicate with one another. The flow path groove 117 faces directly the flow path groove 147 at the interface between the flange 112 and the flange 142, and a resin flow path 168 is formed by inner surfaces of the grooves 117, 147. This resin flow path 168 does not communicate with the resin flow paths 160, 162, 163, 164 and 166.

In this embodiment, the step S12 corresponds to the positioning process.

Next, in step S13, as shown in FIG. 41A, the respective molded bodies 110, 120, 130, 140, 150 are joined together by welding. To be specific, a molten resin is injected from injection nozzles 190, 192 of injectors substantially simultaneously towards the resin flow paths 160, 162, respectively, whereby the molten resin is injected uniformly over the entire areas of the respective resin flow paths 160 162, 163, 164, 166. As this occurs, the molten resin flows substantially simultaneously into the resin flow path 164 and the resin flow path 166. In addition, the molten resin is injected from the injection nozzle 194 of the injector towards the resin flow path 168 at substantially the same time that the molten resin is injected towards the resin flow paths 160, 162, and the molten resin is injected uniformly over the entire area of the resin flow path 168. The flow path groove inner walls that form the respective resin flow paths 160, 162, 163, 164, 166, 168 are molten again by virtue of heat from the molten resin so as to mix with the molten resin, and thereafter, the mixture of the fused inner walls and the molten resin are cooled so as to set. As a result, the flange 111 and the flanges 122, 132, the flange 112 and the flange 132, the flange 122 and the flange 132, the respective partitions 123 and the wall portion 131, the respective partitions 101 and the respective fifth molded bodies 150 and the wall portion 113, the respective recessed portions 133 and the fifth molded bodies 150, and the flange 112 and the flange 142 are joined together, respectively, whereby the manifold 100 is completed. Note that as to the molten resin that is injected into the respective resin flow paths 160, 162, 163, 164, 166, 168, as in the case with the first embodiment, the respective resin flow paths 160, 162, 163, 164, 166, 168 may be formed from the same resin as that used for forming the molded bodies 110, 120, 130, 140, 150, or a different resin may be used.

In this embodiment, the aforesaid step S12 and step S13 correspond to the secondary molding process.

Thus, according to the production method of the twelfth embodiment, the molten resin can be supplied to the entire areas of the resin flow paths 160, 162, 163, 164, 166, 168. Due to this, the welding of the molded bodies is ensured at the interface at any joint location such as a location where the flange 112 is put between the flanges 132, 142, a location where the third molded body 130 is put between the flanges 112, 122, and a location where each fifth molded body 150 is put between the wall portion 113 and each recessed portion 133. Consequently, the airtightness and joining strength are secured at all the joining interfaces between the molded bodies 110, 120, 130, 140, 150.

In addition, according to the production method of the twelfth embodiment, the molten resin is injected substantially simultaneously into the resin flow paths 160, 168 which are situated on both side of the flange 112 whereby, as the thin flange 112 is subjected to heat from the molten resin to thereby be easily molten again, the resin so molten again and the molten resin so injected mix with each other sufficiently. Consequently, a high joining strength is realized when the mixture of the resins sets.

Furthermore, according to the production method of the twelfth embodiment, as the welding of the plurality of molded bodies 110, 120, 130, 140, 150 can be realized at one time without dividing the process into a plurality of steps, the improvement in productivity and reduction in production costs can be attempted. Note that, for example, the welding at the respective locations such as where the flange 112 is held between the flanges 232, 142, where the third molded body 130 is held between the flanges 112, 122 and where each fifth molded body 150 is held between the wall portion 113 and each fifth molded body 150 may be implemented separately in divided steps.

Moreover, according to the production method of the twelfth embodiment, the respective molded bodies 110, 120, 130, 140, 150 can be positioned highly accurately by the mold 170 and the positioning shaft 180 for welding those molded bodies together. In particular, the five fifth molded bodies 150 which constitutes the bearings 108 in the manifold 100 are positioned with accuracy by inserting the positioning shaft 180 via the sleeves 105 of the valve members 104 into the internal holes of the respective fifth molded bodies 150. Due to this, the degree at which the internal holes in the respective fifth molded bodies 150 and hence the internal holes in the respective bearings 108 are arranged coaxially can be secured with high accuracy. Note that, while two or more fifth molded bodies may be provided, as in the case with the embodiment, as, in the event that three or more fifth molded bodies are provided, it is extremely difficult to secure the degree of coaxial arrangement, the positioning using the positioning shaft 180 becomes effective.

Incidentally, while, in the embodiments that have been described heretofore, the invention has been described as being applied to the manifolds 1, 70, 100 as the intake member, the invention can be applied to various types of intake members such as an intake pipe for supplying intake air to the engine.

While the invention has been described by reference to the specific embodiments for purposes of illustration, it should be apparent that numerous modifications could be made thereto by those skilled in the art without departing from the basic concept and scope of the invention.

What is claimed is:

1. An intake system comprising; a tubular portion formed of a plurality of divided primary molded members so as to form a packing portion into which a secondary molding resin can be packed at a joint between the plurality of primary molded members, a functional part attached to the tubular portion and having an arm portion that is superimposed on the tubular portion, and a lock-shaped portion formed integrally from the secondary molding resin and having a trunk portion which is welded to the primary molded members forming the packing portion, a first neck portion which is formed in such a manner as to be smaller in diameter than an outside diameter of the trunk portion and which extends radially outwardly of the trunk portion so as to penetrate the primary molded members and the arm portion, and a first head portion which is connected an end of the first neck portion which is opposite to an end thereof which faces the trunk portion and which is formed in such a manner as to be larger in diameter than an outside diameter of the first neck portion.

2. An intake system as set forth in claim 1, wherein the lock-shaped portion has a second neck portion which is formed so as to extend from the trunk portion while continuing to form a predetermined angle relative to the first neck portion and which penetrates the primary molded members and a second head portion which is connected to an end of the second neck portion which is opposite to an end thereof which faces the trunk portion and which is formed in such a manner as to be larger in diameter than an outside diameter of the second neck portion.

3. An intake system as set forth in claim 2, wherein an angle that is formed by the first neck portion and the second neck portion is generally 180°.

4. An intake system as set forth in claim 1, wherein the primary molded member has a first hole portion which provides a communication between the packing portion and an external portion, the arm portion has a second hole portion which can be connected to the first hole portion, and the first neck portion penetrates the first hole portion and the second hole portion.

5. An intake system comprising;
an intake duct, made from resin, which forms an intake passageway,
a casing which is divided into two or more piece portions so as to allow the intake duct to be put between the piece portions so divided to thereby form a resonator between the intake duct and the casing, and
a joint made from a resin which is packed between the respective piece portions and between the intake duct and the casing and adapted to attain bonding and sealing between the respective piece portions and between the intake duct and the casing.

6. An intake system as set forth in claim 5, wherein the joint is formed from a secondary molding resin which attains welding between the respective piece portions and between the intake duct and the casing.

7. An intake system as set forth in claim 5, wherein the casing is placed so as to cover an opening formed in such a manner as to penetrate a circumferential wall of the intake duct.

8. An intake system as set forth in claim 5, wherein the intake duct has positioning means for positioning an attachment position to attach the casing to the intake duct.

9. An intake system as set forth in claim 8, wherein the positioning means is a groove portion which is formed continuously in a circumferential direction of the intake duct.

10. An intake system as set forth in claim 8, wherein the positioning means is a protruding portion which is formed in such a manner as to protrude radially outwardly of the intake duct.

11. An intake system as set forth in claim 5, wherein the intake duct and the casing form a space portion into which a resin is packed.

12. An intake system as set forth in claim 5, wherein the casing covers the intake duct circumferentially.

13. An intake system as set forth in claim 12, wherein the casing is formed into a cylindrical shape.

14. An intake system as set forth in claim 13, wherein the casing has two semi-cylindrical piece portions which are separated by a plane containing the central axis of the intake duct.

15. An intake system as set forth in claim 13, wherein the casing has three or more fan-shaped tubular piece portions which are separated by two or more planes extending radially from the central axis of the intake duct.

16. An intake system as set forth in claim 5, wherein the casing has two piece portions which are separated by a plane containing an central axis of the intake duct.

17. An intake system as set forth in claim 5, wherein the casing has three or more piece portions which are separated by two or more planes extending radially from the central axis of the intake duct.

18. An intake system as set forth in claim 5, wherein the casing is such that any piece portion and other piece portions which are adjacent thereto are connected by hinge portions which each can be folded.

19. An intake system as set forth in claim 18, wherein the piece portions and the hinge portions of the casing are formed integrally from the same resin.

20. An intake system as set forth in claim 5, wherein the joint has a first joint which attains bonding and sealing between the intake duct and the casing at axial end portions of the casing.

21. An intake system as set forth in claim 20, wherein the first joint extends continuously in a circumferential direction of the intake duct.

22. An intake system as set forth in claim 5, wherein the joint has a second joint which attains bonding and sealing between the respective piece portions.

23. An intake system as set forth in claim 22, wherein the first joint and the second joint communicate with each other.

24. An intake system as set forth in claim 5, wherein the casing has an injection port which communicates with the joint and into which a resin can be injected.

25. An intake system production method for producing an intake system comprising a tubular portion formed of a plurality of divided primary molded members and a functional part placed on the tubular portion, wherein
the functional part is joined to the tubular portion with a secondary molding resin which is packed into a joint between the plurality of primary molded members.

26. An intake system production method as set forth in claim 25, wherein the functional part is joined to the tubular portion with the secondary molding resin which is caused to overflow from the joint between the plurality of primary molded members to the outside of the tubular portion.

27. An intake system production method as set forth in claim 26, wherein a fixture for forming a lock-shaped portion by the secondary molding resin is brought into abutment with an end of the functional part which is opposite to an end thereof which faces the tubular portion.

28. An intake member production method for producing an intake member for supplying intake air to an internal combustion engine by joining together a plurality of resin molded bodies, the intake member production method comprising a secondary molding process in which an intermediate resin molded body is put between two outer resin molded bodies, and a molten resin is injected substantially simultaneously into a first interface which is an interface between one of the outer resin molded bodies and the intermediate resin molded body and a second interface which is an interface between the other outer resin molded body and the intermediate resin molded body so that the two outer resin molded bodies and the intermediate resin molded body are welded together.

29. An intake member production method as set forth in claim 28, wherein in the secondary molding process, a resin flow path is formed on the first interface and the second interface by putting the intermediate resin molded body between the two outer resin molded bodies, so that the molten resin is injected into the resin flow path so formed.

30. An intake member production method as set forth in claim 29, wherein in the secondary molding process, the resin flow path formed on the first interface is formed by a groove provided in at least one of the outer resin molded body and the intermediate resin molded body which form the first interface, and the resin flow path formed on the second interface is formed by a groove provided in at least one of the outer resin molded body and the intermediate resin molded body which form the second interface.

31. An intake member production method as set forth in claim 29, wherein in the secondary molding process, a communicating flow path which provides a communication between the resin flow path on the first interface and the resin flow path on the second interface is formed by a hole which penetrates the intermediate resin molded body.

32. An intake member production method as set forth in claim 28, comprising a positioning process for positioning the intermediate resin molded body relative to the two outer resin molded bodies by a fixture prior to the injection of the molten resin in the secondary molding process.

33. An intake member production method for producing the intake member as set forth in claim 32, the intake member having a plurality of bearings which support a rotational shaft of a valve member for opening and closing a passageway of intake air at a plurality of axial locations, wherein in the positioning process, a plurality of intermediate resin molded bodies such as the intermediate resin molded body which constitute the plurality of bearings are held coaxially by the fixture.

34. An intake member production method as set forth in claim 33, wherein in the positioning process, three or more intermediate resin molded bodies such as intermediate resin molded bodies are held coaxially by the fixture.

35. An intake manifold production method wherein an intake manifold for distributing and supplying intake air to a plurality of cylinders of an internal combustion engine is produced as the intake member by the method as set forth in claim 28.

36. An intake member for supplying intake air to an internal combustion engine produced by putting an intermediate resin molded body between two outer resin molded bodies and substantially simultaneously injecting molten resin into a first interface which is an interface between one of the outer resin molded bodies and the intermediate resin molded body and a second interface which is an interface between the other outer resin molded body and the intermediate resin molded body so that the two outer resin molded bodies and the intermediate resin molded body are welded together.

* * * * *